US012395877B2

(12) United States Patent
Wang et al.

(10) Patent No.: US 12,395,877 B2
(45) Date of Patent: Aug. 19, 2025

(54) SIDELINK MEASUREMENT CONFIGURATION AND REPORTING FOR A USER EQUIPMENT RELAY

(71) Applicant: QUALCOMM Incorporated, San Diego, CA (US)

(72) Inventors: Hua Wang, Basking Ridge, NJ (US); Sony Akkarakaran, Poway, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 17/804,519

(22) Filed: May 27, 2022

(65) Prior Publication Data

US 2023/0413089 A1 Dec. 21, 2023

(51) Int. Cl.
*H04W 24/10* (2009.01)
*H04L 5/00* (2006.01)
*H04W 92/18* (2009.01)

(52) U.S. Cl.
CPC ........... *H04W 24/10* (2013.01); *H04L 5/0051* (2013.01); *H04W 92/18* (2013.01)

(58) Field of Classification Search
CPC ...... H04W 24/10; H04W 92/18; H04L 5/0051
See application file for complete search history.

(56) References Cited

U.S. PATENT DOCUMENTS

| 2021/0289580 A1* | 9/2021 | Damnjanovic | H04W 8/005 |
| 2023/0300713 A1* | 9/2023 | Hoang | H04W 40/12 |
| | | | 370/254 |

FOREIGN PATENT DOCUMENTS

WO WO-2023208562 A1 * 11/2023 ............ H04W 36/03

OTHER PUBLICATIONS

U.S. Appl. No. 63/336,390, filed Apr. 29, 2022, corresponding to WO 2023/208562. (Year: 2022).*

* cited by examiner

*Primary Examiner* — Melvin C Marcelo
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive an activated UE relay measurement configuration that includes one or more first sidelink measurement parameters. The UE may receive a deactivated UE relay measurement configuration that includes one or more second sidelink measurement parameters, wherein values for the one or more first sidelink measurement parameters and values for the one or more second sidelink measurement parameters are different. The UE may perform one or more sidelink measurements based at least in part on at least one of the activated UE relate measurement configuration or the deactivated UE relay measurement configuration. Numerous other aspects are described.

30 Claims, 22 Drawing Sheets

SIDELINK MEASUREMENT CONFIGURATION AND REPORTING FOR A USER EQUIPMENT RELAY

FIELD OF THE DISCLOSURE

Aspects of the present disclosure generally relate to wireless communication and to techniques and apparatuses for sidelink measurement configuration and associated reporting for a user equipment relay.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an activated UE relay measurement configuration that includes one or more first sidelink measurement parameters. The method may include receiving a deactivated UE relay measurement configuration that includes one or more second sidelink measurement parameters, where values for the one or more first sidelink measurement parameters and values for the one or more second sidelink measurement parameters are different. The method may include performing one or more sidelink measurements based at least in part on at least one of the activated UE relate measurement configuration or the deactivated UE relay measurement configuration.

Some aspects described herein relate to a method of wireless communication performed by a first UE. The method may include performing one or more sidelink measurements of one or more sidelink reference signals associated with a second UE. The method may include transmitting, to a network node, a sidelink measurement report that indicates results for the one or more sidelink measurements. The method may include receiving, from the network node, an indication to transition to a sidelink UE relay mode for operation as a sidelink UE relay between the network node and the second UE, where the indication to transition to the sidelink UE relay mode is based at least in part on the results of the one or more sidelink measurements.

Some aspects described herein relate to a method of wireless communication performed by a first UE. The method may include transmitting one or more sidelink reference signals. The method may include receiving, from a second UE, a sidelink measurement report that indicates results for one or more sidelink measurements of the one or more sidelink reference signals. The method may include transmitting the sidelink measurement report to a network node.

Some aspects described herein relate to a method of wireless communication performed by a first UE. The method may include performing one or more sidelink measurements of one or more sidelink reference signals associated with a second UE. The method may include transmitting, to a network node, a sidelink measurement report that indicates, results for the one or more sidelink measurements, and a selected sidelink UE relay mode for the second UE to operate as a relay UE between the first UE and the network node.

Some aspects described herein relate to a method of wireless communication performed by a first UE. The method may include transmitting one or more sidelink reference signals. The method may include receiving, from a second UE, a sidelink measurement report that indicates results for one or more sidelink measurements of the one or more sidelink reference signals. The method may include transmitting the sidelink measurement report to a network node. The method may include receiving, from the network node, an indication to transition to a sidelink UE relay mode for operation as a sidelink UE relay between the network node and the second UE, where the indication to transition to the sidelink UE relay mode is based at least in part on the results of the one or more sidelink measurements.

Some aspects described herein relate to a method of wireless communication performed by a network node. The method may include receiving a sidelink measurement report. The method may include transmitting, to a first UE, an indication to transition to a sidelink UE relay mode that based at least in part on based at least in part on the sidelink measurement report, where the sidelink UE relay mode is for the first UE to operate as a sidelink UE relay between the network node and a second UE.

Some aspects described herein relate to a UE for wireless communication. The user equipment may include a memory and one or more processors coupled to the memory. The one or more processors may be configured to receive an activated UE relay measurement configuration that includes one or more first sidelink measurement parameters. The one or more processors may be configured to receive a deactivated UE relay measurement configuration that includes one or more second sidelink measurement parameters. The one or more processors may be configured to perform one or more sidelink measurements based at least in part on at least one of the activated UE relate measurement configuration or the deactivated UE relay measurement configuration.

Some aspects described herein relate to a first UE for wireless communication. The first user equipment may include a memory and one or more processors coupled to the memory. The one or more processors may be configured to perform one or more sidelink measurements of one or more sidelink reference signals associated with a second UE. The one or more processors may be configured to transmit, to a network node, a sidelink measurement report that indicates results for the one or more sidelink measurements. The one or more processors may be configured to receive, from the network node, an indication to transition to a sidelink UE relay mode for operation as a sidelink UE relay between the network node and the second UE.

Some aspects described herein relate to a first UE for wireless communication. The first user equipment may include a memory and one or more processors coupled to the memory. The one or more processors may be configured to transmit one or more sidelink reference signals. The one or more processors may be configured to receive, from a second UE, a sidelink measurement report that indicates results for one or more sidelink measurements of the one or more sidelink reference signals. The one or more processors may be configured to transmit the sidelink measurement report to a network node.

Some aspects described herein relate to a first UE for wireless communication. The first user equipment may include a memory and one or more processors coupled to the memory. The one or more processors may be configured to perform one or more sidelink measurements of one or more sidelink reference signals associated with a second UE. The one or more processors may be configured to transmit, to a network node, a sidelink measurement report that indicates.

Some aspects described herein relate to a first UE for wireless communication. The first user equipment may include a memory and one or more processors coupled to the memory. The one or more processors may be configured to transmit one or more sidelink reference signals. The one or more processors may be configured to receive, from a second UE, a sidelink measurement report that indicates results for one or more sidelink measurements of the one or more sidelink reference signals. The one or more processors may be configured to transmit the sidelink measurement report to a network node. The one or more processors may be configured to receive, from the network node, an indication to transition to a sidelink UE relay mode for operation as a sidelink UE relay between the network node and the second UE.

Some aspects described herein relate to a network node for wireless communication. The network node may include a memory and one or more processors coupled to the memory. The one or more processors may be configured to receive a sidelink measurement report. The one or more processors may be configured to transmit, to a first UE, an indication to transition to a sidelink UE relay mode that based at least in part on based at least in part on the sidelink measurement report.

Some aspects described herein relate to a non-transitory computer-readable medium that stores a set of instructions for wireless communication by a UE. The set of instructions, when executed by one or more processors of the UE, may cause the UE to receive an activated UE relay measurement configuration that includes one or more first sidelink measurement parameters. The set of instructions, when executed by one or more processors of the UE, may cause the UE to receive a deactivated UE relay measurement configuration that includes one or more second sidelink measurement parameters. The set of instructions, when executed by one or more processors of the UE, may cause the UE to perform one or more sidelink measurements based at least in part on at least one of the activated UE relate measurement configuration or the deactivated UE relay measurement configuration.

Some aspects described herein relate to a non-transitory computer-readable medium that stores a set of instructions for wireless communication by a first UE. The set of instructions, when executed by one or more processors of the first UE, may cause the first UE to perform one or more sidelink measurements of one or more sidelink reference signals associated with a second UE. The set of instructions, when executed by one or more processors of the first UE, may cause the first UE to transmit, to a network node, a sidelink measurement report that indicates results for the one or more sidelink measurements. The set of instructions, when executed by one or more processors of the first UE, may cause the first UE to receive, from the network node, an indication to transition to a sidelink UE relay mode for operation as a sidelink UE relay between the network node and the second UE.

Some aspects described herein relate to a non-transitory computer-readable medium that stores a set of instructions for wireless communication by a first UE. The set of instructions, when executed by one or more processors of the first UE, may cause the first UE to transmit one or more sidelink reference signals. The set of instructions, when executed by one or more processors of the first UE, may cause the first UE to receive, from a second UE, a sidelink measurement report that indicates results for one or more sidelink measurements of the one or more sidelink reference signals. The set of instructions, when executed by one or more processors of the first UE, may cause the first UE to transmit the sidelink measurement report to a network node.

Some aspects described herein relate to a non-transitory computer-readable medium that stores a set of instructions for wireless communication by a first UE. The set of instructions, when executed by one or more processors of the UE, may cause the first UE to perform one or more sidelink measurements of one or more sidelink reference signals associated with a second UE. The set of instructions, when executed by one or more processors of the first UE, may cause the first UE to transmit, to a network node, a sidelink measurement report that indicates.

Some aspects described herein relate to a non-transitory computer-readable medium that stores a set of instructions for wireless communication by a first UE. The set of instructions, when executed by one or more processors of the UE, may cause the first UE to transmit one or more sidelink reference signals. The set of instructions, when executed by one or more processors of the first UE, may cause the first UE to receive, from a second UE, a sidelink measurement report that indicates results for one or more sidelink measurements of the one or more sidelink reference signals. The set of instructions, when executed by one or more processors of the first UE, may cause the first UE to transmit the sidelink measurement report to a network node. The set of instructions, when executed by one or more processors of the first UE, may cause the first UE to receive, from the network node, an indication to transition to a sidelink UE relay mode for operation as a sidelink UE relay between the network node and the second UE.

Some aspects described herein relate to a non-transitory computer-readable medium that stores a set of instructions for wireless communication by a network node. The set of instructions, when executed by one or more processors of the network node, may cause the network node to receive a sidelink measurement report. The set of instructions, when executed by one or more processors of the network node, may cause the network node to transmit, to a first UE, an indication to transition to a sidelink UE relay mode that based at least in part on based at least in part on the sidelink measurement report.

Some aspects described herein relate to an apparatus for wireless communication. The apparatus may include means for receiving an activated UE relay measurement configuration that includes one or more first sidelink measurement parameters. The apparatus may include means for receiving a deactivated UE relay measurement configuration that includes one or more second sidelink measurement parameters, where values for the one or more first sidelink measurement parameters and values for the one or more second sidelink measurement parameters are different. The apparatus may include means for performing one or more sidelink measurements based at least in part on at least one of the activated UE relate measurement configuration or the deactivated UE relay measurement configuration.

Some aspects described herein relate to a first apparatus for wireless communication. The first apparatus includes means for performing one or more sidelink measurements of one or more sidelink reference signals associated with a second apparatus. The first apparatus includes means for transmitting, to a network node, a sidelink measurement report that indicates results for the one or more sidelink measurements. The first apparatus includes means for receiving, from the network node, an indication to transition to a sidelink UE relay mode for operation as a sidelink UE relay between the network node and the second apparatus, wherein the indication to transition to the sidelink UE relay mode is based at least in part on the results of the one or more sidelink measurements.

Some aspects described herein relate to a first apparatus for wireless communication. The first apparatus includes means for transmitting one or more sidelink reference signals. The first apparatus includes means for receiving, from a second apparatus, a sidelink measurement report that indicates results for one or more sidelink measurements of the one or more sidelink reference signals. The first apparatus includes means for transmitting the sidelink measurement report to a network node.

Some aspects described herein relate to a first apparatus for wireless communication. The first apparatus includes means for performing one or more sidelink measurements of one or more sidelink reference signals associated with a second apparatus. The first apparatus includes means for transmitting, to a network node, a sidelink measurement report that indicates results for the one or more sidelink measurements and a selected sidelink UE relay mode for the second apparatus to operate as a relay UE between the first apparatus and the network node.

Some aspects described herein relate to a first apparatus for wireless communication. The first apparatus includes means for transmitting one or more sidelink reference signals. The first apparatus includes means for receiving, from a second apparatus, a sidelink measurement report that indicates results for one or more sidelink measurements of the one or more sidelink reference signals. The first apparatus includes means for transmitting the sidelink measurement report to a network node. The first apparatus includes means for receiving, from the network node, an indication to transition to a sidelink UE relay mode for operation as a sidelink UE relay between the network node and the second apparatus, wherein the indication to transition to the sidelink UE relay mode is based at least in part on the results of the one or more sidelink measurements.

Some aspects described herein relate to an apparatus for wireless communication. The apparatus includes means for receiving a sidelink measurement report. The apparatus includes means for transmitting, to a first UE, an indication to transition to a sidelink UE relay mode that based at least in part on based at least in part on the sidelink measurement report, wherein the sidelink UE relay mode is for the first UE to operate as a sidelink UE relay between the network node and a second UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
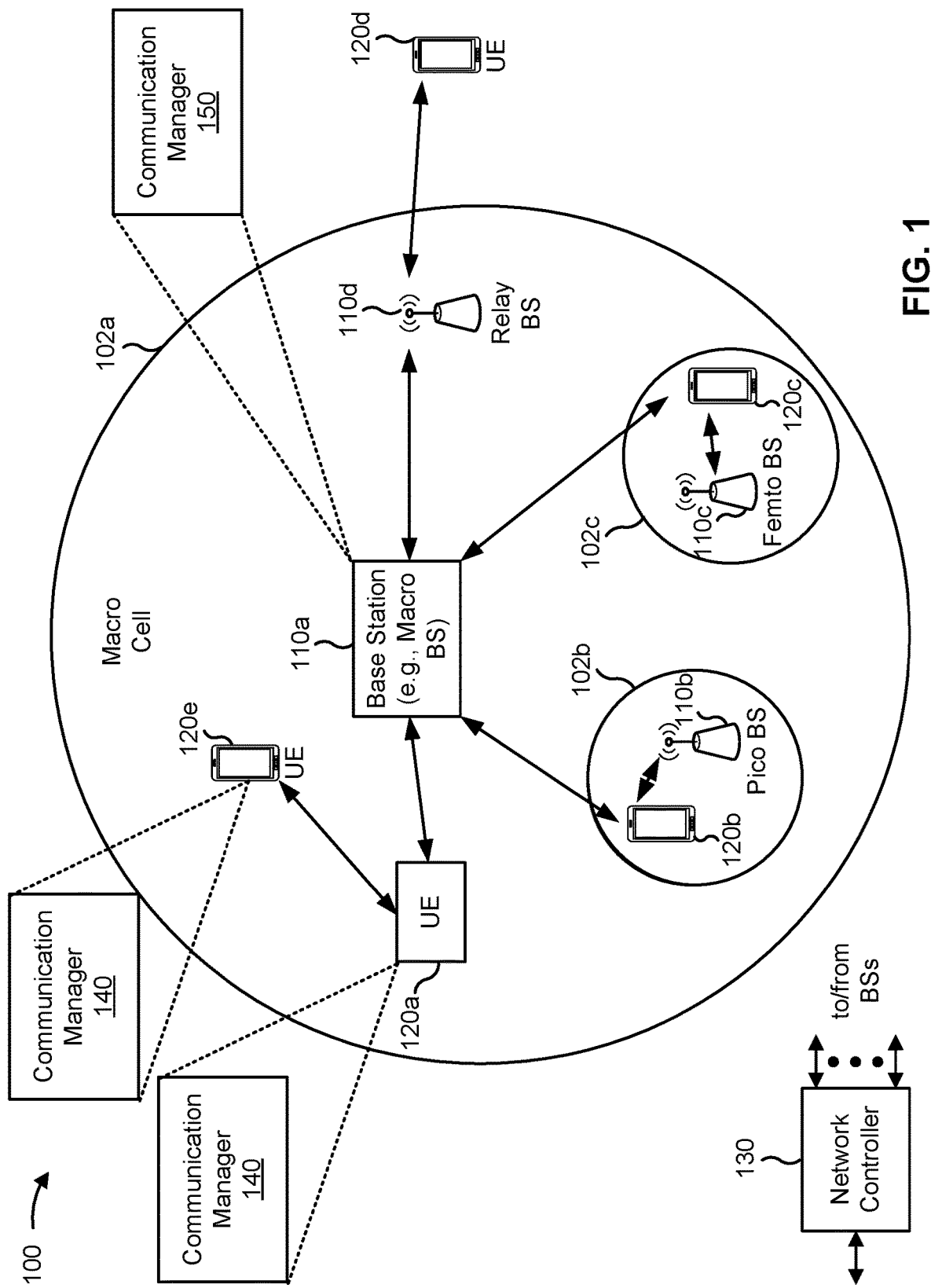
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 (referred to herein as a relay UE or a sidelink UE relay) that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE 120 may include a communication manager 140. As described in more detail elsewhere herein, the communication manager 140 may receive an activated UE relay measurement configuration that includes one or more first sidelink measurement parameters; receive a deactivated UE relay measurement configuration that includes one or more second sidelink measurement parameters, wherein values for the one or more first sidelink measurement parameters and values for the one or more second sidelink measurement parameters are different; and perform one or more sidelink measurements based at least in part on at least one of the activated UE relate measurement configuration or the deactivated UE relay measurement configuration. Additionally, or alternatively, the communication manager 140 may perform one or more other operations described herein.

In some aspects, a UE 120 may include a communication manager 140. As described in more detail elsewhere herein, the communication manager 140 may perform one or more sidelink measurements of one or more sidelink reference signals associated with a second UE; transmit, to a network node, a sidelink measurement report that indicates results for the one or more sidelink measurements; and receive, from the network node, an indication to transition to a sidelink UE relay mode for operation as a sidelink UE relay between the network node and the second UE, wherein the indication to transition to the sidelink UE relay mode is based at least in part on the results of the one or more sidelink measurements. Additionally, or alternatively, the communication manager 140 may perform one or more other operations described herein.

In some aspects, a UE 120 may include a communication manager 140. As described in more detail elsewhere herein, the communication manager 140 may transmit one or more sidelink reference signals; receive, from a second UE, a sidelink measurement report that indicates results for one or more sidelink measurements of the one or more sidelink reference signals; and transmit the sidelink measurement report to a network node. Additionally, or alternatively, the communication manager 140 may perform one or more other operations described herein.

In some aspects, a UE 120 may include a communication manager 140. As described in more detail elsewhere herein, the communication manager 140 may perform one or more sidelink measurements of one or more sidelink reference signals associated with a second UE; and transmit, to a network node, a sidelink measurement report that indicates: results for the one or more sidelink measurements, and a selected sidelink UE relay mode for the second UE to operate as a relay UE between the first UE and the network node. Additionally, or alternatively, the communication manager 140 may perform one or more other operations described herein.

In some aspects, a UE 120 may include a communication manager 140. As described in more detail elsewhere herein, the communication manager 140 may transmit one or more sidelink reference signals; receive, from a second UE, a sidelink measurement report that indicates results for one or more sidelink measurements of the one or more sidelink reference signals; transmit the sidelink measurement report to a network node; and receive, from the network node, an indication to transition to a sidelink UE relay mode for operation as a sidelink UE relay between the network node and the second UE, wherein the indication to transition to the sidelink UE relay mode is based at least in part on the results of the one or more sidelink measurements. Additionally, or alternatively, the communication manager 140 may perform one or more other operations described herein.

In some aspects, a network node such as a base station 110 may include a communication manager 150. As described in more detail elsewhere herein, the communication manager 150 may receive a sidelink measurement report; and transmit, to a first UE, an indication to transition to a sidelink UE relay mode that based at least in part on based at least in part on the sidelink measurement report, wherein the sidelink UE relay mode is for the first UE to operate as a sidelink UE relay between the network node and a second UE. Additionally, or alternatively, the communication manager 150 may perform one or more other operations described herein.

As indicated above, FIG. 1 is provided as an example. Other examples may differ from what is described with regard to FIG. 1.

Figure 2:
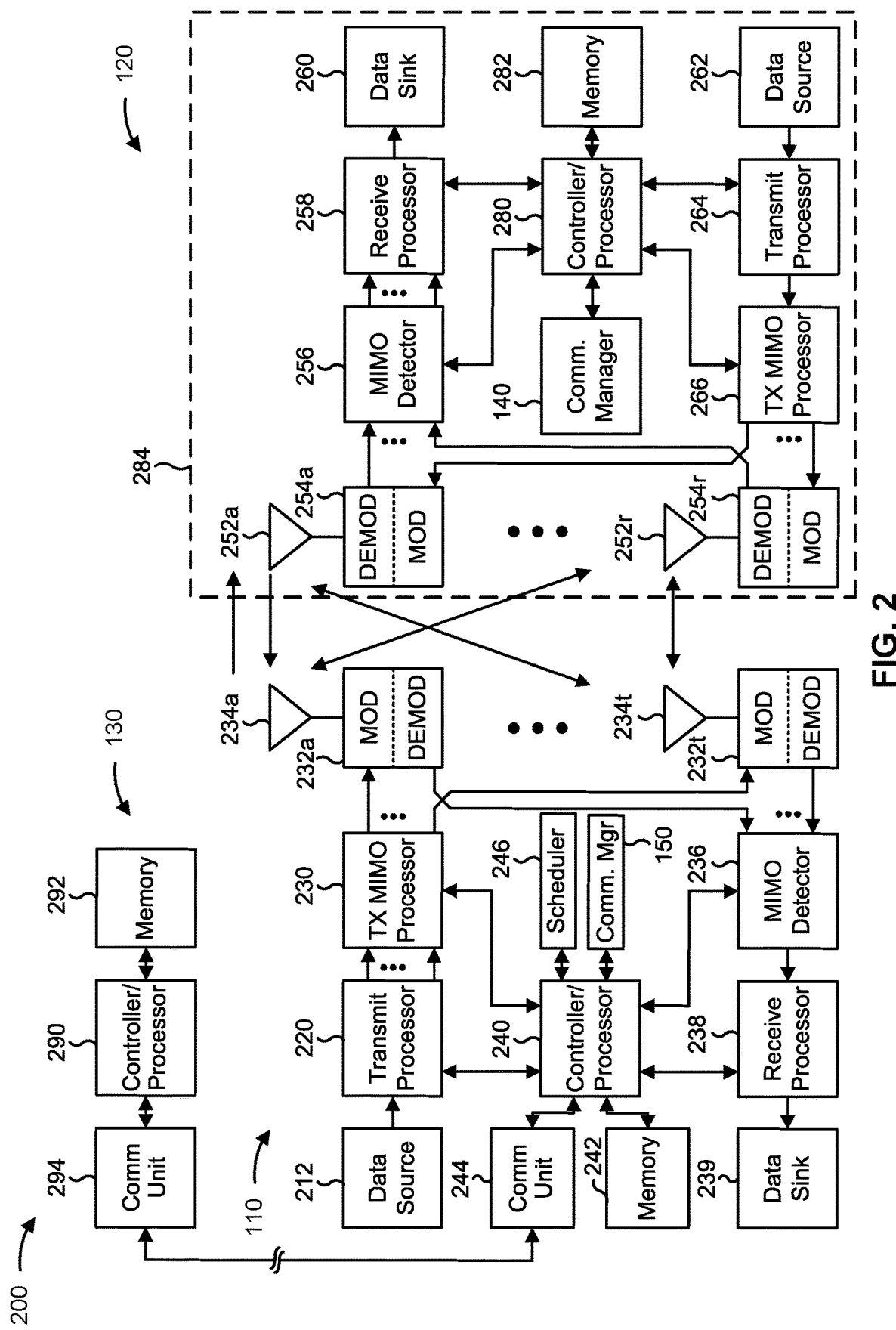
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-22).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-22).

The controller/processor 240 of the base station 110, controller/processor 280 of the UE 120, and/or any other component(s) of FIG. 2 may perform one or more techniques associated with sidelink measurement configuration and reporting, as described in more detail elsewhere herein. For example, the controller/processor 240 of the base station 110, the controller/processor 280 of the UE 120, and/or any other component(s) of FIG. 2 may perform or direct operations of, for example, process 1500 of FIG. 15, process 1600 of FIG. 16, process 1700 of FIG. 17, process 1800 of FIG. 18, process 1900 of FIG. 19, process 2000 of FIG. 20, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1500 of FIG. 15, process 1600 of FIG. 16, process 1700 of FIG. 17, process 1800 of FIG. 18, process 1900 of FIG. 19, process 2000 of FIG. 20, and/or other processes as described herein. In some examples, executing instructions may include running the instructions, converting the instructions, compiling the instructions, and/or interpreting the instructions, among other examples.

In some aspects, the UE 120 includes means for receiving an activated UE relay measurement configuration that includes one or more first sidelink measurement parameters; means for receiving a deactivated UE relay measurement configuration that includes one or more second sidelink measurement parameters, wherein values for the one or more first sidelink measurement parameters and values for the one or more second sidelink measurement parameters are different; and/or means for performing one or more sidelink measurements based at least in part on at least one of the activated UE relate measurement configuration or the deactivated UE relay measurement configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first UE 120 includes means for performing one or more sidelink measurements of one or more sidelink reference signals associated with a second UE; means for transmitting, to a network node, a sidelink measurement report that indicates results for the one or more sidelink measurements; and/or means for receiving, from the network node, an indication to transition to a sidelink UE relay mode for operation as a sidelink UE relay between the network node and the second UE, wherein the indication to transition to the sidelink UE relay mode is based at least in part on the results of the one or more sidelink measurements. The means for the first UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first UE 120 includes means for transmitting one or more sidelink reference signals; means for receiving, from a second UE, a sidelink measurement report that indicates results for one or more sidelink measurements of the one or more sidelink reference signals; and/or means for transmitting the sidelink measurement report to a network node. The means for the first UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first UE 120 includes means for performing one or more sidelink measurements of one or more sidelink reference signals associated with a second UE; and/or means for transmitting, to a network node, a sidelink measurement report that indicates: results for the one or more sidelink measurements, and a selected sidelink UE relay mode for the second UE to operate as a relay UE between the first UE and the network node. The means for the first UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first UE 120 includes means for transmitting one or more sidelink reference signals; means for receiving, from a second UE, a sidelink measurement report that indicates results for one or more sidelink measurements of the one or more sidelink reference signals; means for transmitting the sidelink measurement report to a network node; and/or means for receiving, from the network node, an indication to transition to a sidelink UE relay mode for operation as a sidelink UE relay between the network node and the second UE, wherein the indication to transition to the sidelink UE relay mode is based at least in part on the results of the one or more sidelink measurements. The means for the first UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 or another network node includes means for receiving a sidelink measurement report; and/or means for transmitting, to a first UE, an indication to transition to a sidelink UE relay mode that based at least in part on based at least in part on the sidelink measurement report, wherein the sidelink UE relay mode is for the first UE to operate as a sidelink UE relay between the network node and a second UE. In some aspects, the means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
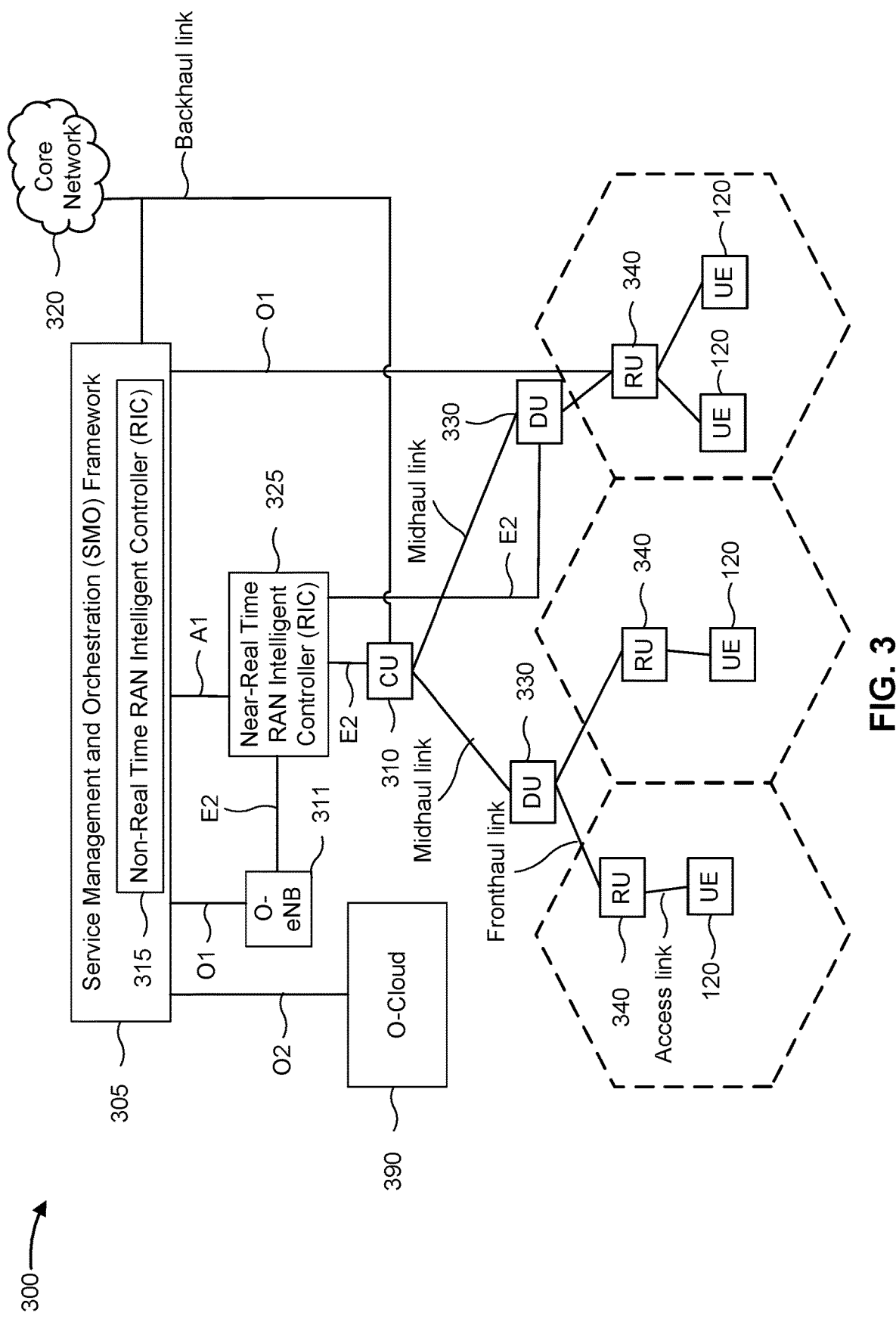
FIG. 3 is an example of a disaggregated base station architecture, in accordance with the present disclosure.

FIG. 3 is an example of a disaggregated base station architecture 300, in accordance with the present disclosure. The disaggregated base station architecture 300 shown in FIG. 3 may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
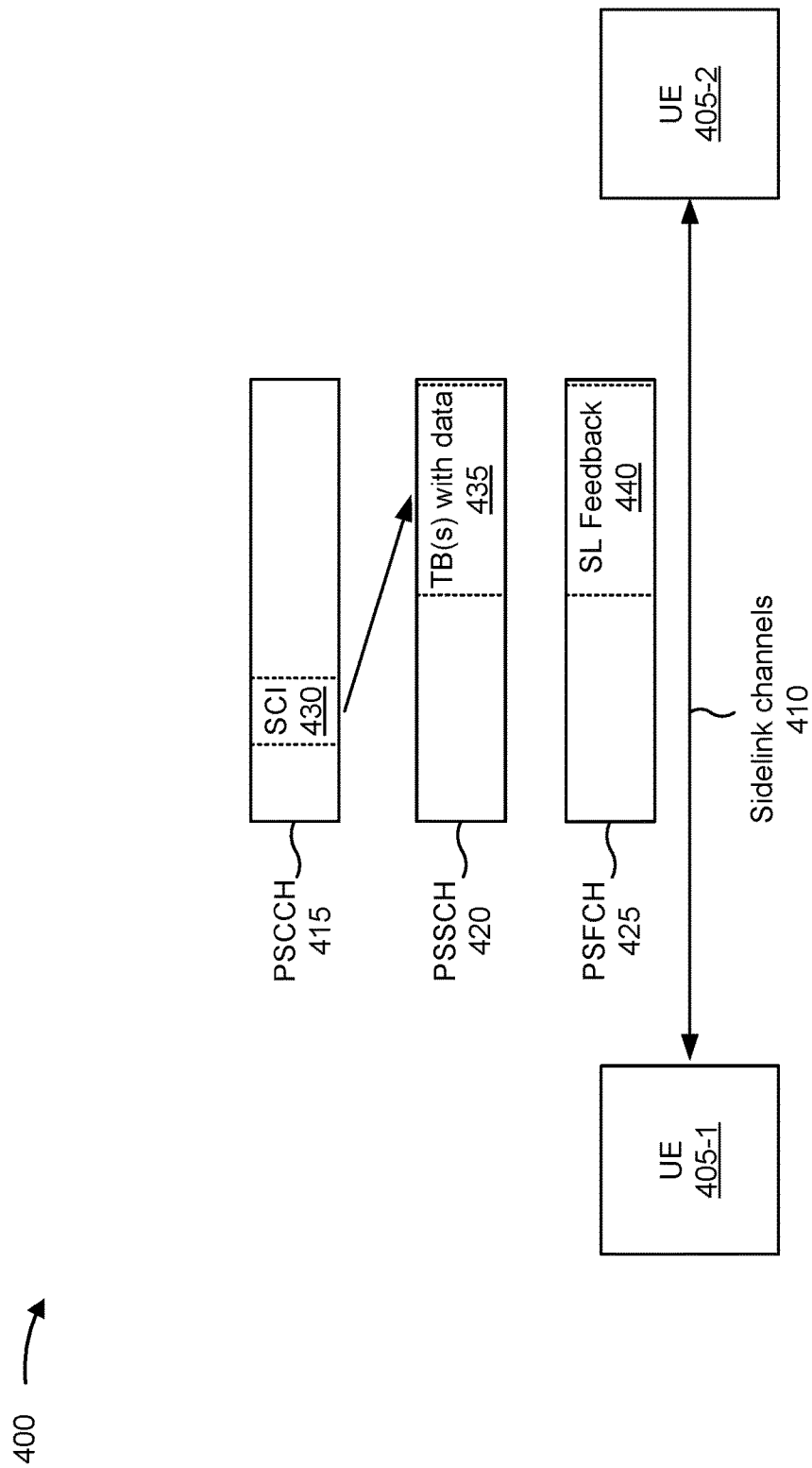
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), and/or a scheduling request.

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process identifier (ID), a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in an RRC message, such as for configured grants) from the base station 110 for sidelink channel access and/or scheduling.

In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a specified set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

To receive a sidelink packet, a receiving sidelink UE may perform blind decoding on all sidelink subchannels. The quantity of subchannels may be small (e.g., 1-27 subchannels) such that blind decoding on all subchannels is still feasible. A transmitting sidelink UE may transmit a PSCCH communication and a PSSCH communication within a same slot. The PSSCH communication may occupy up to $N_{subchannel}^{SL}$ contiguous subchannels. The PSCCH communication may occupy up to one subchannel with the lowest subchannel index. The transmitting sidelink UE may transmit a first stage SCI in the PSCCH communication with information about the PSSCH bandwidth and resource reservations in future slots. The receiving sidelink UE may receive and decode a second stage SCI after decoding the PSCCH communication, where the source ID identifies the transmitting sidelink UE and the destination ID identifies the receiving sidelink UE.

As indicated above, FIG. 4 is provided as an example. Other examples may differ from what is described with respect to FIG. 4.

Figure 5:
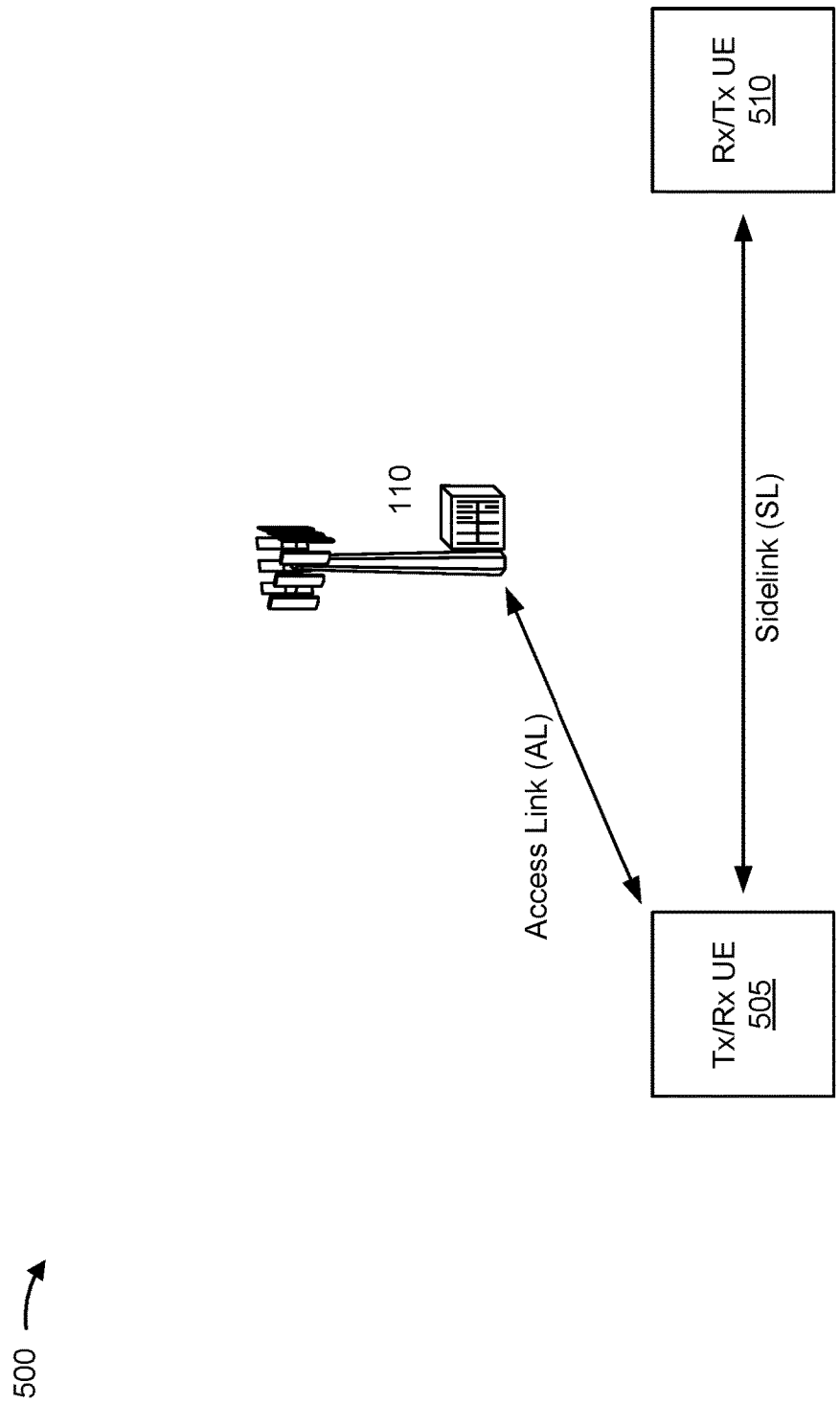
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. The Tx/Rx UE 505 may correspond to the UE 120a in FIG. 1 and one of the UE 405-1 or the UE 405-2 in FIG. 4. The Rx/Tx UE 510 may correspond to the UE 120e in FIG. 1 and one of the UE 405-1 or the UE 405-2 in FIG. 4.

As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via an interface that is referred to as a PC5 interface) may be referred to as a sidelink, and a direct link between a base station 110 and a UE 120 (e.g., via an interface that is referred to as a Uu interface) may be referred to as an access link. Sidelink communications may be transmitted via the sidelink, and access link communications may be transmitted via the access link. An access link communication may be either a downlink communication (from a base station 110 to a UE 120) on a downlink or an uplink communication (from a UE 120 to a base station 110) on an uplink.

As indicated above, FIG. 5 is provided as an example. Other examples may differ from what is described with respect to FIG. 5.

As described above, a UE may relay or forward wireless communications for another UE. This type of UE is referred to as a relay UE or a sidelink UE relay. In some cases, a UE may be active for forwarding or relaying wireless communications for another UE.I In other cases, a UE may be deactivated for forwarding and relaying wireless communications, and not forward or relay wireless communications for another UE. Using the same reference signal transmission and measurement configuration for both of these operating modes may result in increased signaling and processing overhead, and/or reduced sidelink relay performance (e.g., reduced throughput, reduced reliability, increased latency). Moreover, switching between these operating modes (e.g., active and deactivated) may result in increased latency and delays in forwarding and/or relaying wireless communications for the other UE.

Some aspects described herein provide sidelink measurement configuration and reporting for a sidelink UE relay. In some aspects described herein, separate (and/or different) configurations are used by a relay UE for different sidelink UE relay modes. For example, the relay UE may operate according to an activated UE relay measurement configuration when operating in an activated sidelink UE relay mode, and the relay UE may operate according to a deactivated UE relay measurement configuration when operating in a deactivated sidelink UE relay mode. In this way, reference signal transmission, measurement, and/or reporting may be optimized for each sidelink UE relay mode for the relay UE. This enables the relay UE to prioritize signaling overhead reduction when operating in the deactivated sidelink UE relay mode, and to prioritize beam refinement and sidelink performance when operating in the activated sidelink UE relay mode, among other examples. For example, reference signal transmission, measurement, and/or reporting may be optimized by configuring more frequent reference signal transmissions and more frequent measurement reporting for a relay UE that is operating in the activated sidelink UE relay mode to support beam refinement and beam tracking to reduce latency and increase sidelink signal quality and reliability. As another example, reference signal transmission, measurement, and/or reporting may be optimized by configuring less frequent reference signal transmissions and less frequent measurement reporting for a relay UE that is operating in the deactivated sidelink UE relay mode to support power saving and reduced signaling overhead (which conserves wireless network resources and enables the conserved wireless network resources to be used for other purposes).

In some aspects described herein, the relay UE is configured to operate in a candidate sidelink UE relay mode. The candidate sidelink UE relay mode may be a hybrid of the deactivated sidelink UE relay mode and the activated sidelink UE relay mode in that the relay UE does not actively forward and/or relay wireless communications for another UE, but still maintains a refined set of sidelink beams when operating in the candidate sidelink UE relay mode. In this way, the relay UE can more quickly transition from the candidate sidelink UE relay mode to the activated sidelink UE relay mode than from the deactivated sidelink UE relay mode to the activated sidelink UE relay mode. This reduced latency enables the relay UE to start forwarding and/or relaying wireless communications for another UE more quickly, which reduces latency in wireless communication for the other UE.

Figure 6:
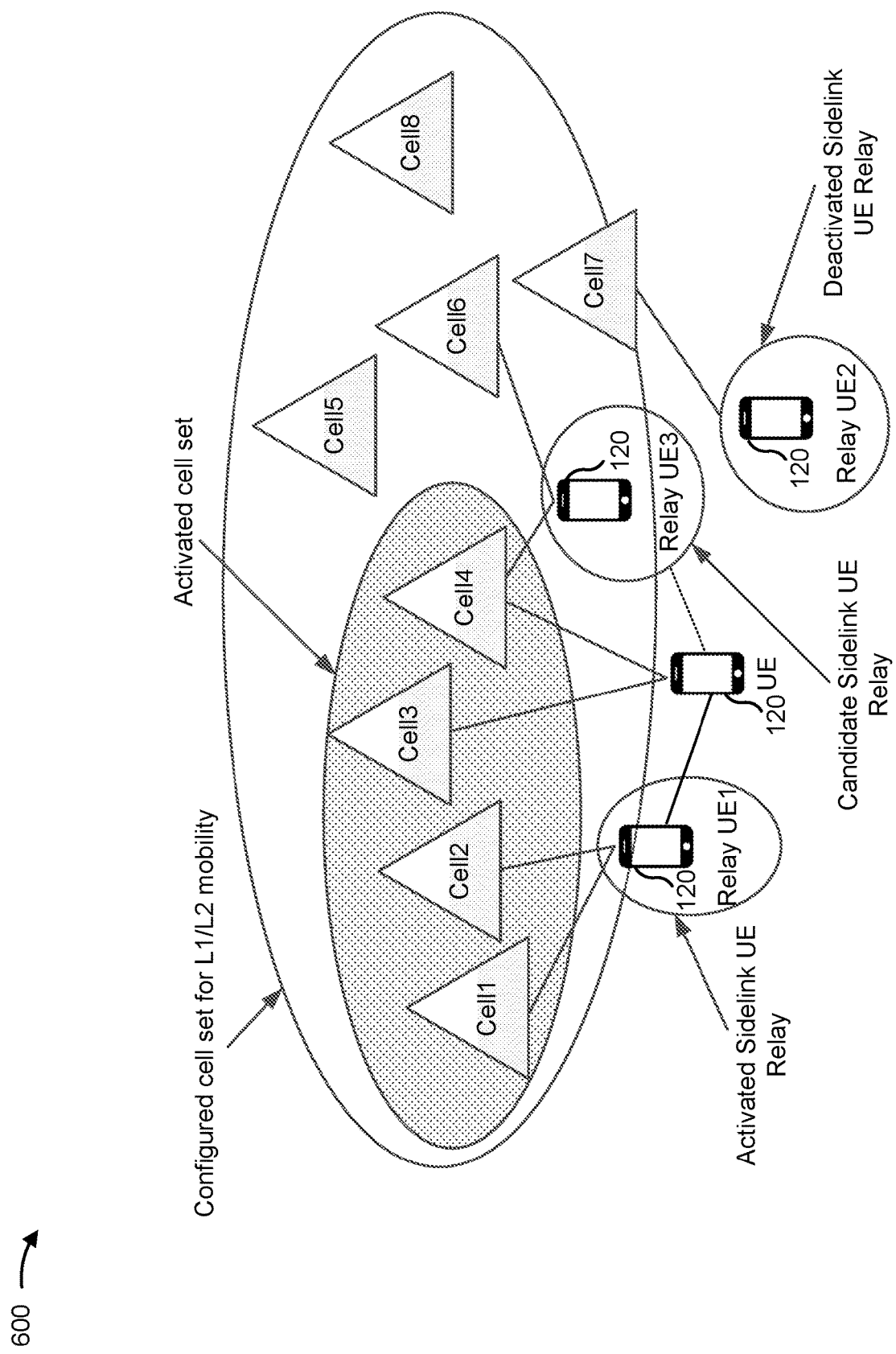
FIG. 6 is a diagram illustrating an example of relay UEs, in accordance with the present disclosure.

FIG. 6 is a diagram illustrating an example 600 of relay UEs, in accordance with the present disclosure. Example 600 shows cells that may be part of a configured cell set for Layer 1 (L1)/Layer 2 (L2) mobility. Active cells may be part of an activated cell set. The cells illustrated in FIG. 5 may be provided by one or more base stations 110 included in the wireless network 100. Moreover, the UEs illustrated in the example 600 may include one or more UEs 120 of FIG. 1, one or more of the UE 405-1 and/or the UE 405-2 of FIG. 4, and/or the Tx/Rx UE 505 and/or the Rx/Tx UE 510, among other examples.

A sidelink UE may use L1/L2 signaling to select one or more sidelink UEs that are connected to the same base station (e.g., same active cell set) to serve as sidelink UE relay(s). A sidelink UE relay may refer to a first UE that is capable of communicating with a second UE to forward wireless communications between the second UE and a network node such as a base station 110 or a third UE. As an example, the first UE may have a capability to receive wireless communications on a sidelink (and/or PC5 interface) from the second UE and may have a capability to forward the wireless communications to a base station 110 on an access link (and/or a Uu interface) to facilitate wireless communication between the second UE and the base station 110. As another example, the first UE may have a capability to receive wireless communications on an access link (and/or a Uu interface) from a base station 110 and may have a capability to forward the wireless communications to the second UE on a sidelink (and/or PC5 interface) to facilitate wireless communication between the second UE and the base station 110.

As another example, the first UE may have a capability to receive wireless communications on a sidelink (and/or PC5 interface) from the second UE and may have a capability to forward the wireless communications to the third UE on another sidelink (and/or PC5 interface) to facilitate wireless communication between the second UE and the third UE. As another example, the first UE may receive wireless communications on a sidelink (and/or PC5 interface) from the third UE and may forward the wireless communications to the second UE on another sidelink (and/or PC5 interface) to facilitate wireless communication between the second UE and the third UE.

The relay UEs may be part of a configured UE relay set. For example a relay UE1 (and/or one or more other relay UEs) may be included in an activated UE relay set. These relay UEs may be referred to as activated sidelink UE relays in that these UEs operate in an activated UE relay mode. A UE that operates in the activated UE relay mode may be configured to forward and/or relay wireless communications between a UE 120 and a network node of a cell in the activated cell set. Moreover, a UE that operates in the activated UE relay mode may maintain a set of refined beams (e.g., refined transmit beams, refined receive beams) between the UE and one or more another UEs for forwarding and/or relaying wireless communications for the other UE(s).

As another example, a relay UE2 (and/or one or more other relay UEs) may be included in a deactivated UE relay set. These relay UEs may be referred to as deactivated sidelink UE relays in that these UEs operate in a deactivated UE relay mode. A UE that operates in the deactivated UE relay mode does not actively forward or relay wireless communications for another UE. Moreover, a UE that operates in the deactivated UE relay mode may maintain one or more unrefined beams (e.g., one or more unrefined transmit beams, one or more unrefined receive beams) between the UE and one or more another UEs.

A UE that operates in the deactivated UE relay mode may or may not have an established sidelink connection with another UE. A "standalone sidelink" may refer to an active sidelink connection, between a relay UE and another UE, that is used for purposes other than forwarding and/or relaying wireless communications for the other UE. A relay UE and another UE may maintain a standalone sidelink regardless of whether the relay UE operates in the deactivated sidelink UE relay mode for the other UE.

As another example, a relay UE3 (and/or one or more other relay UEs) may be included in a candidate UE relay set. These relay UEs may be referred to as candidate sidelink UE relays in that these UEs operate in a candidate UE relay mode. The size of the candidate UE relay set (e.g., the quantity of relay UEs included in the candidate UE relay set) may be configured as a tradeoff between measurement overhead and relay switch latency and may be based at least in part on a QoS of the relay service that is to be provided, among other examples. The candidate UE relay mode may be a hybrid UE relay mode that incorporates aspects of the activated sidelink UE relay mode and aspects of the deactivated sidelink UE relay mode. In particular, a UE that operates in the candidate UE relay mode does not actively forward or relay wireless communications for another UE (similar to a relay UE in the deactivated UE relay mode), but still maintains a set of refined beams (e.g., refined transmit beams and/or refined receive beams) for forwarding and/or relaying wireless communications for the other UE (similar to a relay UE in the activated UE relay mode). The UE may operate in the candidate UE relay mode as a result of being identified as a candidate UE relay for forwarding wireless communications between the other UE and a network node. In this way, the UE can more quickly transition from the candidate sidelink UE relay mode to the activated sidelink UE relay mode if the UE is selected to replace an activated sidelink UE relay for the other UE.

The above-described sidelink UE relay modes and associated beam pairing configurations may be configured on a UE-by-UE basis. As an example, a relay UE may operate in an activated sidelink UE relay mode for a first UE (e.g., and may forward and/or relay wireless communications for the first UE), and may operate in a deactivated sidelink UE relay mode for a second UE. As another example, the relay UE3 may operate in a candidate sidelink UE relay mode for a first UE, may operate in a deactivated sidelink UE relay mode for a second UE and may operate in an activated sidelink UE relay mode for a third UE. Other configurations of multiple sidelink UE relay modes for a relay UE are within the scope of the present disclosure.

As indicated above, FIG. 6 is provided as an example. Other examples may differ from what is described with regard to FIG. 6.

Figure 7:
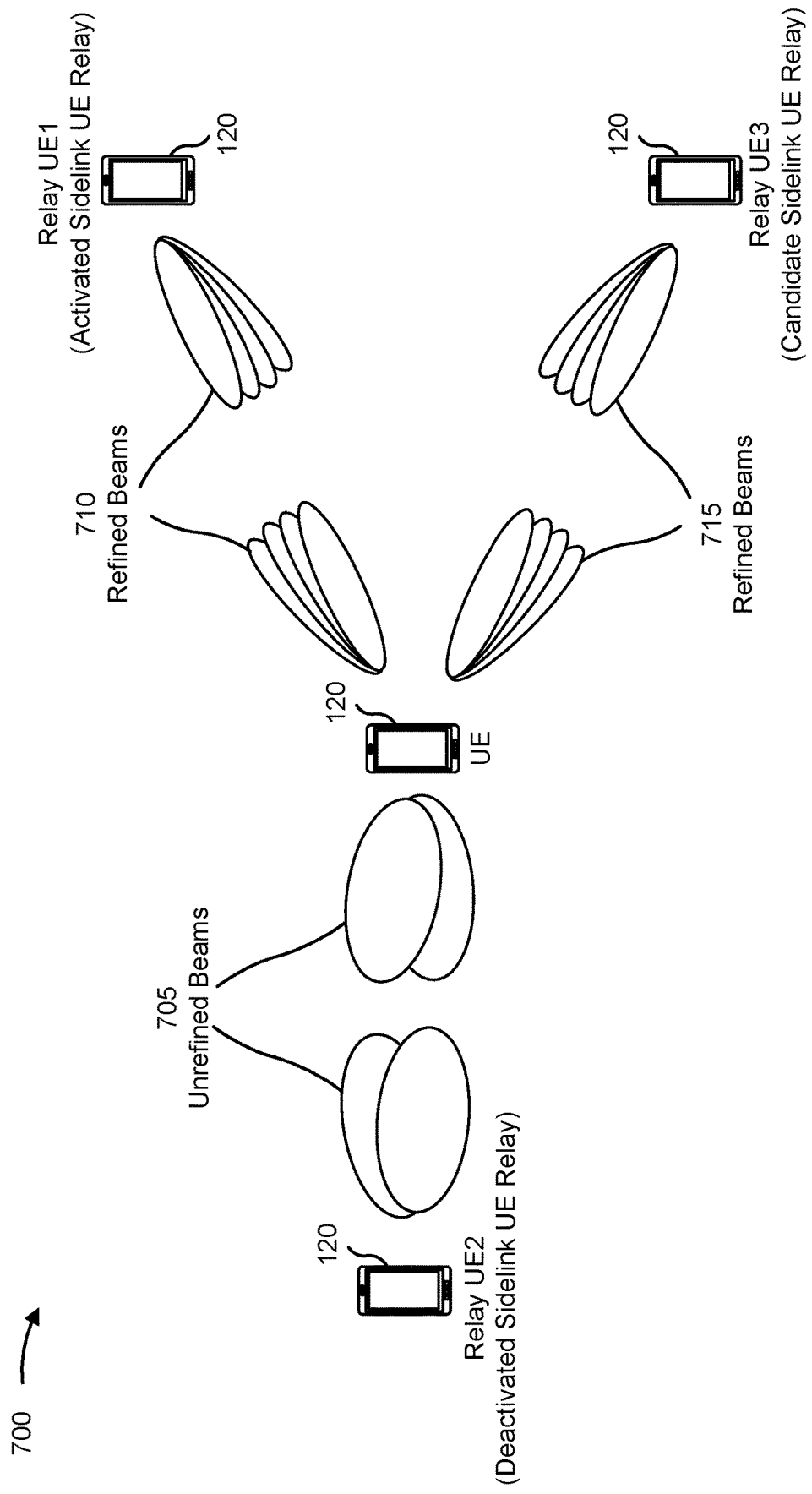
FIG. 7 is a diagram illustrating an example of relay UE beam refinement, in accordance with the present disclosure.

FIG. 7 is a diagram illustrating an example 700 of relay UE beam refinement, in accordance with the present disclosure. As shown in FIG. 7, the example 700 may include a plurality of UEs 120. A subset of the UEs 120 include relay UEs (e.g., sidelink UE relays, such as the relay UE1, the relay UE2, the relay UE3, and/or another relay UE) that have a capability to forward and/or relay wireless communications for a UE 120.

As shown in FIG. 7, UEs that communicate on a sidelink may maintain a set of beam pairs (referred to as beam pair links (BPLs)), where each beam pair may include a sidelink transmit beam and a sidelink receive beam. Sidelink beam pairing may be performed using reference signal measurements on a sidelink for identifying and/or refining beams. Beam pairs may be established in one or more sidelink UE relay modes, such as one or more of the sidelink UE relay modes described above in FIG. 6. If a beam pair starts to worsen (e.g., as determined form the reference signal measurements), another (better) beam pair may be identified and used to replace the beam pair. A beam pair may "worsen" in that sidelink quality, reliability, coverage, and/or one or more wireless communication performance parameters may decrease and/or may decrease below a threshold. A "better" beam pair may have higher sidelink quality, higher reliability, larger coverage, and/or one or more wireless communication performance parameters that are greater than a worsening beam pair. Alternatively, if only a single beam pair is used, a sidelink beam failure recovery procedure may be performed (e.g., which may include a sidelink random access channel (RACH) procedure) to recover and/or reestablish the beam pair.

As shown in FIG. 7, the beam configuration for the UE 120 and an associated relay UE may depend on the sidelink UE relay mode in which the associated relay UE is operating. For the relay UE2 that is operating in the deactivated sidelink UE relay mode, the relay UE2 and the UE 120 may maintain sets of unrefined beams 705 (e.g., unrefined transmit beams and/or unrefined receive beams). The unrefined beams 705 may include wide beams and/or another type of beams that are maintained through the use of sparse or sporadic reference signal measurement. Here, the relay UE2 and/or the UE 120 maintain the unrefined beams 705 so that the sidelink between the relay UE2 and the UE 120 is kept alive. The relay UE2 and/or the UE 120 may transmit sidelink reference signals at a larger periodicity and/or on a lower frequency (e.g., an FR1 frequency) to reduce signaling overhead.

As described above, a relay UE and another UE 120 may maintain a standalone sidelink between the relay UE and the UE 120 for sidelink communication other than forwarding and/or relaying of wireless communication. In scenarios in which the relay UE2 and the UE 120 do not maintain a standalone sidelink, the relay UE2 and the UE 120 may exchange information through another UE 120 or a base station 110 (or another type of network node). In scenarios in which the relay UE2 and the UE 120 maintain a standalone sidelink, the relay UE2 and the UE 120 may exchange information on the standalone sidelink in addition to (and/or alternatively to) exchanging information through another UE 120 or a base station 110 (or another type of network node).

For the relay UE1 that is operating in the activated sidelink UE relay mode, the relay UE1 and the UE 120 may maintain sets of refined beams 710. The refined beams 710 may include narrow beams and/or beams that are spatially targeted to provide increased bandwidth and/or reduced latency. Here, the relay UE1 and/or the UE 120 maintain the refined beams 710 to maintain sufficient sidelink channel quality for sidelink communication. The relay UE1 and/or the UE 120 may transmit sidelink reference signals at a lesser periodicity (e.g., more frequently) to maintain more accurate and up-to-date sets of beam pairs.

For the relay UE3 that operates in the candidate sidelink UE relay mode, the relay UE3 and the UE 120 may maintain sets of refined beams 715 in a similar manner as if the relay UE 3 were operating in the activated sidelink UE relay mode. The relay UE3 may operate in the candidate sidelink UE relay mode in preparation for switching to the activated sidelink UE relay mode for the UE 120. In this way, the relay UE3 and the UE 120 maintain at least one set of refined beams while the relay UE3 operates in the candidate sidelink UE relay mode for fast switching and/or transitioning to the activated sidelink UE relay mode. This reduces latency and/or delay in switching and/or transitioning to the activated sidelink UE relay mode relative to if the relay UE3 were to switch and/or transition to the activated sidelink UE relay mode from the deactivated sidelink UE relay mode (where the relay UE3 and the UE 120 would otherwise have to go through the process of refining unrefined beams before the relay UE3 switches and/or transitions to the activated sidelink UE relay mode).

As indicated above, FIG. 7 is provided as an example. Other examples may differ from what is described with regard to FIG. 7.

Figure 8:
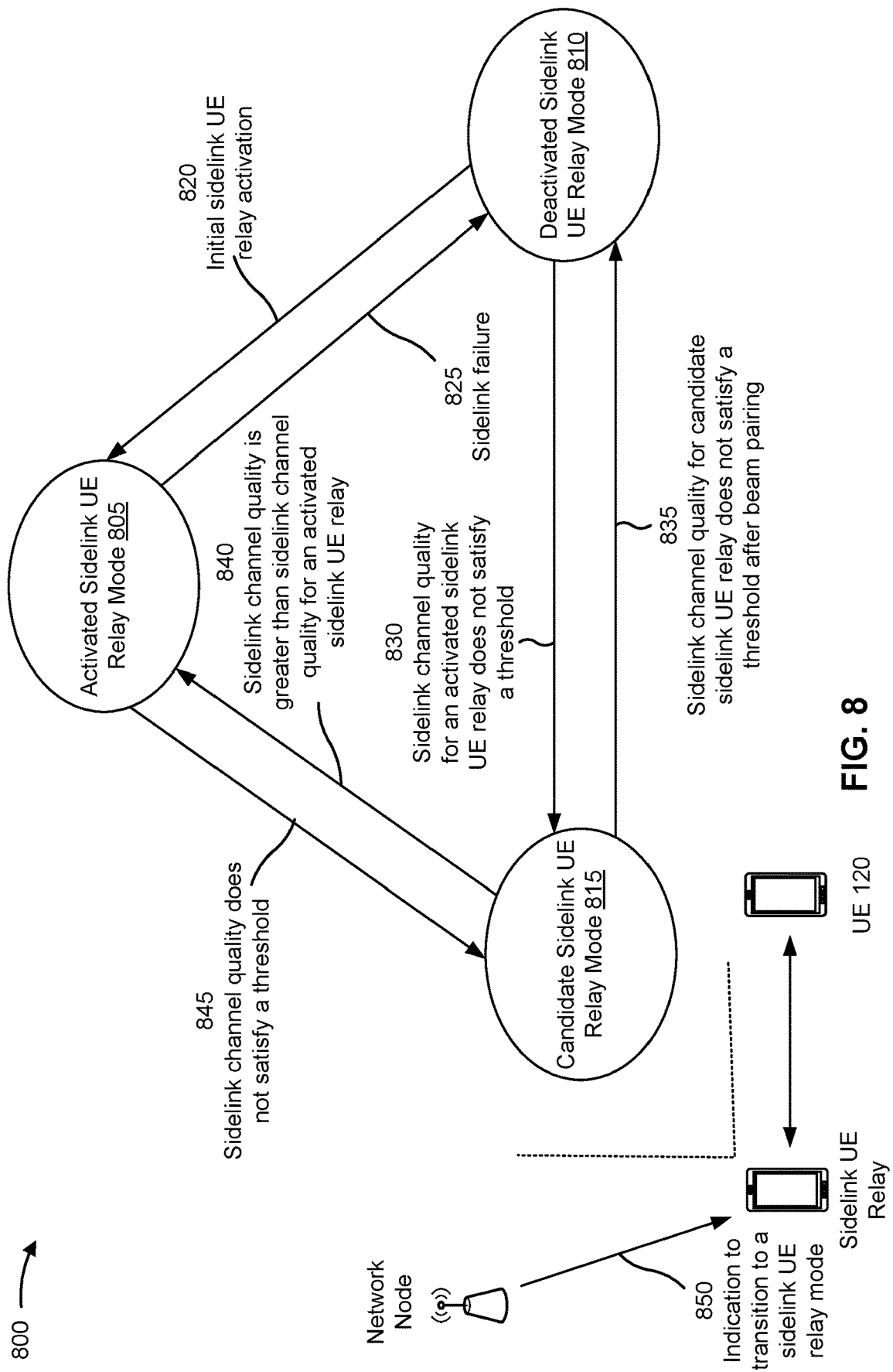
FIG. 8 is a diagram illustrating an example of sidelink UE relay modes, in accordance with the present disclosure.

FIG. 8 is a diagram illustrating an example 800 of sidelink UE relay modes, in accordance with the present disclosure. The sidelink UE relay modes may correspond to the sidelink UE relay modes described above in connection with FIGS. 6 and 7.

A sidelink UE relay (e.g., a UE 120, a UE 405-1 or 405-2, a Tx/Rx UE 505, a relay UE1, a relay UE2, or a relay UE3) may operate on one or more sidelink UE relay modes at a given time, such as an activated sidelink UE relay mode 805, a deactivated sidelink UE relay mode 810, and/or a candidate sidelink UE relay mode 815, among other examples. A sidelink UE relay may operate in a single one of these sidelink UE relay modes for another UE at a given time but may simultaneously operate in different sidelink UE relay modes for a plurality of UEs. For example, a sidelink UE relay may simultaneously operate in the activated sidelink UE relay mode 805 for one or more UEs, in the deactivated sidelink UE relay mode 810 for one or more UEs, and/or in the candidate sidelink UE relay mode 815 for one or more UEs.

As further shown in FIG. 8, a sidelink UE relay may transition between sidelink UE relay modes. For example, a sidelink UE relay may transition from the deactivated sidelink UE relay mode 810 to the activated sidelink UE relay mode 805. As another example, a sidelink UE relay may transition from the candidate sidelink UE relay mode 815 to the activated sidelink UE relay mode 805. As another example, a sidelink UE relay may transition from the deactivated sidelink UE relay mode 810 to the candidate sidelink UE relay mode 815. As another example, a sidelink UE relay may transition from the activated sidelink UE relay mode 805 to the candidate sidelink UE relay mode 815. As another example, a sidelink UE relay may transition from the activated sidelink UE relay mode 805 to the deactivated sidelink UE relay mode 810. As another example, a sidelink UE relay may transition from the candidate sidelink UE relay mode 815 to the deactivated sidelink UE relay mode 810.

Moreover, a UE 120 may transition from no sidelink UE relay mode into one of the sidelink UE relay modes illustrated in FIG. 8. In these cases, the UE 120 may transition from not being a sidelink UE relay into being a sidelink UE relay. Thus, the UE 120 may transition from not operating in a sidelink UE relay mode to operating in the activated sidelink UE relay mode 805, the deactivated sidelink UE relay mode 810, or the candidate sidelink UE relay mode 815.

At 820, as an example, a sidelink UE relay may transition from the deactivated sidelink UE relay mode 810 to the activated sidelink UE relay mode 805 as part of an initial sidelink UE relay activation procedure. Here, the sidelink UE relay may refine the sidelink beam pairs between the sidelink UE relay and the UE 120 for which the sidelink UE relay is to forward and/or relay wireless communications. At 825, a sidelink UE relay may transition from the activated sidelink UE relay mode 805 to the deactivated sidelink UE relay mode 810 based at least in part on a sidelink failure, a beam failure, and/or based at least in part on another factor or event.

At 830, a sidelink UE relay may transition from the deactivated sidelink UE relay mode 810 to the candidate sidelink UE relay mode 815 for a UE 120 based at least in part on a sidelink channel quality between the UE 120 an activated sidelink UE relay for the UE 120 not satisfying a threshold (e.g., a threshold RSRP, a threshold RSSI, a threshold CQI, a threshold RSRQ). In this way, the sidelink UE relay may refine the sidelink beam pairs between the sidelink UE relay and the UE 120 in preparation for transitioning to the activated sidelink UE relay mode 805 and forwarding and/or relaying wireless communications for the UE 120. At 835, a sidelink UE relay may transition from the candidate sidelink UE relay mode 815 to the deactivated sidelink UE relay mode 810 based at least in part on a sidelink channel quality for the sidelink UE relay not satisfying a threshold (e.g., a threshold RSRP, a threshold RSSI, a threshold CQI, a threshold RSRQ) after the beam pairing and/or beam refinement process.

At 840, a sidelink UE relay may transition from the candidate sidelink UE relay mode 815 to the activated sidelink UE relay mode 805 for a UE 120 based at least in part on a sidelink channel quality for the sidelink UE relay being greater than the sidelink channel quality for an activated sidelink UE relay associated with the UE 120. At 845, a sidelink UE relay may transition from the activated sidelink UE relay mode 805 for a UE 120 to the candidate sidelink UE relay mode 815 based at least in part on a sidelink channel quality between the UE 120 and the sidelink UE relay not satisfying a threshold (e.g., a threshold RSRP, a threshold RSSI, a threshold CQI, a threshold RSRQ).

At 850, a network node (e.g., a base station 110, a CU 310, an O-eNB 311, a DU 330, an RU 340) may transmit (and the sidelink UE relay may receive) an indication to transition to a particular sidelink UE relay mode for operating as a sidelink UE relay between the network node and another UE 120. The indication may include a switch command or another type of wireless communication.

The network node may transmit the indication to transition to a particular sidelink UE relay mode based at least in part on the one or more of the thresholds described above, based at least in part on one or more sidelink measurements associated with the sidelink on which the sidelink UE relay forwards and/or relays wireless communications for the other UE 120, and/or based on other criteria. The sidelink measurements may be performed by the sidelink UE relay and/or the other UE 120 and reported to the network node in a sidelink measurement report, such as one or more of the sidelink measurement reports described herein. For example, sidelink measurements may be performed by the sidelink UE relay and/or the other UE 120 and reported to the network node in a sidelink measurement report, such as one or more of the sidelink measurement reports as described in connection with FIGS. 9 and/or 11-14. In some aspects, the network node uses a machine learning model to determine whether to transition to a particular sidelink UE relay mode and/or uses a machine learning model to determine the particular sidelink UE relay mode.

In some aspects, the network node may transmit the indication to transition to a particular sidelink UE relay mode based at least in part on a switch recommendation, as described herein. The switch recommendation may be indicated in the sidelink measurement report and/or indicated in another wireless communication by the sidelink UE relay and/or by the other UE 120. The switch recommendation may include a recommendation or a selection for a particular sidelink UE relay mode. The selection of the particular sidelink UE relay mode may be made by the sidelink UE relay or may be made by the other UE 120. The switch recommendation may be included in the sidelink measurement report based at least in part on the sidelink UE relay and/or the other UE 120 determining that the current sidelink UE relay mode is different from the recommended or selected sidelink UE relay mode for the sidelink UE relay. For example, the sidelink UE relay (or the other UE 120) may include the switch recommendation based at least in part on determining that the recommended or selected sidelink UE relay mode is the candidate sidelink UE relay mode 815 and the sidelink UE relay is currently operating in the deactivated sidelink UE relay mode 810.

In some aspects, the network node and/or the other UE 120 may transmit the indication to transition to the particular sidelink UE relay mode based at least in part on the particular sidelink UE relay mode being different from the current sidelink UE relay mode in which the sidelink UE relay is operating. In some aspects, the network node and/or the other UE 120 considers the switch recommendation in addition to other criteria described herein when transmitting an indication to transition to a particular sidelink UE relay mode.

In some aspects, the network node and/or the other UE 120 may transmit the indication to transition to a particular sidelink UE relay mode based at least in part on whether one or more channel quality parameters associated with the access link between the network node and the sidelink UE relay satisfy a threshold (e.g., a threshold RSRP, a threshold RSSI, a threshold CQI, a threshold RSRQ). For example, if the RSRP or the CQI on the access link does not satisfy an associated threshold, the network node and/or the other UE 120 may transmit the indication to transition to the candidate sidelink UE relay mode 815 or the deactivated sidelink UE relay mode 810 so that another sidelink UE relay with a better access link connection to the network node can be activated as the sidelink UE relay for the other UE 120.

In some aspects, the network node and/or the other UE 120 may transmit the indication to transition to a particular sidelink UE relay mode based at least in part on an available power for the sidelink UE relay, a multi-panel capability (e.g., a quantity of available antenna panels that the sidelink UE relay can use for sidelink relaying and/or forwarding), a multi-beam operation capability (e.g., a quantity of available transmit beams and/or a quantity of available receive beams that the sidelink UE relay can use for sidelink relaying and/or forwarding), a location of the sidelink UE relay, a location of the other UE 120, a traffic load on the sidelink between the sidelink UE relay and the other UE 120, a traffic load on the access link between the sidelink UE relay and the network node, a sidelink discontinuous reception (DRX) configuration for the sidelink UE relay, and/or an access link DRX configuration for the sidelink UE relay, among other examples.

As an example, the other UE 120 may recommend that the sidelink UE relay be transitioned to the activated sidelink UE relay mode 805 based at least in part on the channel quality for the sidelink UE relay being greater relative the channel quality for the sidelink UE relay currently serving the other UE 120. As another example, the other UE 120 may recommend that the sidelink UE relay be transitioned to the activated sidelink UE relay mode 805 based at least in part on the traffic load for the sidelink UE relay being lesser relative the channel quality for the sidelink UE relay currently serving the other UE 120. As another example, the other UE 120 may recommend that the sidelink UE relay be transitioned to the activated sidelink UE relay mode 805 based at least in part on the location of the sidelink UE relay being closer to the other UE 120 and/or closer to the network node relative to the sidelink UE relay currently serving the other UE 120. As another example, the other UE 120 may recommend that the sidelink UE relay be transitioned to the activated sidelink UE relay mode 805 based at least in part on the available power for the sidelink UE relay being greater relative the available power for the sidelink UE relay currently serving the other UE 120. As another example, the other UE 120 may recommend that the sidelink UE relay be transitioned to the activated sidelink UE relay mode 805 based at least in part on the quantity of available antenna panels for the sidelink UE relay being greater relative the quantity of available antenna panels for the sidelink UE relay currently serving the other UE 120. As another example, the other UE 120 may recommend that the sidelink UE relay be transitioned to the activated sidelink UE relay mode 805 based at least in part on the quantity of available transmit beams and/or receive beams for the sidelink UE relay being greater relative the quantity of available transmit beams and/or receive beams for the sidelink UE relay currently serving the other UE 120.

As indicated above, FIG. 8 is provided as an example. Other examples may differ from what is described with regard to FIG. 8.

Figure 9:
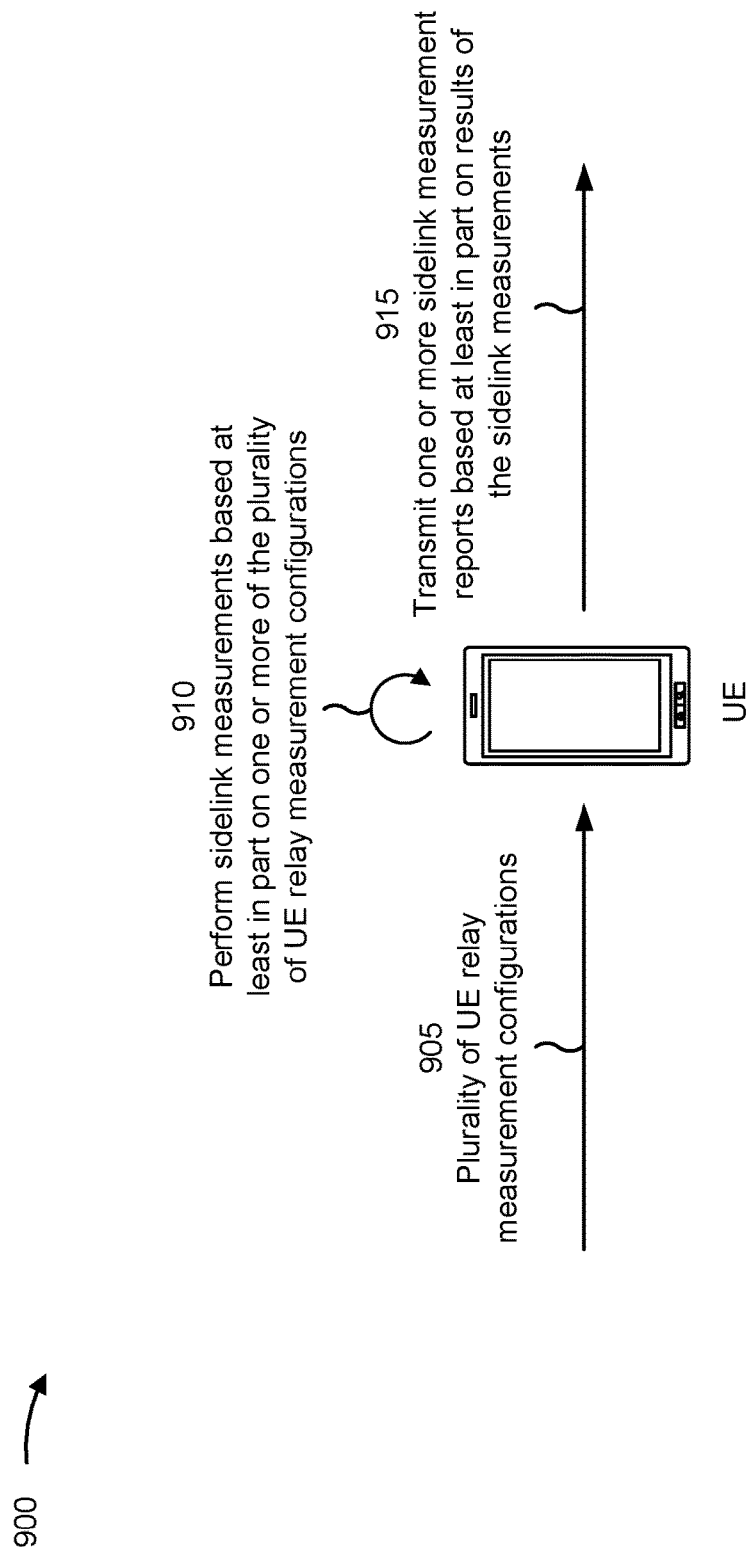
FIGS. 9-14 are diagrams illustrating examples of sidelink measurement configuration and reporting, in accordance with the present disclosure.

FIG. 9 is a diagram illustrating an example 900 of sidelink measurement configuration and associated reporting for a sidelink UE relay, in accordance with the present disclosure. The example 900 may include an example of receiving a plurality of UE relay measurement configurations, performing sidelink measurements based at least in part on one or more of the plurality of UE relay measurement configurations, and providing one or more sidelink measurement reports based at least in part on results of the sidelink measurements.

As shown in FIG. 9, the example 900 may include a UE. In some aspects, the UE may include a sidelink UE relay (e.g., a UE 120, a UE 405-1 or 405-2, a Tx/Rx UE 505, a relay UE1, a relay UE2, or a relay UE3). The sidelink UE relay UE may be configured to forward and/or relay wireless communications between another UE 120 and a network node a network node (e.g., a base station 110, a CU 310, an O-eNB 311, a DU 330, an RU 340) when operating in an activated sidelink UE relay mode 805. In some aspects, the UE may include a UE 120 (e.g., a UE 405-1 or 405-2, an Rx/Tx UE 510) for which a sidelink UE relay is to forward and/or relay wireless communications to and/or from a network node.

At 905, the UE may receive a plurality of UE relay measurement configurations. The UE may receive one or more of the plurality of UE relay measurement configurations from a network node, from another UE 120, and/or from another wireless communication device. At 910, the UE may perform sidelink measurements based at least in part on one or more of the plurality of UE relay measurement configurations. The UE may perform the sidelink measurements of sidelink reference signals and/or other types of sidelink communications transmitted by the other UE 120. At 915, the UE may transmit one or more sidelink measurement reports based at least in part on results of the sidelink measurements. The UE may transmit the one or more sidelink measurement reports to the network node and/or to the other UE 120. The network node may use the one or more sidelink measurement reports to determine a sidelink UE relay mode for the UE or for an associated sidelink UE relay, may use the one or more sidelink measurement reports to provide the UE (or an associated sidelink UE relay) with a switch command to transition to a particular sidelink UE relay mode, and/or for another purpose.

The plurality of UE relay measurement configurations may include respective UE relay measurement configurations for different sidelink UE relay modes for a sidelink UE relay (e.g., which may be the UE in FIG. 9 or a sidelink UE relay associated with the UE in FIG. 9). For example, the plurality of UE relay measurement configurations may include an activated UE relay measurement configuration that is to be used by the UE when the sidelink UE relay is operating in an activated sidelink UE relay mode 805. As another example, the plurality of UE relay measurement configurations may include a deactivated UE relay measurement configuration that is to be used by the UE when the sidelink UE relay is operating in a deactivated sidelink UE relay mode 810. As another example, the plurality of UE relay measurement configurations may include a candidate UE relay measurement configuration that is to be used by the UE when the sidelink UE relay is operating in a candidate sidelink UE relay mode 815.

Each UE relay measurement configuration may include one or more sidelink measurement parameters. The one or more sidelink measurement parameters included in a UE relay measurement configuration may be used by the UE to perform the sidelink measurements and/or to generate and transmit the sidelink measurement report(s) when the sidelink UE relay is operating in an associated sidelink UE relay mode. For example, the activated UE relay measurement configuration may include one or more sidelink measurement parameters that are to be used by the UE for performing sidelink measurements and/or for generating and transmitting sidelink measurement report(s) when the sidelink UE relay is operating in the activated sidelink UE relay mode 805. As another example, the deactivated UE relay measurement configuration may include one or more sidelink measurement parameters for performing sidelink measurements and/or for generating and transmitting sidelink measurement report(s) when the sidelink UE relay is operating in a deactivated sidelink UE relay mode 810. As another example, the candidate UE relay measurement configuration may include one or more sidelink measurement parameters for performing sidelink measurements and/or for generating and transmitting sidelink measurement report(s) when the sidelink UE relay is operating in a candidate sidelink UE relay mode 815.

The sidelink measurement parameter(s) included in a UE relay measurement configuration may include, for example, the time domain resource(s) in which the UE is to perform sidelink measurements (e.g., symbols, slots, frames), the frequency domain resource(s) in which the UE is to perform sidelink measurements (e.g., resource elements, resource blocks, subchannels, subcarriers, component carriers), the types of sidelink reference signals for which the UE is to perform sidelink measurements, the types of sidelink measurements that are to be performed, the periodicity of the sidelink reference signals, the quantity of beam pairs that the UE is to maintain and/or for which the UE is to perform sidelink measurements, the frequency range in which the UE is to perform sidelink measurements (e.g., FR1, FR2), a periodicity for performing sidelink measurements, and/or another parameter for performing sidelink measurements.

The types of sidelink reference signals may include, for example, a sidelink CSI reference signal (CSI-RS), a sidelink DMRS, and/or another type of sidelink reference signal. The periodicity for performing sidelink measurements may be indicated as periodic (and the associated periodicity for the periodic sidelink measurements), aperiodic, and/or semi-static. Moreover, a UE relay measurement configuration may indicate a measurement trigger for performing the sidelink measurements. When the UE determines that a measurement trigger has occurred, the UE may start performing the sidelink measurements.

In some aspects, a network node configures a sidelink CSI-RS for sidelink measurement by the UE. The network node may allocate sidelink resources (e.g., time domain resources, frequency domain resources, transmit beams, receive beams) for the sidelink CSI-RS in Mode 1 sidelink (e.g., which is described above in connection with FIG. 4). The network node can configure the interval and the quantity of sidelink CSI-RSs that are to be transmitted, and the UE and/or another UE 120 that is to transmit the sidelink CSI-RSs may determine the resources for the sidelink CSI-RSs that satisfies the network node configured interval and amount for Mode 2 sidelink (e.g., which is described above in connection with FIG. 4). The network node may transmit the UE relay measurement configuration that includes this information to the UE on an access link or through the other UE 120. The network node may also transmit the UE relay measurement configuration to the other UE 120 through the access link, or through the UE.

The types of sidelink measurements may include, for example, a sidelink RSRP measurement of a sidelink reference signal, a sidelink RSRQ measurement of a sidelink reference signal, a sidelink RSSI measurement of a sidelink reference signal or another sidelink communication, a sidelink CQI measurement of a sidelink reference signal or another sidelink communication, a sidelink signal to interference plus noise ratio (SINR) measurement of a sidelink reference signal or another sidelink communication, a sidelink latency measurement of a sidelink reference signal or another sidelink communication, and/or another type of sidelink measurement.

The sidelink measurement parameter(s) included in a UE relay measurement configuration may additionally and/or alternatively include, for example, the content that is to be included in a sidelink measurement report, the type of sidelink measurement report that is to be transmitted, and/or another sidelink measurement parameter for generating and transmitting a sidelink measurement report. The content may include types of sidelink measurements for which results are to be included in the sidelink measurement report. In some aspects, the sidelink measurement parameter(s) may indicate that results of sidelink RSRP measurements are to be included, results of sidelink RSRQ measurements are to be included, results of latency measurements are to be included, and/or results of sidelink SINR measurements are to be included, among other examples.

In some aspects, the sidelink measurement parameter(s) may indicate that results of a sidelink measurement are to be included only if the results for the sidelink measurement satisfy a threshold. For example, the sidelink measurement parameter(s) may indicate that results of a sidelink RSRP measurement are to be included in a sidelink measurement report only if the results of the sidelink RSRP measurement are equal to or less than a sidelink RSRP threshold, or if the results of the sidelink RSRP measurement are equal to or greater than a sidelink RSRP threshold.

In some aspects, the sidelink measurement parameter(s) may indicate that results for a sidelink measurement are to be indicated in a sidelink measurement report as an absolute measurement result or as a relative measurement result. An absolute measurement result may include an actual measurement value (e.g., 30 millisecond latency for a latency measurement). A relative measurement result may include a measurement value that is relative to a reference measurement value. For example, a relative measurement result may be indicated as −3 dB, which is −3 dB relative to a 20 dB reference measurement value (e.g., such that the actual measurement value interpreted by the recipient of the sidelink measurement report is 17 dB).

In some aspects, the type of sidelink measurement report that is to be transmitted may include a periodic sidelink measurement report and an associated periodicity at which the periodic sidelink measurement report is to be transmitted (e.g., every $5^{th}$ slot). In some aspects, the type of sidelink measurement report that is to be transmitted may include a semi-persistent sidelink measurement report. Here, the sidelink measurement parameter(s) may indicate a starting time, an ending time (or reporting duration), and an associated periodicity at which the periodic sidelink measurement report is to be transmitted during the reporting duration. In some aspects, the type of sidelink measurement report that is to be transmitted may include an aperiodic sidelink measurement report and one or more associated reporting triggers. The reporting triggers may include a channel quality threshold and/or another reporting trigger.

As an example, the UE may determine that sidelink channel quality, on a sidelink for which the UE is performing the sidelink measurement(s), satisfies a channel quality threshold. Accordingly, the UE may determine that a reporting trigger has occurred and may transmit a sidelink measurement report based at least in part on determining that the reporting trigger has occurred. The UE may determine that sidelink channel quality, on a sidelink for which the UE is performing the sidelink measurement, satisfies a channel quality threshold based at least in part on results of the sidelink measurements that are performed on the sidelink. The channel quality threshold (or another reporting trigger threshold) may be an absolute value or a relative value.

Additionally and/or alternatively, an aperiodic sidelink measurement report may be triggered by a network node or another UE 120. For example, a network node may receive a sidelink measurement report associated with a sidelink between a sidelink UE relay (e.g., that is operating in an activated sidelink UE relay mode 805) and an associated UE 120. The network node may determine, based at least in part on the sidelink measurement report, that channel quality on the sidelink is worsening or does not satisfy a threshold. The network node may accordingly transmit an indication to another sidelink UE relay (e.g., that is operating in a deactivated sidelink UE relay mode 810 or in a candidate sidelink UE relay mode 815 for the UE 120) to provide an aperiodic sidelink measurement report (or a periodic sidelink measurement report). The indication may include a UE relay measurement configuration and/or a request for sidelink measurement report. In this way, the network node may cause the other sidelink UE relay to prepare to potentially take over as the activated sidelink UE relay for the UE 120 from the sidelink UE relay that is currently serving the UE 120.

In some aspects, a UE relay measurement configuration may indicate that the UE can (or is to) include a selected or recommended sidelink UE operating mode in a sidelink measurement report. The UE may accordingly generate and transmit a report that includes a selected or recommended sidelink UE operating mode. The UE may determine the selected or recommended sidelink UE operating mode as described above in connection with FIG. 8. For example the UE may determine the selected or recommended sidelink UE operating mode based at least in part on the sidelink measurements performed at 910.

In some aspects, two or more UE relay measurement configurations may include different sidelink measurement parameters. In some aspects, two or more UE relay measurement configurations may include the same sidelink measurement parameters. "Different" sidelink measurement parameters may refer to different types of sidelink measurement parameters. For example, a first UE relay measurement configuration may include a time domain resource for performing sidelink measurements and an indication that results for sidelink measurements are to be reported in a sidelink measurement report as absolute values, whereas a second UE relay measurement configuration may include a frequency domain resource for performing sidelink measurements and an indication of a periodicity for transmitting a sidelink measurement report (e.g., but not an indication of a time domain resource, and not an indication that results for sidelink measurements are to be reported in a sidelink measurement report as absolute values). Additionally and/or alternatively, "different" sidelink measurement parameters may refer to the same types of sidelink measurement parameters that are configured with different values. For example, a first UE relay measurement configuration and a second UE relay measurement configuration may both include an indication of a sidelink measurement type that is to be performed. However, the actual type indicated for the first UE relay measurement configuration and the second UE relay measurement configuration may be different (e.g., a sidelink RSRP measurement may be indicated for the first UE relay measurement configuration and a sidelink SINR measurement may be indicated for the second UE relay measurement configuration). In some aspects, a combination of different sidelink measurement parameter types and different sidelink measurement parameter values may be included in two or more UE relay measurement configurations.

The capability to include different sidelink measurement parameter types and/or different sidelink measurement parameter values in different UE relay measurement configuration parameters enables sidelink measurement and reporting for the UE to be improved and flexibly configured for different sidelink UE relay modes (e.g., either for the UE or for another UE 120 associated with the UE). For example, sidelink measurement parameter(s) in an activated UE relay measurement configuration and the sidelink measurement parameter(s) in a deactivated UE relay measurement configuration may be different to enable low overhead for sidelink measurement and reporting for an associated deactivated sidelink UE relay mode 810 and to enable beam refinement and beam pair maintenance for an associated activated sidelink UE relay mode 805. As an example, sidelink measurement parameter(s) in an activated UE relay measurement configuration may be configured such that the UE performs more frequent and/or more frequency dense sidelink measurements for an associated activated sidelink UE relay mode 805 relative to sidelink measurements for an associated deactivated sidelink UE relay mode 810.

In some aspects, the sidelink measurement parameter(s) in an activated UE relay measurement configuration and the sidelink measurement parameter(s) in a candidate UE relay measurement configuration may be the same to enable beam refinement and beam pair maintenance for an associated candidate sidelink UE relay mode 815. Alternatively, a separate candidate UE relay measurement configuration may be omitted, and the UE may use the activated UE relay measurement configuration for the associated candidate sidelink UE relay mode 815. In some aspects, the sidelink measurement parameter(s) in an activated UE relay measurement configuration and the sidelink measurement parameter(s) in a candidate UE relay measurement configuration may be the same to enable further tailoring of sidelink measurement parameters for different sidelink UE relay modes.

As indicated above, FIG. 9 is provided as an example. Other examples may differ from what is described with regard to FIG. 9.

Figure 10:
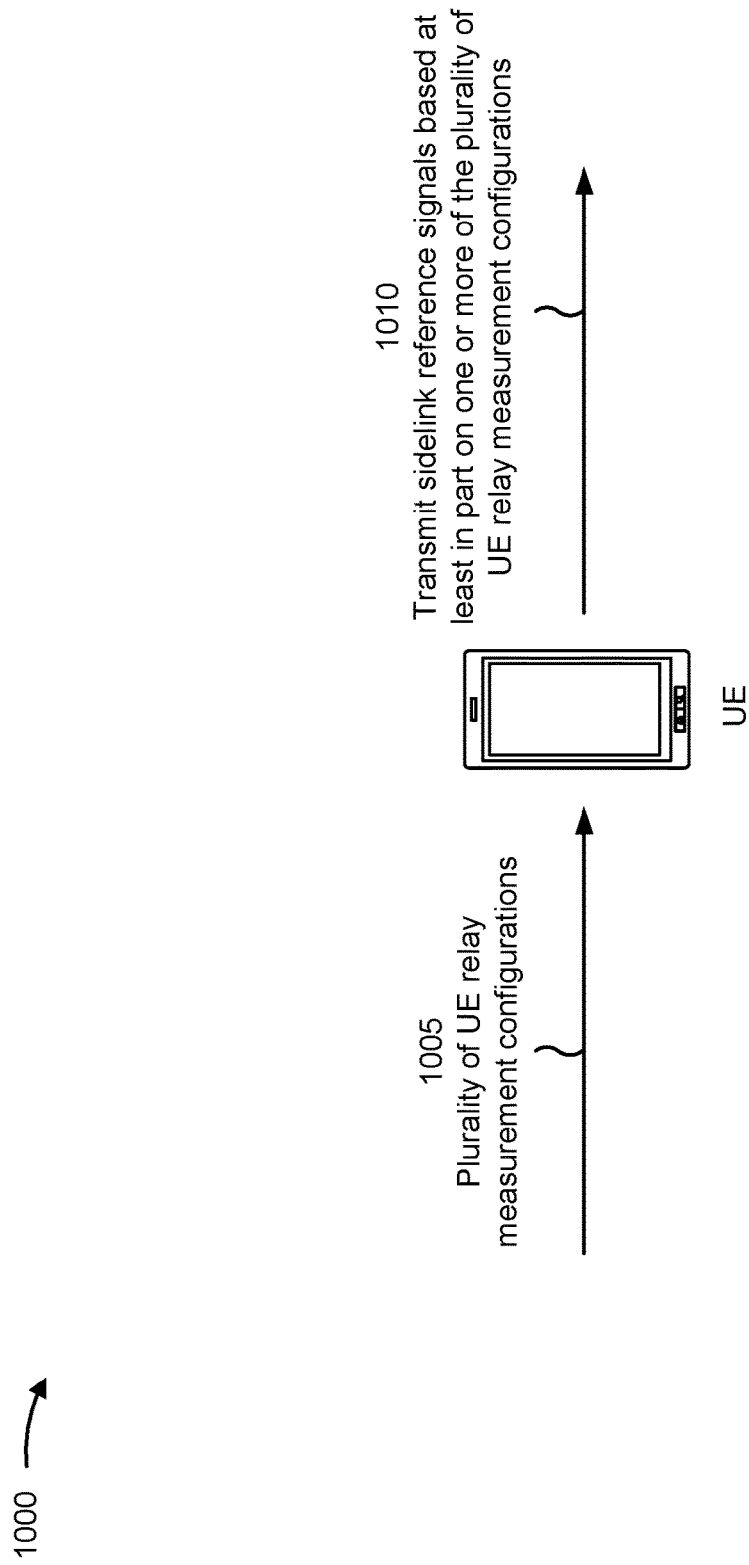

FIG. 10 is a diagram illustrating an example 1000 of sidelink measurement configuration and associated reporting for a sidelink UE relay, in accordance with the present disclosure. The example 1000 may include an example of receiving a plurality of UE relay measurement configurations and transmitting sidelink reference signals based at least in part on one or more of the plurality of UE relay measurement configurations.

As shown in FIG. 10, the example 1000 may include a UE. In some aspects, the UE may include a sidelink UE relay (e.g., a UE 120, a UE 405-1 or 405-2, a Tx/Rx UE 505, a relay UE1, a relay UE2, or a relay UE3). The sidelink UE relay UE may be configured to forward and/or relay wireless communications between another UE 120 and a network node a network node (e.g., a base station 110, a CU 310, an O-eNB 311, a DU 330, an RU 340) when operating in an activated sidelink UE relay mode 805. In some aspects, the UE may include a UE 120 (e.g., a UE 405-1 or 405-2, an Rx/Tx UE 510) for which a sidelink UE relay is to forward and/or relay wireless communications to and/or from a network node.

At 1005, the UE may receive a plurality of UE relay measurement configurations. The UE may receive one or more of the plurality of UE relay measurement configurations from a network node, from another UE 120, and/or from another wireless communication device. At 1010, the UE may transmit sidelink reference signals based at least in part on one or more of the plurality of UE relay measurement configurations. The UE may transmit the sidelink reference signals such that another UE 120 may perform sidelink measurements based at least in part on the sidelink reference signals.

The plurality of UE relay measurement configurations may include respective UE relay measurement configurations for different sidelink UE relay modes for a sidelink UE relay (e.g., which may be the UE in FIG. 10 or a sidelink UE relay associated with the UE in FIG. 10). For example, the plurality of UE relay measurement configurations may include an activated UE relay measurement configuration that is to be used by the UE when the sidelink UE relay is operating in an activated sidelink UE relay mode 805. As another example, the plurality of UE relay measurement configurations may include a deactivated UE relay measurement configuration that is to be used by the UE when the sidelink UE relay is operating in a deactivated sidelink UE relay mode 810. As another example, the plurality of UE relay measurement configurations may include a candidate UE relay measurement configuration that is to be used by the UE when the sidelink UE relay is operating in a candidate sidelink UE relay mode 815.

Each UE relay measurement configuration may include one or more sidelink measurement parameters. The one or more sidelink measurement parameters included in a UE relay measurement configuration may be used by the UE to transmit the sidelink reference signals when the sidelink UE relay is operating in an associated sidelink UE relay mode. For example, the activated UE relay measurement configuration may include one or more sidelink measurement parameters that are to be used by the UE to transmit the sidelink reference signals when the sidelink UE relay is operating in the activated sidelink UE relay mode 805. As another example, the deactivated UE relay measurement configuration may include one or more sidelink measurement parameters for transmit the sidelink reference signals when the sidelink UE relay is operating in a deactivated sidelink UE relay mode 810. As another example, the candidate UE relay measurement configuration may include one or more sidelink measurement parameters for transmitting reference signals when the sidelink UE relay is operating in a candidate sidelink UE relay mode 815.

The sidelink measurement parameter(s) included in a UE relay measurement configuration may include, for example, the time domain resource(s) in which the UE is to transmit the sidelink reference signals (e.g., symbols, slots, frames), the frequency domain resource(s) in which the UE is to transmit the sidelink reference signals (e.g., resource elements, resource blocks, subchannels, subcarriers, component carriers), the types of sidelink reference signals for which the UE is to transmit, the periodicity of the sidelink reference signals, the quantity of beam pairs that the UE is to maintain and/or for which the UE is to transmit the sidelink reference signals, the frequency range in which the UE is to transmit the sidelink reference signals (e.g., FR1, FR2), and/or another parameter for transmitting the sidelink reference signals.

The types of sidelink reference signals may include, for example, a sidelink CSI-RS, a sidelink DMRS, and/or another type of sidelink reference signal. The periodicity for transmitting the sidelink reference signals may be indicated as periodic (and the associated periodicity for transmitting the sidelink reference signals), aperiodic, and/or semi-static. Moreover, a UE relay measurement configuration may indicate a transmission trigger for transmitting the sidelink reference signals. When the UE determines that a transmission trigger has occurred, the UE may start transmitting the sidelink reference signals.

In some aspects, two or more UE relay measurement configurations may include different sidelink measurement parameters. In some aspects, two or more UE relay measurement configurations may include the same sidelink measurement parameters. "Different" sidelink measurement parameters may refer to different types of sidelink measurement parameters. For example, a first UE relay measurement configuration may include a time domain resource for transmitting the sidelink reference signals, whereas a second UE relay measurement configuration may include a frequency domain resource for transmitting the sidelink reference signals (e.g., but not a time domain resource). Additionally and/or alternatively, "different" sidelink measurement parameters may refer to the same types of sidelink measurement parameters that are configured with different values. For example, a first UE relay measurement configuration and a second UE relay measurement configuration may both include an indication of a sidelink reference signal type that is to be transmitted. However, the actual type indicated for the first UE relay measurement configuration and the second UE relay measurement configuration may be different (e.g., a sidelink CSI-RS may be indicated for the first UE relay measurement configuration and a sidelink DMRS may be indicated for the second UE relay measurement configuration). In some aspects, a combination of different sidelink measurement parameter types and different sidelink measurement parameter values may be included in two or more UE relay measurement configurations.

The capability to include different sidelink measurement parameter types and/or different sidelink measurement parameter values in different UE relay measurement configuration parameters enables sidelink reference signal transmission for the UE to be improved and flexibly configured for different sidelink UE relay modes (e.g., either for the UE or for another UE 120 associated with the UE). For example, sidelink measurement parameter(s) in an activated UE relay measurement configuration and the sidelink measurement parameter(s) in a deactivated UE relay measurement configuration may be different to enable low overhead for sidelink reference signal transmission for an associated deactivated sidelink UE relay mode 810 and to enable beam refinement and beam pair maintenance for an associated activated sidelink UE relay mode 805. As an example, sidelink measurement parameter(s) in an activated UE relay measurement configuration may be configured such that the UE performs more frequent and/or more frequency dense sidelink reference signal transmission for associated activated sidelink UE relay mode 805 relative to sidelink reference signal transmissions for an associated deactivated sidelink UE relay mode 810.

In some aspects, the sidelink measurement parameter(s) in an activated UE relay measurement configuration and the sidelink measurement parameter(s) in a candidate UE relay measurement configuration may be the same to enable beam refinement and beam pair maintenance for an associated candidate sidelink UE relay mode 815. Alternatively, a separate candidate UE relay measurement configuration may be omitted, and the UE may use the activated UE relay measurement configuration for the associated candidate sidelink UE relay mode 815. In some aspects, the sidelink measurement parameter(s) in an activated UE relay measurement configuration and the sidelink measurement parameter(s) in a candidate UE relay measurement configuration may be the same to enable further tailoring of sidelink measurement parameters for different sidelink UE relay modes.

As indicated above, FIG. 10 is provided as an example. Other examples may differ from what is described with regard to FIG. 10.

Figure 11:
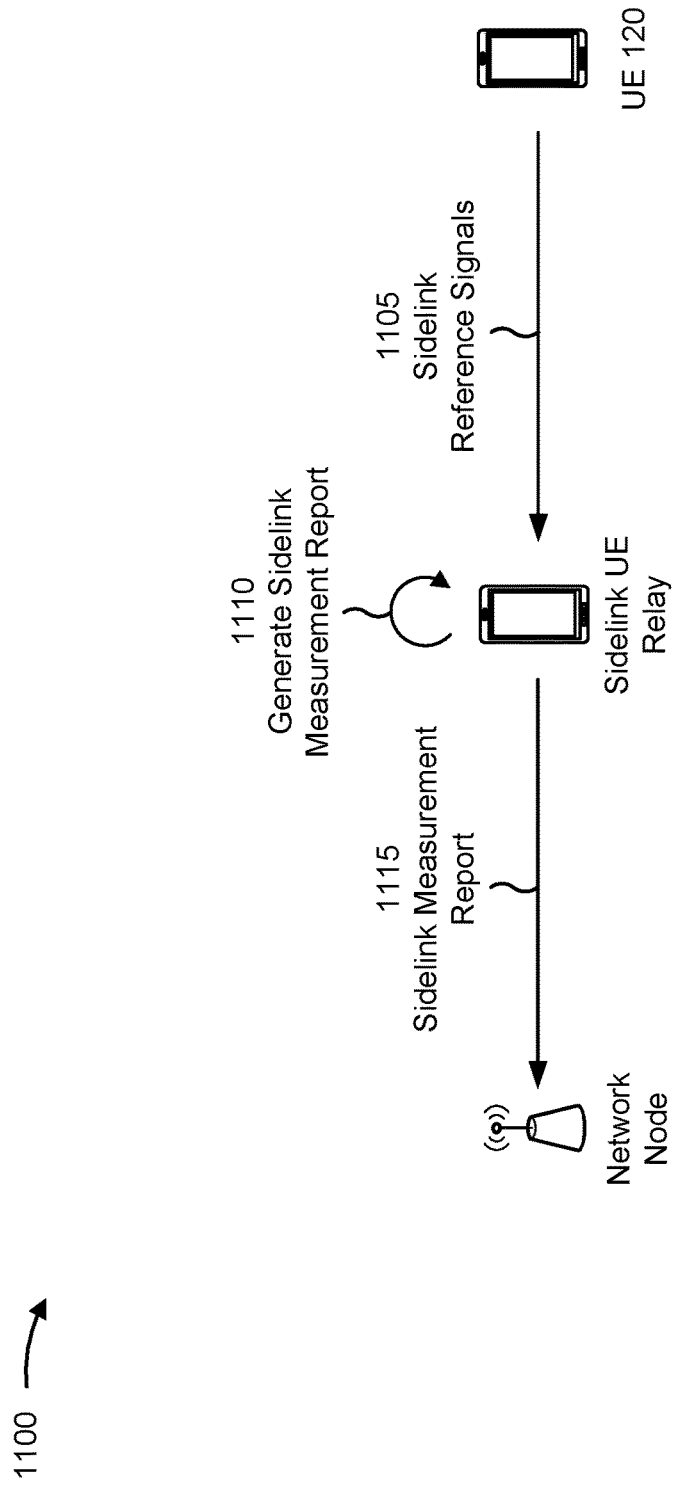

FIG. 11 is a diagram illustrating an example 1100 of sidelink measurement reporting, in accordance with the present disclosure. As shown in FIG. 11, the example 1100 may include a network node (e.g., a base station 110, a CU 310, an O-eNB 311, a DU 330, an RU 340), a sidelink UE relay (e.g., a UE 120, a UE 405-1 or 405-2, a Tx/Rx UE 505, a relay UE1, a relay UE2, or a relay UE3), and a UE 120 (e.g., a UE 405-1 or 405-2, an Rx/Tx UE 510). The sidelink UE relay UE may be configured to forward and/or relay wireless communications between the UE 120 and the network node when operating in an activated sidelink UE relay mode 805.

At 1105, the UE 120 may transmit sidelink reference signals to the sidelink UE relay. The UE 120 may transmit the sidelink reference signals based at least in part on a UE relay measurement configuration, as described above in connection with FIG. 10. For example, the UE 120 may transmit the sidelink reference signals based on an activated UE relay measurement configuration when the sidelink UE relay is operating in an activated sidelink UE relay mode 805. As another example, the UE 120 may transmit the sidelink reference signals based on a deactivated UE relay measurement configuration when the sidelink UE relay is operating in a deactivated sidelink UE relay mode 810. As another example, the UE 120 may transmit the sidelink reference signals based on a candidate UE relay measurement configuration when the sidelink UE relay is operating in a candidate sidelink UE relay mode 815.

If the transmit power for the sidelink reference signals is different from the transmit power at which the UE 120 transmits sidelink communications to the sidelink UE relay, the sidelink UE relay may need to know the difference in transmit power so that the sidelink UE relay can perform accurate measurements of the sidelink reference signals. In some aspects, the UE 120 transmits a sidelink communication to the sidelink UE relay, where the sidelink communication indicates the difference in transmit power. Additionally and/or alternatively, the network node may configure the different in transmit power and may transmit this information to the sidelink UE relay in in a UE relay measurement configuration.

At 1110, the sidelink UE relay may perform sidelink measurements of the sidelink reference signals and may generate a sidelink measurement report. The sidelink UE relay may perform the sidelink measurements and/or may generate the sidelink measurement report based at least in part on a UE relay measurement configuration, as described above in connection with FIG. 9. For example, the sidelink UE relay may perform the sidelink measurements and/or may generate the sidelink measurement report based at least in part on an activated UE relay measurement configuration when the sidelink UE relay is operating in an activated sidelink UE relay mode 805. As another example, the sidelink UE relay may perform the sidelink measurements and/or may generate the sidelink measurement report based at least in part on a deactivated UE relay measurement configuration when the sidelink UE relay is operating in a deactivated sidelink UE relay mode 810. As another example, the sidelink UE relay may perform the sidelink measurements and/or may generate the sidelink measurement report based at least in part on a candidate UE relay measurement configuration when the sidelink UE relay is operating in a candidate sidelink UE relay mode 815.

At 1115, the sidelink UE relay may transmit the sidelink measurement report to the network node. In particular, the sidelink UE relay may transmit the sidelink measurement report directly to the network node. In other words, the network node may receive the sidelink measurement report on the access link between the sidelink UE relay and the network node without the sidelink measurement report being transferred by the UE 120 and/or by another network node.

In some aspects, the sidelink UE relay may also include a switch recommendation in the sidelink measurement report. The sidelink UE relay may determine the switch recommendation for the sidelink UE relay as described herein. In some aspects, the switch recommendation may be based at least in part on the sidelink measurements and/or based on access link measurements associated with reference signals transmitted by the network node on the access link between the network node and the sidelink UE relay. However, the switch recommendation may be based at least in part on an absolute threshold in scenarios in which the sidelink UE relay only has information about the sidelink between the sidelink UE relay and the UE 120.

As indicated above, FIG. 11 is provided as an example. Other examples may differ from what is described with regard to FIG. 11.

Figure 12:
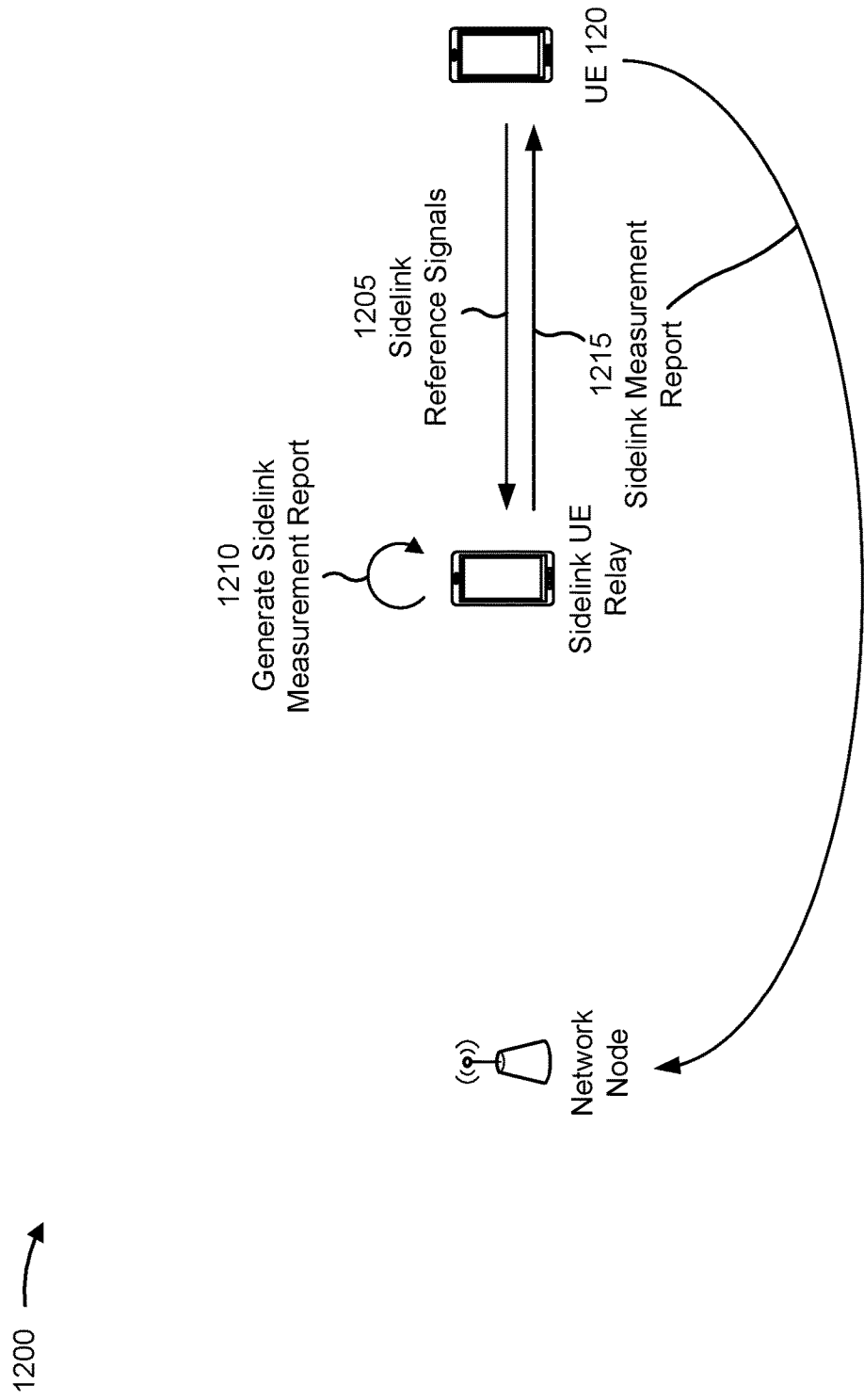

FIG. 12 is a diagram illustrating an example 1200 of sidelink measurement reporting, in accordance with the present disclosure. As shown in FIG. 12, the example 1200 may include a network node (e.g., a base station 110, a CU 310, an O-eNB 311, a DU 330, an RU 340), a sidelink UE relay (e.g., a UE 120, a UE 405-1 or 405-2, a Tx/Rx UE 505, a relay UE1, a relay UE2, or a relay UE3), and a UE 120 (e.g., a UE 405-1 or 405-2, an Rx/Tx UE 510). The sidelink UE relay UE may be configured to forward and/or relay wireless communications between the UE 120 and the network node when operating in an activated sidelink UE relay mode 805.

The example 1200 is similar to the example 1100 of FIG. 11 in that (at 1205) the UE 120 may transmit sidelink reference signals to the sidelink UE relay based at least in part on a UE relay measurement configuration (e.g., as described above in connection with FIG. 10) and (at 1210) the sidelink UE relay may perform sidelink measurements of the sidelink reference signals and may generate a sidelink measurement report based at least in part on a UE relay measurement configuration (e.g., as described above in connection with FIG. 9).

However, at 1215, the sidelink UE relay indirectly transmits the sidelink measurement report to the network node through another node as opposed to directly on the access link between the sidelink UE relay and the network node. Here, the sidelink UE relay may transmit the sidelink measurement report to the network node through the UE 120 such that the network node receives the sidelink measurement report on the access link between the UE 120 and the network node. In some aspects, the sidelink UE relay may also include a switch recommendation in the sidelink measurement report.

Alternatively, the sidelink UE relay may transmit the results of the sidelink measurements (and the switch recommendation) to the UE 120, and the UE 120 may generate the sidelink measurement report based at least in part on the results of the sidelink measurements (and the switch recommendation) and may transmit the sidelink measurement report to the network node.

As indicated above, FIG. 12 is provided as an example. Other examples may differ from what is described with regard to FIG. 12.

Figure 13:
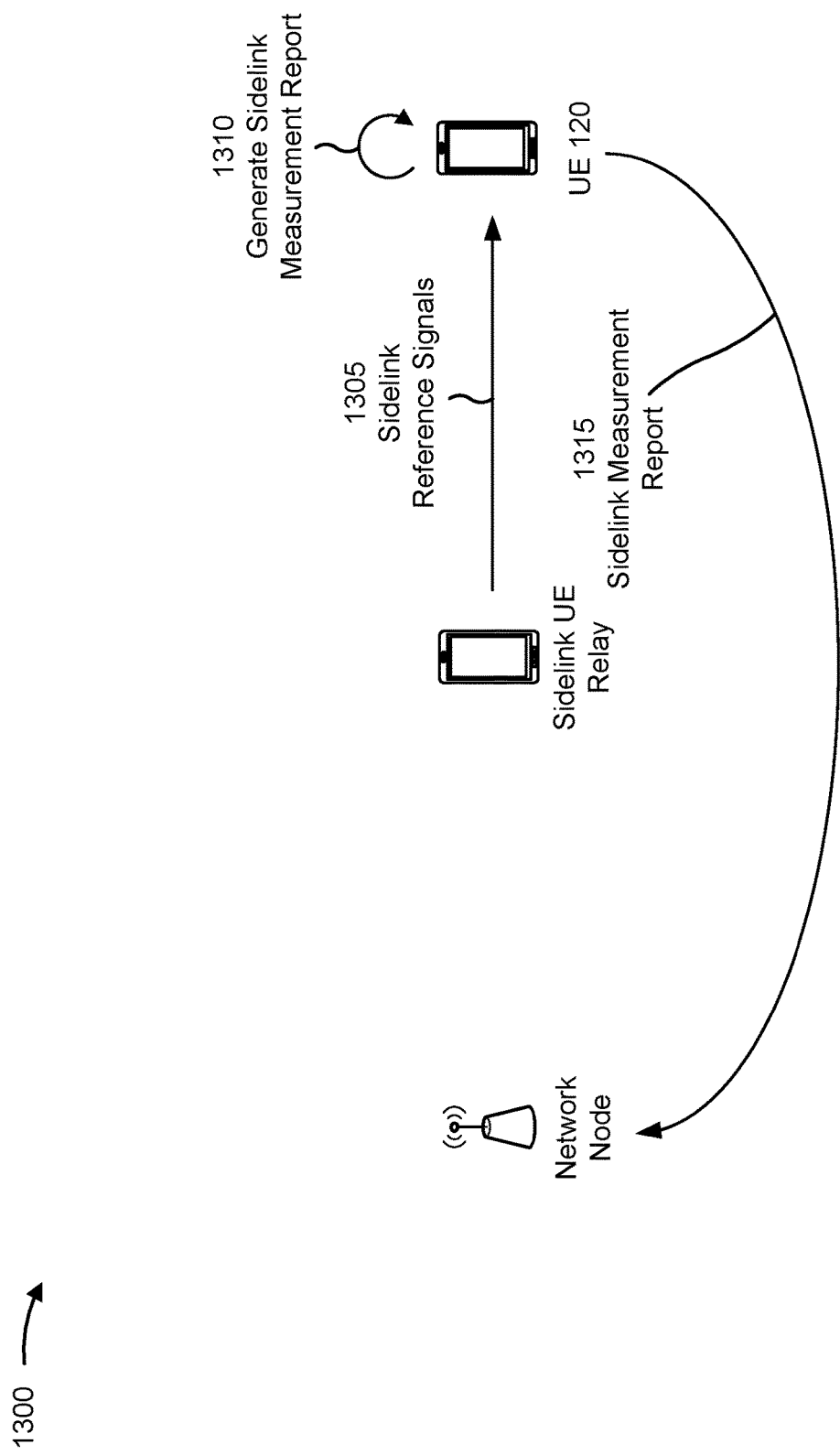

FIG. 13 is a diagram illustrating an example 1300 of sidelink measurement reporting, in accordance with the present disclosure. As shown in FIG. 13, the example 1300 may include a network node (e.g., a base station 110, a CU 310, an O-eNB 311, a DU 330, an RU 340), a sidelink UE relay (e.g., a UE 120, a UE 405-1 or 405-2, a Tx/Rx UE 505, a relay UE1, a relay UE2, or a relay UE3), and a UE 120 (e.g., a UE 405-1 or 405-2, an Rx/Tx UE 510). The sidelink UE relay UE may be configured to forward and/or relay wireless communications between the UE 120 and the network node when operating in an activated sidelink UE relay mode 805.

At 1305, the sidelink UE relay may transmit sidelink reference signals to the UE 120. The sidelink UE relay may transmit the sidelink reference signals based at least in part on a UE relay measurement configuration, as described above in connection with FIG. 10. For example, the sidelink UE relay may transmit the sidelink reference signals based on an activated UE relay measurement configuration when the sidelink UE relay is operating in an activated sidelink UE relay mode 805. As another example, the sidelink UE relay may transmit the sidelink reference signals based on a deactivated UE relay measurement configuration when the sidelink UE relay is operating in a deactivated sidelink UE relay mode 810. As another example, the sidelink UE relay may transmit the sidelink reference signals based on a candidate UE relay measurement configuration when the sidelink UE relay is operating in a candidate sidelink UE relay mode 815.

If the transmit power for the sidelink reference signals is different from the transmit power at which the sidelink UE relay transmits sidelink communications to the UE 120, the UE 120 may need to know the difference in transmit power so that the UE 120 can perform accurate measurements of the sidelink reference signals. In some aspects, the sidelink UE relay transmits a sidelink communication to the UE 120, where the sidelink communication indicates the difference in transmit power. Additionally and/or alternatively, the network node may configure the different in transmit power and may transmit this information to the UE 120 in in a UE relay measurement configuration.

At 1310, the UE 120 relay may perform sidelink measurements of the sidelink reference signals and may generate a sidelink measurement report. The UE 120 may perform the sidelink measurements and/or may generate the sidelink measurement report based at least in part on a UE relay measurement configuration, as described above in connection with FIG. 9. For example, the UE 120 may perform the sidelink measurements and/or may generate the sidelink measurement report based at least in part on an activated UE relay measurement configuration when the sidelink UE relay is operating in an activated sidelink UE relay mode 805. As another example, the UE 120 may perform the sidelink measurements and/or may generate the sidelink measurement report based at least in part on a deactivated UE relay measurement configuration when the sidelink UE relay is operating in a deactivated sidelink UE relay mode 810. As another example, the UE 120 may perform the sidelink measurements and/or may generate the sidelink measurement report based at least in part on a candidate UE relay measurement configuration when the sidelink UE relay is operating in a candidate sidelink UE relay mode 815.

At 1315, the UE 120 may transmit the sidelink measurement report to the network node. In particular, the UE 120 may transmit the sidelink measurement report directly to the network node. In other words, the network node may receive the sidelink measurement report on the access link between the UE 120 and the network node without the sidelink measurement report being transferred by the sidelink UE relay, by another UE 120, and/or by another network node. In some aspects, the UE 120 may also include a switch recommendation in the sidelink measurement report. The UE 102 may determine the switch recommendation for the sidelink UE relay as described herein.

In some aspects, the UE 120 may aggregate and/or combine measurement results and/or switch recommendations for a plurality of sidelink UE relays in the sidelink measurement report. In this way, the sidelink measurement report is provided to the network node for a plurality of sidelink UE relays.

The switch recommendation for each sidelink UE relay may be an absolute recommendation or based at least in part on relative thresholds by comparing the sidelinks of each of the sidelink UE relays. When using a relative threshold, such as the sidelink channel quality between sidelinks with an activated UE relay and the sidelinks with a deactivated UE relay, the UE 120 may add an offset to compensate for different beam widths (e.g., between activated UE relays that use refined narrow beams and deactivated UE relays that use unrefined wide beams, as described above in connection with FIG. 7) and different sidelink transmit power. A sidelink UE relay may further provide access link information for a switch recommendation based at least in part on end-to-end channel quality between the UE 120 and the network node through the sidelink UE relay.

As indicated above, FIG. 13 is provided as an example. Other examples may differ from what is described with regard to FIG. 13.

Figure 14:
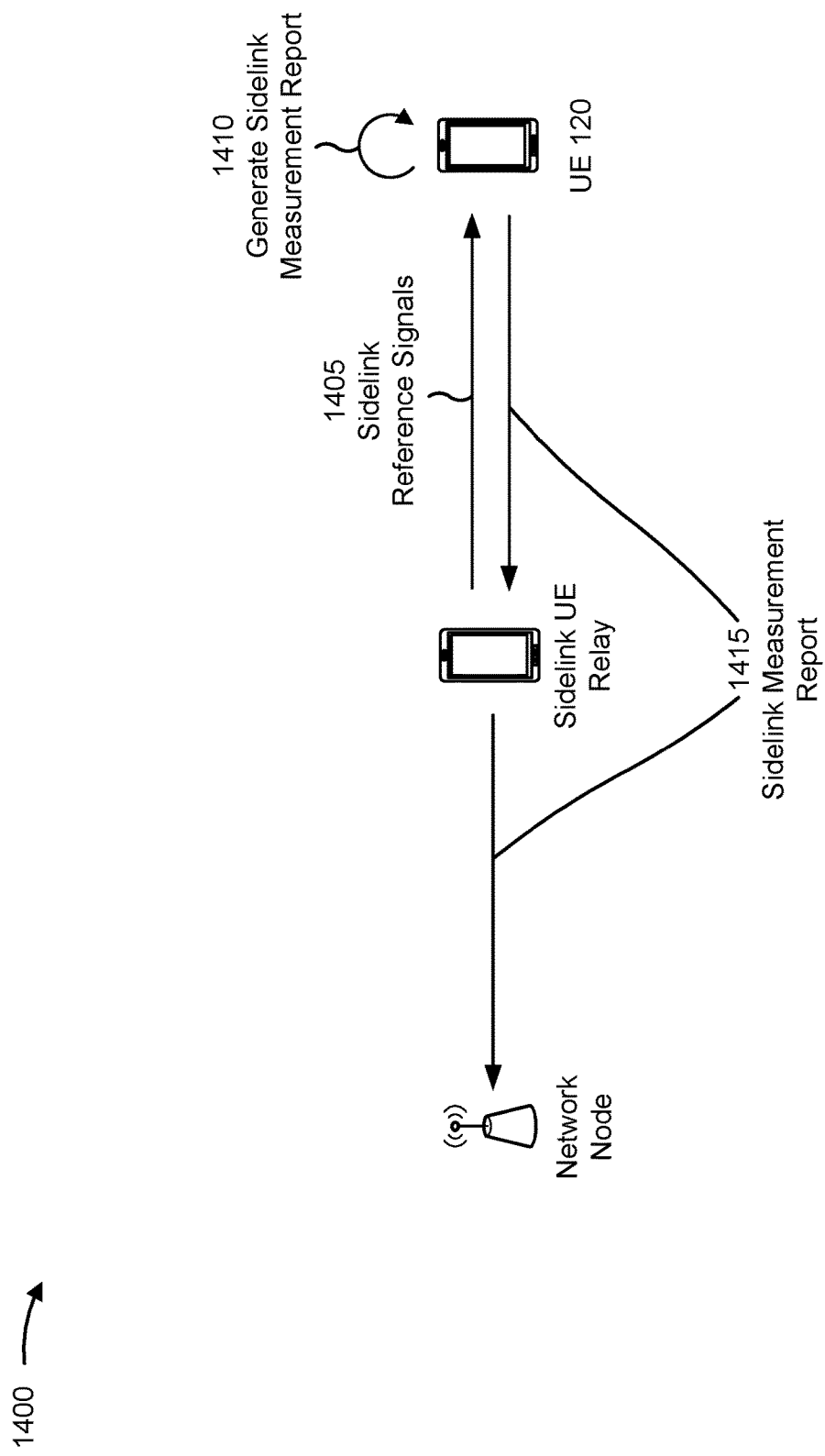

FIG. 14 is a diagram illustrating an example 1400 of sidelink measurement reporting, in accordance with the present disclosure. As shown in FIG. 14, the example 1400 may include a network node (e.g., a base station 110, a CU 310, an O-eNB 311, a DU 330, an RU 340), a sidelink UE relay (e.g., a UE 120, a UE 405-1 or 405-2, a Tx/Rx UE 505, a relay UE1, a relay UE2, or a relay UE3), and a UE 120 (e.g., a UE 405-1 or 405-2, an Rx/Tx UE 510). The sidelink UE relay UE may be configured to forward and/or relay wireless communications between the UE 120 and the network node when operating in an activated sidelink UE relay mode 805.

The example 1400 is similar to the example 1300 of FIG. 13 in that (at 1405) the sidelink UE relay may transmit sidelink reference signals to the UE 120 based at least in part on a UE relay measurement configuration (e.g., as described above in connection with FIG. 10) and (at 1410) the UE 120 may perform sidelink measurements of the sidelink reference signals and may generate a sidelink measurement report based at least in part on a UE relay measurement configuration (e.g., as described above in connection with FIG. 9).

However, at 1415, the UE 120 indirectly transmits the sidelink measurement report to the network node through another node as opposed to directly on the access link between the UE 120 and the network node. Here, the UE 120 may transmit the sidelink measurement report to the network node through the sidelink UE relay such that the network node receives the sidelink measurement report on the access link between the sidelink UE relay and the network node. In some aspects, the UE 120 may also include a switch recommendation in the sidelink measurement report.

Alternatively, the UE 120 may transmit the results of the sidelink measurements (and the switch recommendation) to the sidelink UE relay, and the sidelink UE relay may generate the sidelink measurement report based at least in part on the results of the sidelink measurements (and the switch recommendation) and may transmit the sidelink measurement report to the network node.

As indicated above, FIG. 14 is provided as an example. Other examples may differ from what is described with regard to FIG. 14. In some aspects, one or more of the examples 1100-1400 may be combined such that the sidelink UE relay and the UE 120 both transmit sidelink reference signals and both generate measurement reports. In some aspects, one or more of the examples 1100-1400 may be combined such that the sidelink UE relay and the UE 120 both transmit sidelink measurement reports (e.g., that are generated by the sidelink UE relay and/or the UE 120) to the network node.

Figure 15:
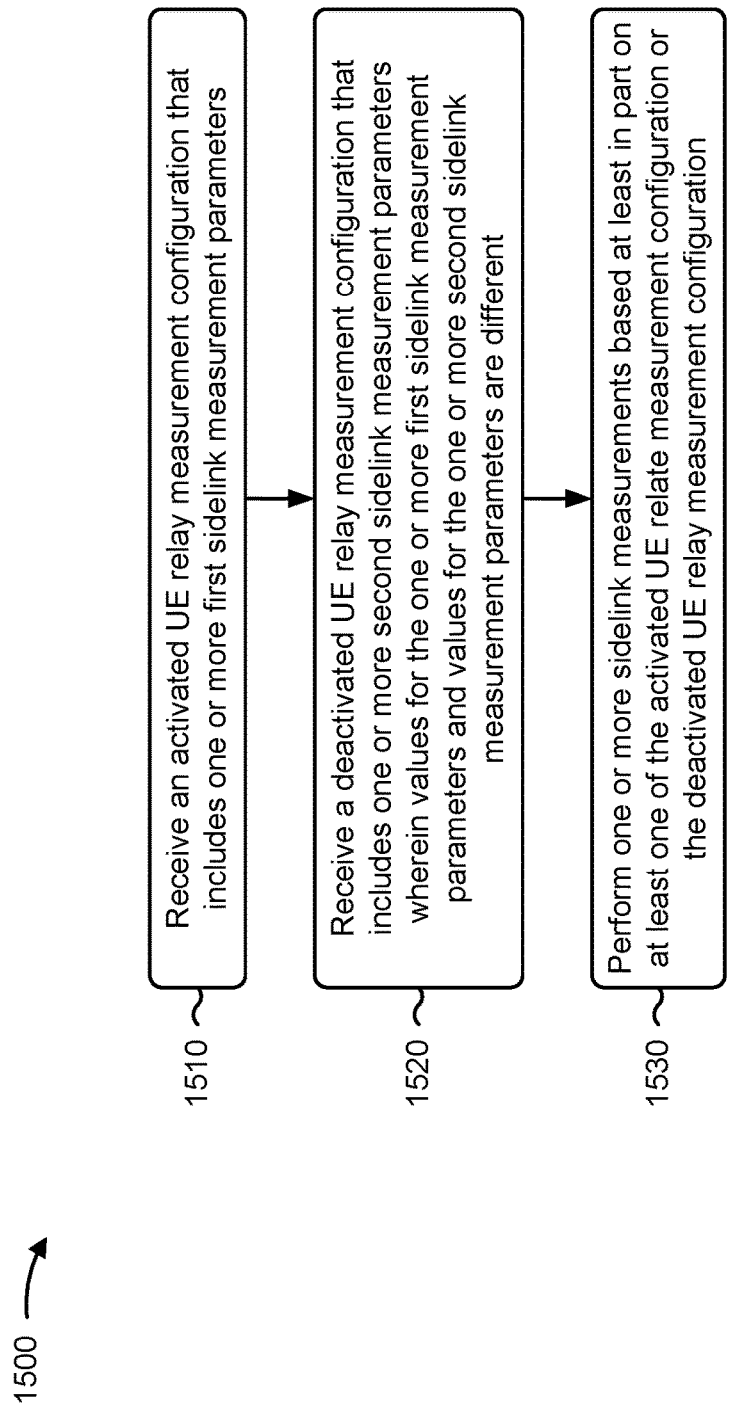
FIGS. 15-20 are diagrams illustrating example processes associated with sidelink measurement configuration and reporting, in accordance with the present disclosure.

FIG. 15 is a diagram illustrating an example process 1500 performed, for example, by a UE, in accordance with the present disclosure. Example process 1500 is an example where the UE (e.g., a UE 120, a UE 405-1 or 405-2, a Tx/Rx UE 505, an Rx/Tx UE 510, a relay UE1, a relay UE2, or a relay UE3) performs operations associated with sidelink measurement configuration and reporting.

As shown in FIG. 15, in some aspects, process 1500 may include receiving an activated UE relay measurement configuration that includes one or more first sidelink measurement parameters (block 1510). For example, the UE (e.g., using communication manager 140 and/or reception component 2102, depicted in FIG. 21) may receive an activated UE relay measurement configuration that includes one or more first sidelink measurement parameters, as described above.

As further shown in FIG. 15, in some aspects, process 1500 may include receiving a deactivated UE relay measurement configuration that includes one or more second sidelink measurement parameters, wherein values for the one or more first sidelink measurement parameters and values for the one or more second sidelink measurement parameters are different (block 1520). For example, the UE (e.g., using communication manager 140 and/or reception component 2102, depicted in FIG. 21) may receive a deactivated UE relay measurement configuration that includes one or more second sidelink measurement parameters, wherein values for the one or more first sidelink measurement parameters and values for the one or more second sidelink measurement parameters are different, as described above. In some aspects, values for the one or more first sidelink measurement parameters and values for the one or more second sidelink measurement parameters are different.

As further shown in FIG. 15, in some aspects, process 1500 may include performing one or more sidelink measurements based at least in part on at least one of the activated UE relate measurement configuration or the deactivated UE relay measurement configuration (block 1530). For example, the UE (e.g., using communication manager 140 and/or measurement component 2108, depicted in FIG. 21) may perform one or more sidelink measurements based at least in part on at least one of the activated UE relate measurement configuration or the deactivated UE relay measurement configuration, as described above.

Process 1500 may include additional aspects, such as any single aspect or any combination of aspects described below and/or in connection with one or more other processes described elsewhere herein.

In a first aspect, performing the one or more sidelink measurements comprises performing, when operating in an activated UE relay mode, the one or more sidelink measurements based at least in part on the activated UE relay measurement configuration, wherein the UE is configured to forward wireless communications between another UE and a network node when operating in the activated UE relay mode.

In a second aspect, alone or in combination with the first aspect, performing the one or more sidelink measurements comprises performing one or more periodic measurements of a sidelink channel state information reference signal, performing one or more aperiodic measurements of the sidelink channel state information reference signal, or performing one or more measurements of a sidelink demodulation reference signal.

In a third aspect, alone or in combination with one or more of the first and second aspects, process 1500 includes transmitting, when operating in the activated UE relay mode, one or more sidelink reference signals based at least in part on the activated UE relay measurement configuration, wherein transmitting the one or more sidelink reference signals comprises transmitting one or more periodic sidelink channel state information reference signals, transmitting one or more aperiodic sidelink channel state information reference signals, or transmitting one or more sidelink demodulation reference signals.

In a fourth aspect, alone or in combination with one or more of the first through third aspects, performing the one or more sidelink measurements comprises performing, when operating in a deactivated UE relay mode, the one or more sidelink measurements based at least in part on the deactivated UE relay measurement configuration, wherein the UE does not forward wireless communications between another UE and a network node when operating in the deactivated UE relay mode.

In a fifth aspect, alone or in combination with one or more of the first through fourth aspects, performing the one or more sidelink measurements comprises performing one or more periodic measurements of a sidelink channel state information reference signal.

In a sixth aspect, alone or in combination with one or more of the first through fifth aspects, process 1500 includes transmitting, when operating in the deactivated UE relay mode, one or more sidelink reference signals based at least in part on the deactivated UE relay measurement configuration, wherein transmitting the one or more sidelink reference signals comprises transmitting one or more periodic sidelink channel state information reference signals.

In a seventh aspect, alone or in combination with one or more of the first through sixth aspects, process 1500 includes receiving at least one of the activated UE relay measurement configuration or the deactivated UE relay measurement configuration from at least one of a network node on an access link, or another UE on a sidelink.

In an eighth aspect, alone or in combination with one or more of the first through seventh aspects, process 1500 includes at least one of performing, when operating in a candidate UE relay mode, one or more sidelink measurements based at least in part on a candidate UE relay measurement configuration that includes one or more third sidelink measurement parameters, or transmitting, when operating in the candidate UE relay mode, one or more sidelink reference signals based at least in part on the candidate UE relay measurement configuration, wherein the UE does not forward wireless communications between another UE and a network node when operating in the candidate UE relay mode, and wherein the UE operates in the candidate UE relay mode as a result of being identified as a candidate UE relay for forwarding wireless communications between the other UE and the network node.

In a ninth aspect, alone or in combination with one or more of the first through eighth aspects, values for the one or more third sidelink measurement parameters are different from the values for the one or more first sidelink measurement parameters and the values for the one or more second sidelink measurement parameters.

In a tenth aspect, alone or in combination with one or more of the first through ninth aspects, values for the one or more third sidelink measurement parameters are same values as the values for the one or more first sidelink measurement parameters.

In an eleventh aspect, alone or in combination with one or more of the first through tenth aspects, process 1500 includes transitioning from an activated UE relay mode to the candidate UE relay mode, wherein the UE is configured to forward wireless communications between another UE and a network node when operating in the activated UE relay mode.

In a twelfth aspect, alone or in combination with one or more of the first through eleventh aspects, process 1500 includes transitioning from a deactivated UE relay mode to the candidate UE relay mode, wherein the UE does not forward wireless communications between another UE and a network node when operating in the deactivated UE relay mode.

In a thirteenth aspect, alone or in combination with one or more of the first through twelfth aspects, process 1500 includes receiving a switch command from a network node, and transitioning to the candidate UE relay mode based at least in part on receiving the switch command.

In a fourteenth aspect, alone or in combination with one or more of the first through thirteenth aspects, performing the one or more sidelink measurements comprises performing one or more periodic measurements of a sidelink channel state information reference signal, performing one or more aperiodic measurements of the sidelink channel state information reference signal, or performing one or more measurements of a sidelink demodulation reference signal.

In a fifteenth aspect, alone or in combination with one or more of the first through fourteenth aspects, transmitting the one or more sidelink reference signals comprises transmitting one or more periodic sidelink channel state information reference signals, transmitting one or more aperiodic sidelink channel state information reference signals, or transmitting one or more sidelink demodulation reference signals.

In a sixteenth aspect, alone or in combination with one or more of the first through fifteenth aspects, process 1500 includes receiving the candidate UE relay measurement configuration from at least one of a network node on an access link, or another UE on a sidelink.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
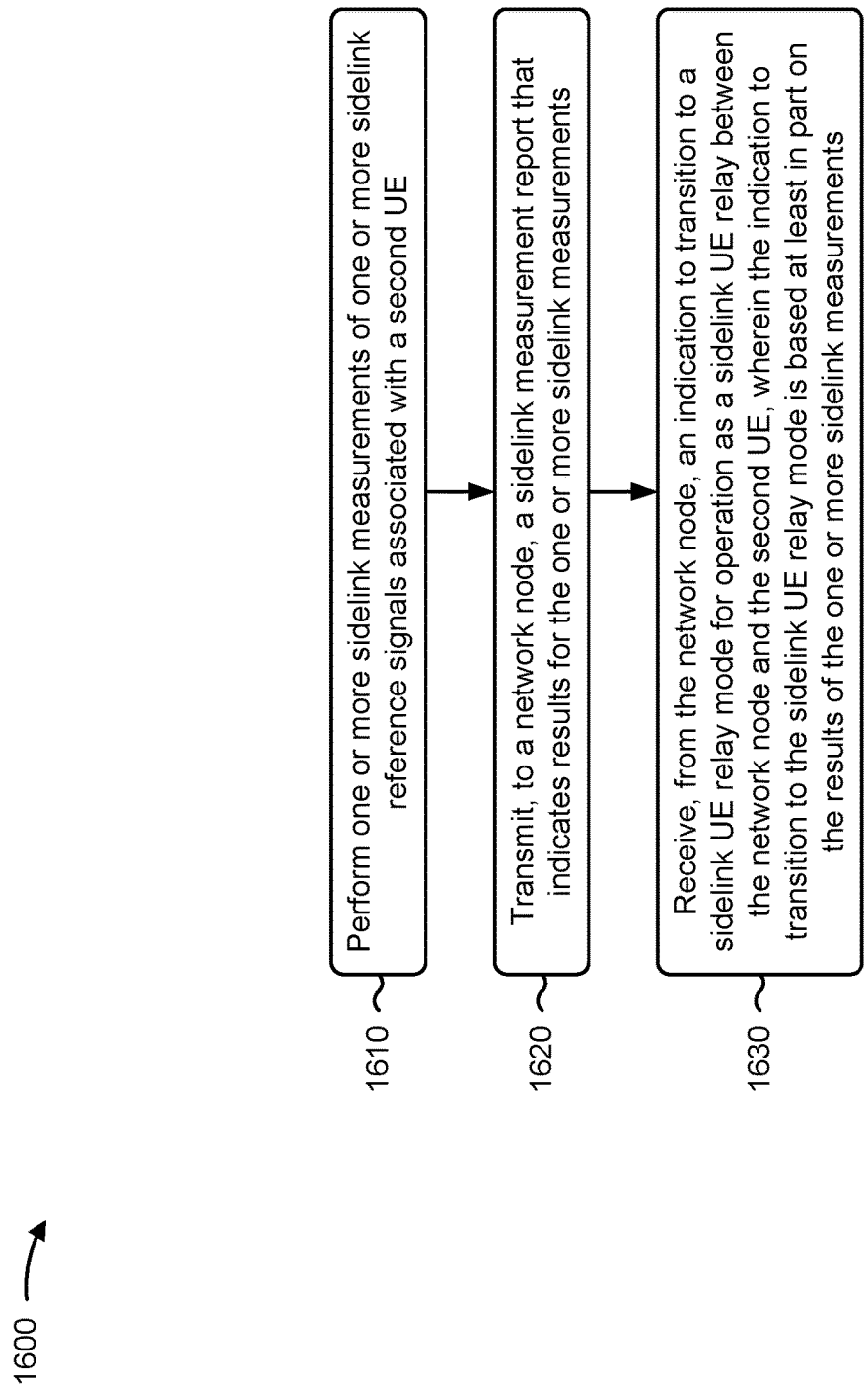

FIG. 16 is a diagram illustrating an example process 1600 performed, for example, by a first UE, in accordance with the present disclosure. Example process 1600 is an example where the first UE (e.g., a UE 120, a UE 405-1 or 405-2, a Tx/Rx UE 505, a relay UE1, a relay UE2, or a relay UE3) performs operations associated with sidelink measurement configuration and reporting.

As shown in FIG. 16, in some aspects, process 1600 may include performing one or more sidelink measurements of one or more sidelink reference signals associated with a second UE (block 1610). For example, the first UE (e.g., using communication manager 140 and/or measurement component 2108, depicted in FIG. 21) may perform one or more sidelink measurements of one or more sidelink reference signals associated with a second UE, as described above.

As further shown in FIG. 16, in some aspects, process 1600 may include transmitting, to a network node, a sidelink measurement report that indicates results for the one or more sidelink measurements (block 1620). For example, the first UE (e.g., using communication manager 140 and/or transmission component 2104, depicted in FIG. 21) may transmit, to a network node, a sidelink measurement report that indicates results for the one or more sidelink measurements, as described above.

As further shown in FIG. 16, in some aspects, process 1600 may include receiving, from the network node, an indication to transition to a sidelink UE relay mode for operation as a sidelink UE relay between the network node and the second UE, wherein the indication to transition to the sidelink UE relay mode is based at least in part on the results of the one or more sidelink measurements (block 1630). For example, the first UE (e.g., using communication manager 140 and/or reception component 2102, depicted in FIG. 21) may receive, from the network node, an indication to transition to a sidelink UE relay mode for operation as a sidelink UE relay between the network node and the second UE, wherein the indication to transition to the sidelink UE relay mode is based at least in part on the results of the one or more sidelink measurements, as described above. In some aspects, the indication to transition to the sidelink UE relay mode is based at least in part on the results of the one or more sidelink measurements.

Process 1600 may include additional aspects, such as any single aspect or any combination of aspects described below and/or in connection with one or more other processes described elsewhere herein.

In a first aspect, transmitting the sidelink measurement report comprises periodically transmitting the sidelink measurement report based at least in part on a periodic sidelink measurement reporting configuration.

In a second aspect, alone or in combination with the first aspect, the sidelink measurement report further indicates a selected sidelink UE relay mode that is selected by the first UE.

In a third aspect, alone or in combination with one or more of the first and second aspects, transmitting the sidelink measurement report comprises transmitting an aperiodic sidelink measurement report based at least in part on the selected sidelink UE relay mode, and another sidelink UE relay mode in which the first UE was operating when the one or more sidelink measurements were performed, are different sidelink UE relay modes.

In a fourth aspect, alone or in combination with one or more of the first through third aspects, process 1600 includes the selected sidelink UE relay mode is based at least in part on the results of the one or more sidelink measurements.

In a fifth aspect, alone or in combination with one or more of the first through fourth aspects, process 1600 includes the selected sidelink UE relay mode is based at least in part on results of one or more access link measurements associated with the network node.

In a sixth aspect, alone or in combination with one or more of the first through fifth aspects, process 1600 includes the selected sidelink UE relay mode is based at least in part on results of one or more other sidelink measurements associated with a third UE.

In a seventh aspect, alone or in combination with one or more of the first through sixth aspects, the selected sidelink UE relay mode is based at least in part on one or more operating parameters associated with the first UE, wherein the one or more operating parameters comprise at least one of an available power for the first UE, a multi-panel configuration for the first UE, a multi-beam operation configuration for the first UE, a location of the first UE, a sidelink traffic load for the first UE, an access link traffic load for the first UE, a sidelink DRX configuration for the first UE, or an access link DRX configuration for the first UE.

In an eighth aspect, alone or in combination with one or more of the first through seventh aspects, process 1600 includes receiving, from at least one of the second UE or the network node, an indication of a transmit power of the one or more sidelink reference signals, wherein the results for the one or more sidelink measurements is based at least in part on the indication of the transmit power.

In a ninth aspect, alone or in combination with one or more of the first through eighth aspects, transmitting the sidelink measurement report comprises transmitting an aperiodic sidelink measurement report to the network node.

In a tenth aspect, alone or in combination with one or more of the first through ninth aspects, transmitting the aperiodic sidelink measurement report comprises transmitting the aperiodic sidelink measurement report based at least in part on results of the one or more sidelink measurements satisfying a threshold.

In an eleventh aspect, alone or in combination with one or more of the first through tenth aspects, process 1600 includes receiving, from the network node, a request for the aperiodic sidelink measurement report, wherein transmitting the aperiodic sidelink measurement report comprises transmitting the aperiodic sidelink measurement report based at least in part on receiving the request.

In a twelfth aspect, alone or in combination with one or more of the first through eleventh aspects, transmitting the sidelink measurement report comprises transmitting the sidelink measurement report directly to the network node on an access link.

In a thirteenth aspect, alone or in combination with one or more of the first through twelfth aspects, transmitting the sidelink measurement report comprises transmitting the sidelink measurement report to the network node via the second UE.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
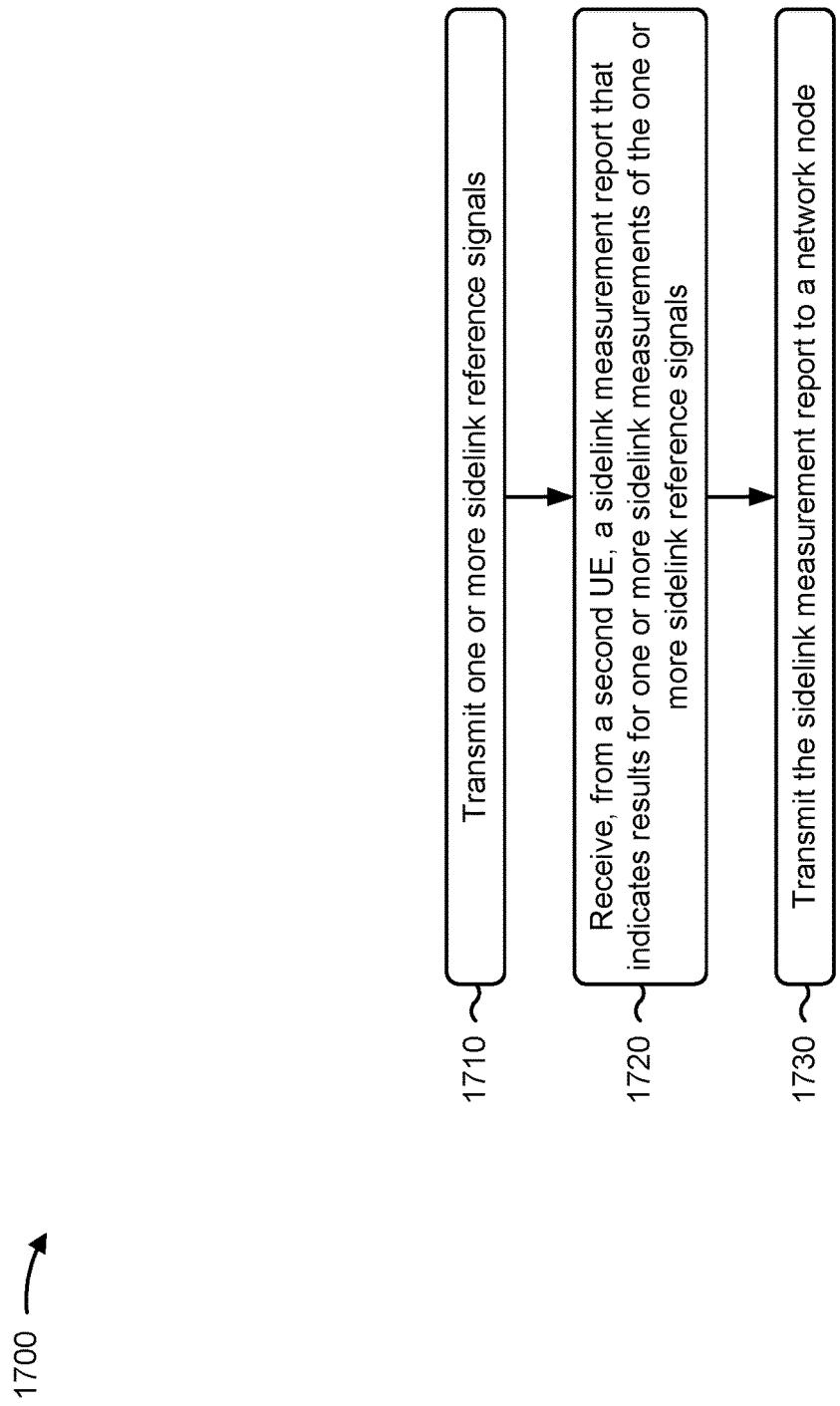

FIG. 17 is a diagram illustrating an example process 1700 performed, for example, by a first UE, in accordance with the present disclosure. Example process 1700 is an example where the first UE (e.g., a UE 120, a UE 405-1 or 405-2, a Tx/Rx UE 505, an Rx/Tx UE 510, a relay UE1, a relay UE2, or a relay UE3) performs operations associated with sidelink measurement configuration and reporting.

As shown in FIG. 17, in some aspects, process 1700 may include transmitting one or more sidelink reference signals (block 1710). For example, the first UE (e.g., using communication manager 140 and/or transmission component 2104, depicted in FIG. 21) may transmit one or more sidelink reference signals, as described above.

As further shown in FIG. 17, in some aspects, process 1700 may include receiving, from a second UE, a sidelink measurement report that indicates results for one or more sidelink measurements of the one or more sidelink reference signals (block 1720). For example, the first UE (e.g., using communication manager 140 and/or reception component 2102, depicted in FIG. 21) may receive, from a second UE, a sidelink measurement report that indicates results for one or more sidelink measurements of the one or more sidelink reference signals, as described above.

As further shown in FIG. 17, in some aspects, process 1700 may include transmitting the sidelink measurement report to a network node (block 1730). For example, the first UE (e.g., using communication manager 140 and/or transmission component 2104, depicted in FIG. 21) may transmit the sidelink measurement report to a network node, as described above.

Process 1700 may include additional aspects, such as any single aspect or any combination of aspects described below and/or in connection with one or more other processes described elsewhere herein.

In a first aspect, the sidelink measurement report further indicates a selected sidelink UE relay mode for the second UE to operate a sidelink UE relay between the network node and the first UE, wherein the sidelink UE relay mode is based at least in part on the results of the one or more sidelink measurements.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
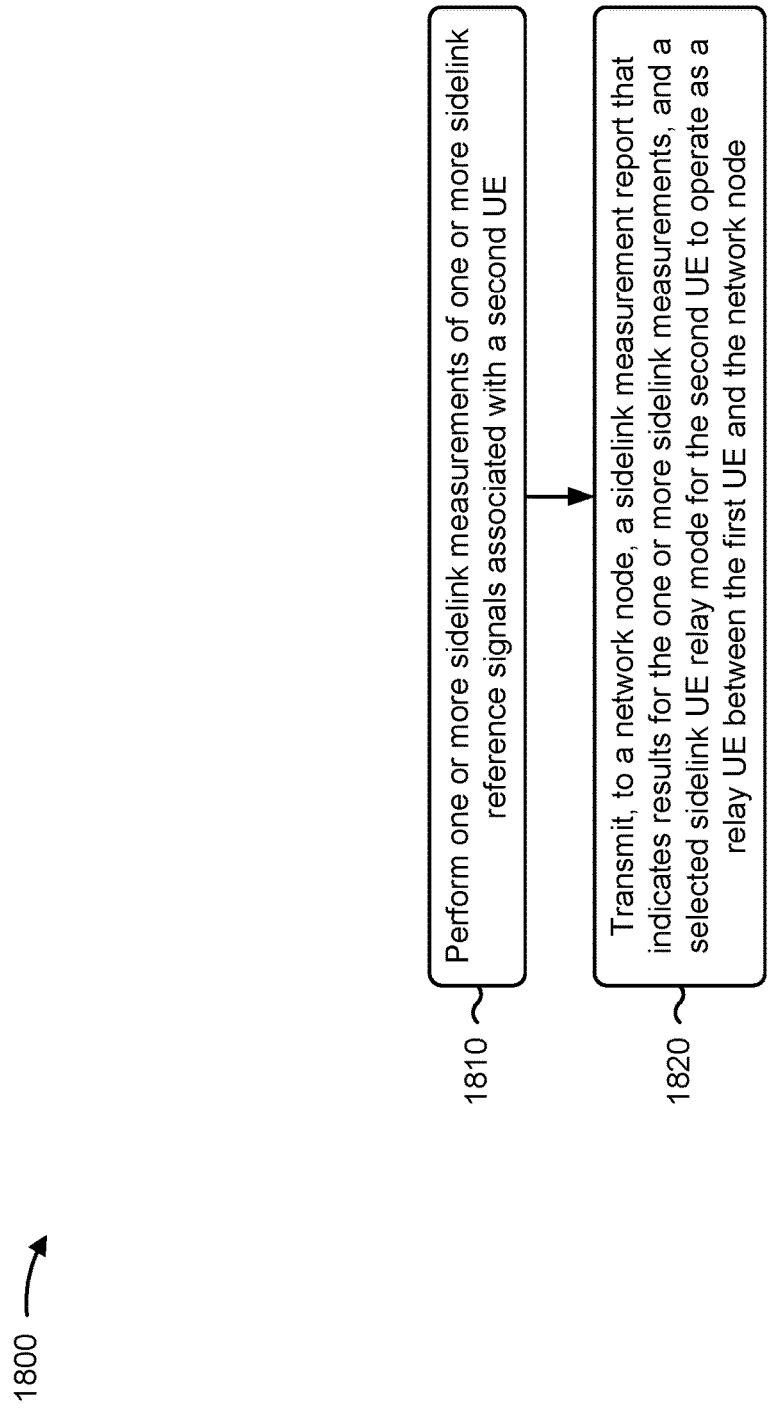

FIG. 18 is a diagram illustrating an example process 1800 performed, for example, by a first UE, in accordance with the present disclosure. Example process 1800 is an example where the first UE (e.g., a UE 120, a UE 405-1 or 405-2, a Tx/Rx UE 505, an Rx/Tx UE 510, a relay UE1, a relay UE2, or a relay UE3) performs operations associated with sidelink measurement configuration and reporting.

As shown in FIG. 18, in some aspects, process 1800 may include performing one or more sidelink measurements of one or more sidelink reference signals associated with a second UE (block 1810). For example, the first UE (e.g., using communication manager 140 and/or measurement component 2108, depicted in FIG. 21) may perform one or more sidelink measurements of one or more sidelink reference signals associated with a second UE, as described above.

As further shown in FIG. 18, in some aspects, process 1800 may include transmitting, to a network node, a sidelink measurement report that indicates: results for the one or more sidelink measurements, and a selected sidelink UE relay mode for the second UE to operate as a relay UE between the first UE and the network node (block 1820). For example, the first UE (e.g., using communication manager 140 and/or transmission component 2104, depicted in FIG. 21) may transmit, to a network node, a sidelink measurement report that indicates: results for the one or more sidelink measurements, and a selected sidelink UE relay mode for the second UE to operate as a relay UE between the first UE and the network node, as described above.

Process 1800 may include additional aspects, such as any single aspect or any combination of aspects described below and/or in connection with one or more other processes described elsewhere herein.

In a first aspect, transmitting the sidelink measurement report comprises periodically transmitting the sidelink measurement report based at least in part on a periodic sidelink measurement reporting configuration.

In a second aspect, alone or in combination with the first aspect, transmitting the sidelink measurement report comprises transmitting an aperiodic sidelink measurement report based at least in part on the selected sidelink UE relay mode, and the other sidelink UE relay mode in which the second UE was operating when the one or more sidelink measurements were performed, being different sidelink UE relay modes.

In a third aspect, alone or in combination with one or more of the first and second aspects, the selected sidelink UE relay mode is based at least in part on the results of the one or more sidelink measurements.

In a fourth aspect, alone or in combination with one or more of the first through third aspects, the selected sidelink UE relay mode is based at least in part on results of one or more access link measurements associated with the network node.

In a fifth aspect, alone or in combination with one or more of the first through fourth aspects, the selected sidelink UE relay mode is based at least in part on results of one or more other sidelink measurements associated with a third UE.

In a sixth aspect, alone or in combination with one or more of the first through fifth aspects, the selected sidelink UE relay mode is based at least in part on one or more operating parameters associated with the second UE, wherein the one or more operating parameters comprise at least one of an available power for the second UE, a multi-panel configuration for the second UE, a multi-beam operation configuration for the second UE, a location of the second UE, a sidelink traffic load for the second UE, an access link traffic load for the second UE, a sidelink DRX configuration for the second UE, or an access link DRX configuration for the second UE.

In a seventh aspect, alone or in combination with one or more of the first through sixth aspects, process 1800 includes receiving, from at least one of the second UE or the network node, an indication of a transmit power of the one or more sidelink reference signals.

In an eighth aspect, alone or in combination with one or more of the first through seventh aspects, transmitting the sidelink measurement report comprises transmitting an aperiodic sidelink measurement report to the network node.

In a ninth aspect, alone or in combination with one or more of the first through eighth aspects, transmitting the aperiodic sidelink measurement report comprises transmitting the aperiodic sidelink measurement report based at least in part on results of the one or more sidelink measurements satisfying a threshold.

In a tenth aspect, alone or in combination with one or more of the first through ninth aspects, process 1800 includes receiving, from the network node, a request for the aperiodic sidelink measurement report, wherein transmitting the aperiodic sidelink measurement report comprises transmitting the aperiodic sidelink measurement report based at least in part on receiving the request.

In an eleventh aspect, alone or in combination with one or more of the first through tenth aspects, transmitting the sidelink measurement report comprises transmitting the sidelink measurement report directly to the network node on an access link.

In a twelfth aspect, alone or in combination with one or more of the first through eleventh aspects, transmitting the sidelink measurement report comprises transmitting the sidelink measurement report to the network node through the second UE.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
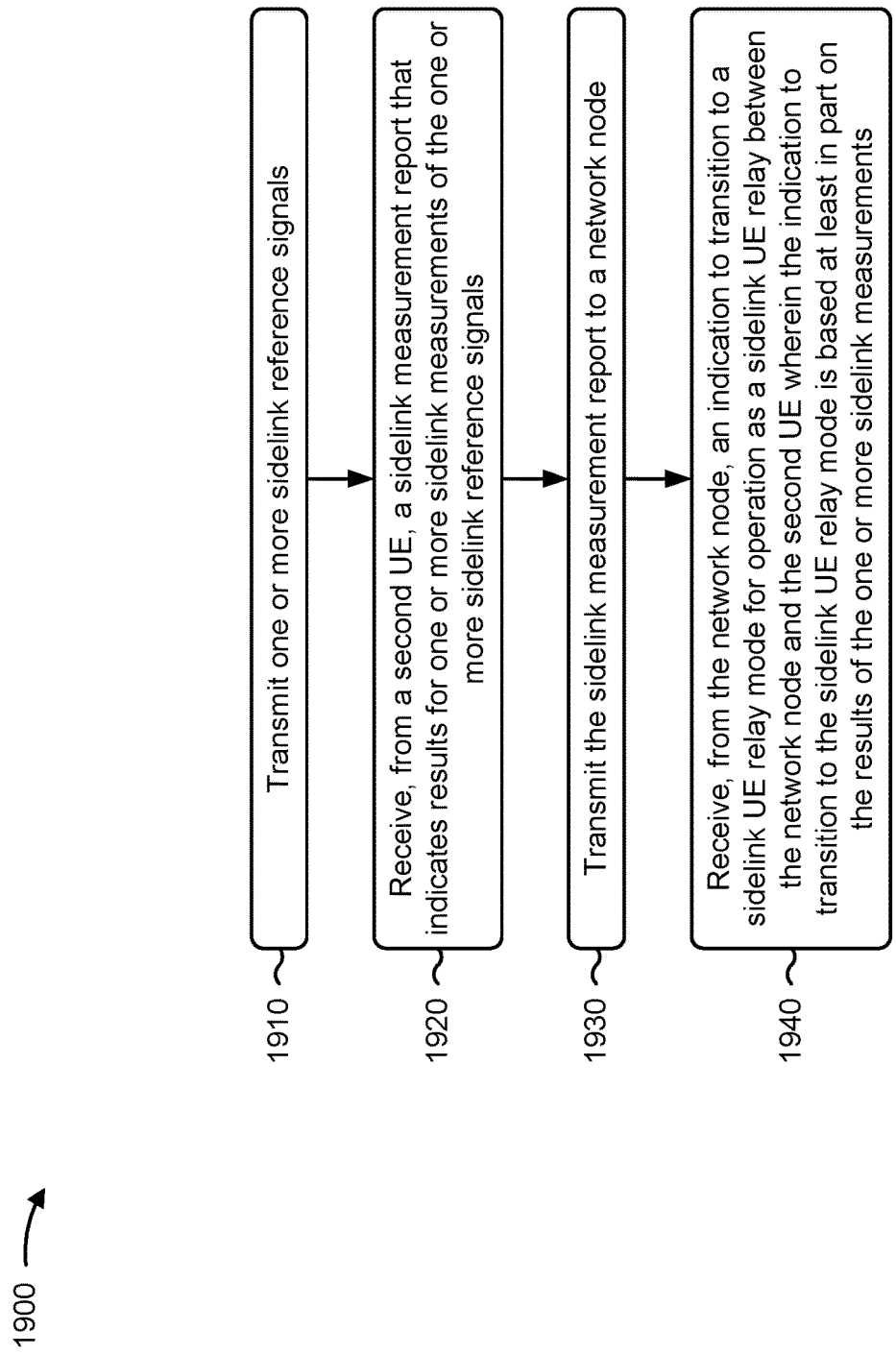

FIG. 19 is a diagram illustrating an example process 1900 performed, for example, by a first UE, in accordance with the present disclosure. Example process 1900 is an example where the first UE (e.g., a UE 120, a UE 405-1 or 405-2, a Tx/Rx UE 505, a relay UE1, a relay UE2, or a relay UE3) performs operations associated with sidelink measurement configuration and reporting.

As shown in FIG. 19, in some aspects, process 1900 may include transmitting one or more sidelink reference signals (block 1910). For example, the first UE (e.g., using communication manager 140 and/or transmission component 2104, depicted in FIG. 21) may transmit one or more sidelink reference signals, as described above.

As further shown in FIG. 19, in some aspects, process 1900 may include receiving, from a second UE, a sidelink measurement report that indicates results for one or more sidelink measurements of the one or more sidelink reference signals (block 1920). For example, the first UE (e.g., using communication manager 140 and/or reception component 2102, depicted in FIG. 21) may receive, from a second UE, a sidelink measurement report that indicates results for one or more sidelink measurements of the one or more sidelink reference signals, as described above.

As further shown in FIG. 19, in some aspects, process 1900 may include transmitting the sidelink measurement report to a network node (block 1930). For example, the first UE (e.g., using communication manager 140 and/or transmission component 2104, depicted in FIG. 21) may transmit the sidelink measurement report to a network node, as described above.

As further shown in FIG. 19, in some aspects, process 1900 may include receiving, from the network node, an indication to transition to a sidelink UE relay mode for operation as a sidelink UE relay between the network node and the second UE, wherein the indication to transition to the sidelink UE relay mode is based at least in part on the results of the one or more sidelink measurements (block 1940). For example, the first UE (e.g., using communication manager 140 and/or reception component 2102, depicted in FIG. 21) may receive, from the network node, an indication to transition to a sidelink UE relay mode for operation as a sidelink UE relay between the network node and the second UE, wherein the indication to transition to the sidelink UE relay mode is based at least in part on the results of the one or more sidelink measurements, as described above. In some aspects, the indication to transition to the sidelink UE relay mode is based at least in part on the results of the one or more sidelink measurements.

Process 1900 may include additional aspects, such as any single aspect or any combination of aspects described below and/or in connection with one or more other processes described elsewhere herein.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
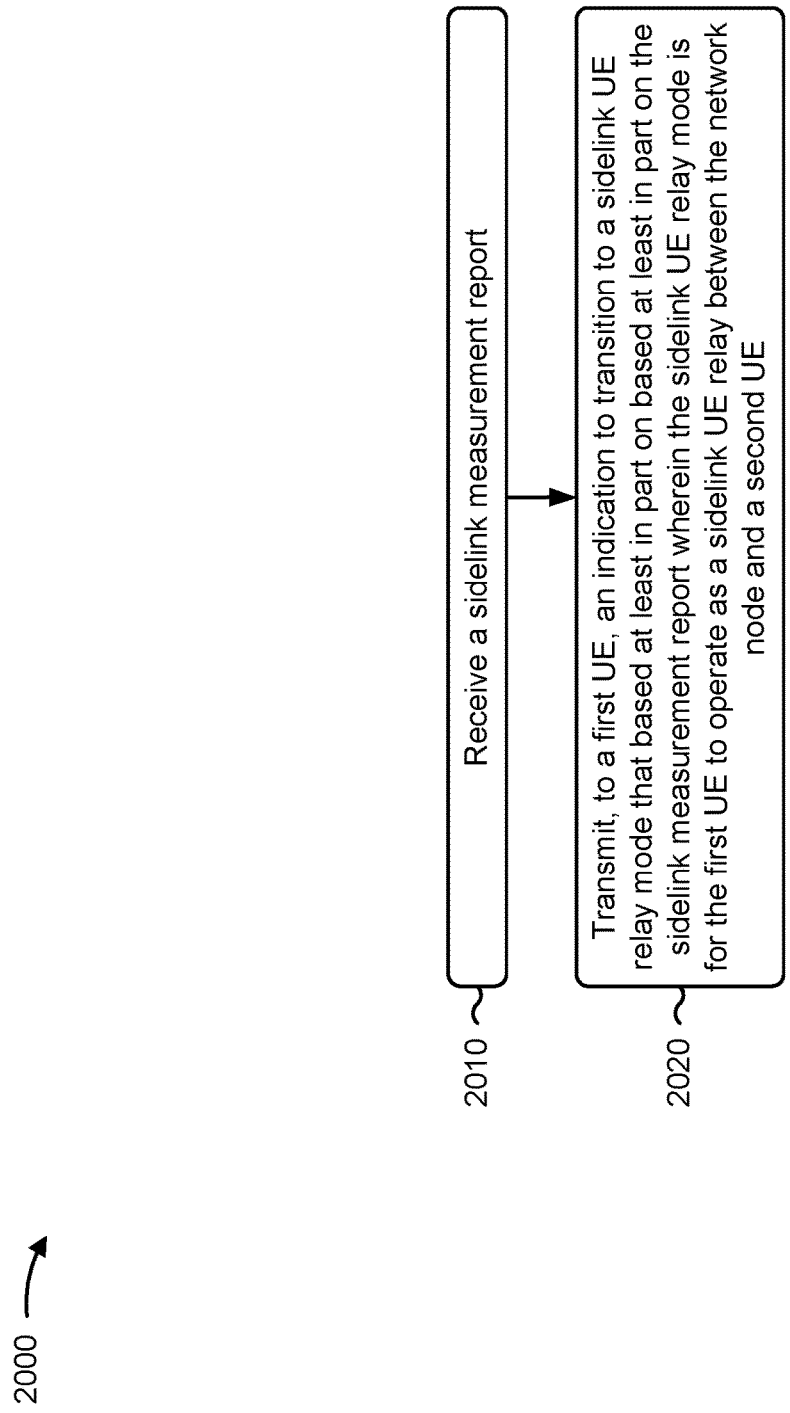

FIG. 20 is a diagram illustrating an example process 2000 performed, for example, by a network node, in accordance with the present disclosure. Example process 2000 is an example where the network node (e.g., a base station 110, a CU 310, an O-eNB 311, a DU 330, an RU 340) performs operations associated with sidelink measurement configuration and reporting.

As shown in FIG. 20, in some aspects, process 2000 may include receiving a sidelink measurement report (block 2010). For example, the network node (e.g., using communication manager 150 and/or reception component 2202, depicted in FIG. 22) may receive a sidelink measurement report, as described above.

As further shown in FIG. 20, in some aspects, process 2000 may include transmitting, to a first UE, an indication to transition to a sidelink UE relay mode that based at least in part on based at least in part on the sidelink measurement report, wherein the sidelink UE relay mode is for the first UE to operate as a sidelink UE relay between the network node and a second UE (block 2020). For example, the network node (e.g., using communication manager 150 and/or transmission component 2204, depicted in FIG. 22) may transmit, to a first UE, an indication to transition to a sidelink UE relay mode that based at least in part on based at least in part on the sidelink measurement report, wherein the sidelink UE relay mode is for the first UE to operate as a sidelink UE relay between the network node and a second UE, as described above. In some aspects, the sidelink UE relay mode is for the first UE to operate as a sidelink UE relay between the network node and a second UE.

Process 2000 may include additional aspects, such as any single aspect or any combination of aspects described below and/or in connection with one or more other processes described elsewhere herein.

In a first aspect, transmitting the indication to transition to the sidelink UE relay mode comprises transmitting the indication directly to the first UE on an access link.

In a second aspect, alone or in combination with the first aspect, transmitting the indication to transition to the sidelink UE relay mode comprises transmitting the indication to the first UE through the second UE.

In a third aspect, alone or in combination with one or more of the first and second aspects, receiving the sidelink measurement report comprises receiving the sidelink measurement report directly from the first UE on an access link, wherein the sidelink measurement report was generated by the first UE.

In a fourth aspect, alone or in combination with one or more of the first through third aspects, receiving the sidelink measurement report comprises receiving the sidelink measurement report from the first UE through the second UE, wherein the sidelink measurement report was generated by the first UE.

In a fifth aspect, alone or in combination with one or more of the first through fourth aspects, receiving the sidelink measurement report comprises receiving the sidelink measurement report directly from the first UE on an access link, wherein the sidelink measurement report was generated by the second UE.

In a sixth aspect, alone or in combination with one or more of the first through fifth aspects, receiving the sidelink measurement report comprises receiving the sidelink measurement report from the first UE through the second UE, wherein the sidelink measurement report was generated by the second UE.

In a seventh aspect, alone or in combination with one or more of the first through sixth aspects, receiving the sidelink measurement report comprises receiving the sidelink measurement report directly from the second UE on an access link, wherein the sidelink measurement report was generated by the first UE.

In an eighth aspect, alone or in combination with one or more of the first through seventh aspects, receiving the sidelink measurement report comprises receiving the sidelink measurement report from the second UE through the second UE, wherein the sidelink measurement report was generated by the first UE.

In a ninth aspect, alone or in combination with one or more of the first through eighth aspects, receiving the sidelink measurement report comprises receiving the sidelink measurement report directly from the second UE on an access link, wherein the sidelink measurement report was generated by the second UE.

In a tenth aspect, alone or in combination with one or more of the first through ninth aspects, receiving the sidelink measurement report comprises receiving the sidelink measurement report from the second UE through the second UE, wherein the sidelink measurement report was generated by the second UE.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
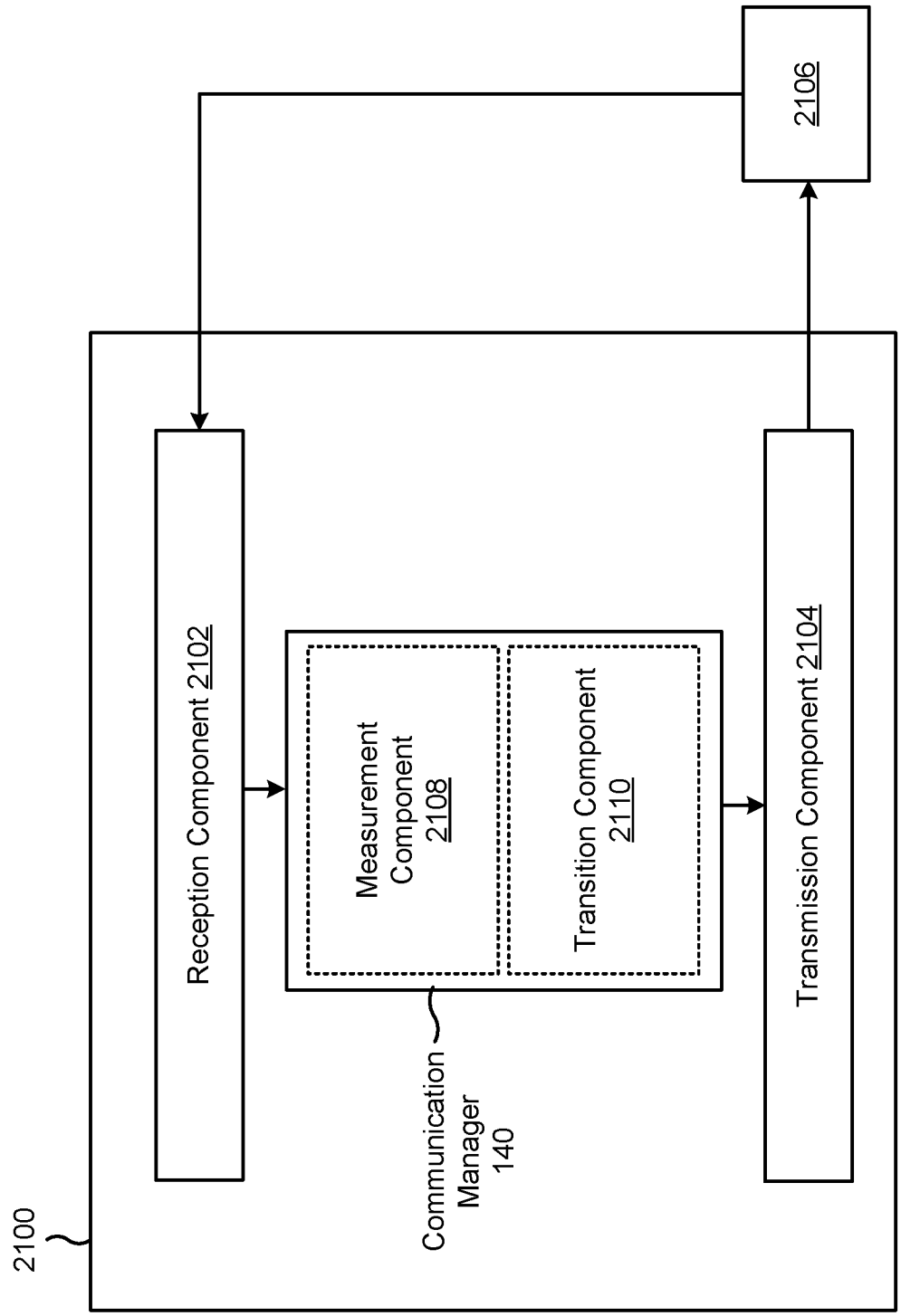
FIGS. 21 and 22 are diagrams of example apparatuses for wireless communication, in accordance with the present disclosure.

FIG. 21 is a diagram of an example apparatus 2100 for wireless communication. The apparatus 2100 may be a UE (e.g., a UE 120, a UE 405-1 or 405-2, a Tx/Rx UE 505, an Rx/Tx UE 510, a relay UE1, a relay UE2, or a relay UE3), or a UE may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 140. The communication manager 140 may include one or more of a measurement component 2108 and/or a transition component 2110. In some aspects, the communication manager 140 includes the measurement component 2108 and not the transition component 2110. In some aspects, the communication manager 140 includes the transition component 2110 and not the measurement component 2108.

In some aspects, the apparatus 2100 may be configured to perform one or more operations described herein in connection with FIGS. 5-14. Additionally, or alternatively, the apparatus 2100 may be configured to perform one or more processes described herein, such as process 1500 of FIG. 15, process 1600 of FIG. 16, process 1700 of FIG. 17, process 1800 of FIG. 18, process 1900 of FIG. 19, or a combination thereof. In some aspects, the apparatus 2100 and/or one or more components shown in FIG. 21 may include one or more components of the UE described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the UE described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of the UE described in connection with FIG. 2. In some aspects, the transmission component 2104 may be co-located with the reception component 2102 in a transceiver.

In some aspects, the reception component 2102 may receive (e.g., from one or more apparatuses 2106) an activated UE relay measurement configuration that includes one or more first sidelink measurement parameters. In some aspects, the reception component 2102 may receive (e.g., from one or more apparatuses 2106) a deactivated UE relay measurement configuration that includes one or more second sidelink measurement parameters wherein values for the one or more first sidelink measurement parameters and values for the one or more second sidelink measurement parameters are different. In some aspects, the measurement component 2108 may perform one or more sidelink measurements based at least in part on at least one of the activated UE relate measurement configuration or the deactivated UE relay measurement configuration.

In some aspects, the transmission component 2104 may transmit (e.g., to an apparatus 2106), when operating in the activated UE relay mode, one or more sidelink reference signals based at least in part on the activated UE relay measurement configuration. Transmitting the one or more sidelink reference signals may include transmitting one or more periodic sidelink channel state information reference signals, transmitting one or more aperiodic sidelink channel state information reference signals, or transmitting one or more sidelink demodulation reference signals.

In some aspects, the transmission component 2104 may transmit (e.g., to an apparatus 2106), when operating in the deactivated UE relay mode, one or more sidelink reference signals based at least in part on the deactivated UE relay measurement configuration. Transmitting the one or more sidelink reference signals may include transmitting one or more periodic sidelink channel state information reference signals.

In some aspects, the transition component 2110 may transition the apparatus 2100 from an activated UE relay mode to the candidate UE relay mode. The apparatus 2100 is configured to forward wireless communications between a plurality of apparatuses 2106 when operating in the activated UE relay mode.

In some aspects, the transition component 2110 may transition the apparatus 2100 from a deactivated UE relay mode to the candidate UE relay mode. The apparatus 210 does not forward wireless communications between a plurality of apparatuses 2106 when operating in the deactivated UE relay mode.

In some aspects, the reception component 2102 may receive a switch command from an apparatus 2106. In some aspects, the transition component 2110 may transition to the candidate UE relay mode based at least in part on receiving the switch command.

In some aspects, the reception component 2102 may receive the candidate UE relay measurement configuration from one or more apparatuses 2106.

In some aspects, the measurement component 2108 may perform one or more sidelink measurements of one or more sidelink reference signals associated with a an apparatus 2106. In some aspects, the transmission component 2104 may transmit, to an apparatus 2106, a sidelink measurement report that indicates results for the one or more sidelink measurements. In some aspects, the reception component 2102 may receive, from an apparatus 2106, an indication to transition to a sidelink UE relay mode for operation as a sidelink UE relay between a plurality of apparatuses 2106. The indication to transition to the sidelink UE relay mode is based at least in part on the results of the one or more sidelink measurements.

In some aspects, the reception component 2102 may receive, from one or more apparatuses 2106, an indication of a transmit power of the one or more sidelink reference signals wherein the results for the one or more sidelink measurements is based at least in part on the indication of the transmit power.

In some aspects, the reception component 2102 may receive, from an apparatus 2106, a request for the aperiodic sidelink measurement report. In some aspects, the transmission component 2104 transmits the aperiodic sidelink measurement report based at least in part on receiving the request.

In some aspects, the transmission component 2104 may transmit one or more sidelink reference signals to an apparatus 2106. In some aspects, the reception component 2102 may receive, from an apparatus 2106, a sidelink measurement report that indicates results for one or more sidelink measurements of the one or more sidelink reference signals. In some aspects, the transmission component 2104 may transmit the sidelink measurement report to an apparatus 2106.

In some aspects, the measurement component 2108 may perform one or more sidelink measurements of one or more sidelink reference signals associated with a an apparatus 2106. In some aspects, the transmission component 2104 may transmit, to an apparatus 2106, a sidelink measurement report that indicates results for the one or more sidelink measurements, and a selected sidelink UE relay mode for another apparatus 2106 to operate as a relay UE between the apparatus 2100 and another apparatus 2106.

In some aspects, the reception component 2102 may receive, one or more apparatuses 2106, an indication of a transmit power of the one or more sidelink reference signals.

In some aspects, the reception component 2102 may receive, from an apparatus 2106, a request for the aperiodic sidelink measurement report. In some aspects, the transmission component 2104 may transmit (e.g., to an apparatus 2106) the aperiodic sidelink measurement report based at least in part on receiving the request.

In some aspects, the transmission component 2104 may transmit one or more sidelink reference signals to an apparatus 2106. In some aspects, the reception component 2102 may receive, from an apparatus 2106, a sidelink measurement report that indicates results for one or more sidelink measurements of the one or more sidelink reference signals. In some aspects, the transmission component 2104 may transmit the sidelink measurement report to an apparatus 2106. In some aspects, reception component 2102 may receive, from an apparatus 2106, an indication to transition to a sidelink UE relay mode for operation as a sidelink UE relay between a plurality of apparatuses 2106. The indication to transition to the sidelink UE relay mode may be based at least in part on the results of the one or more sidelink measurements.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
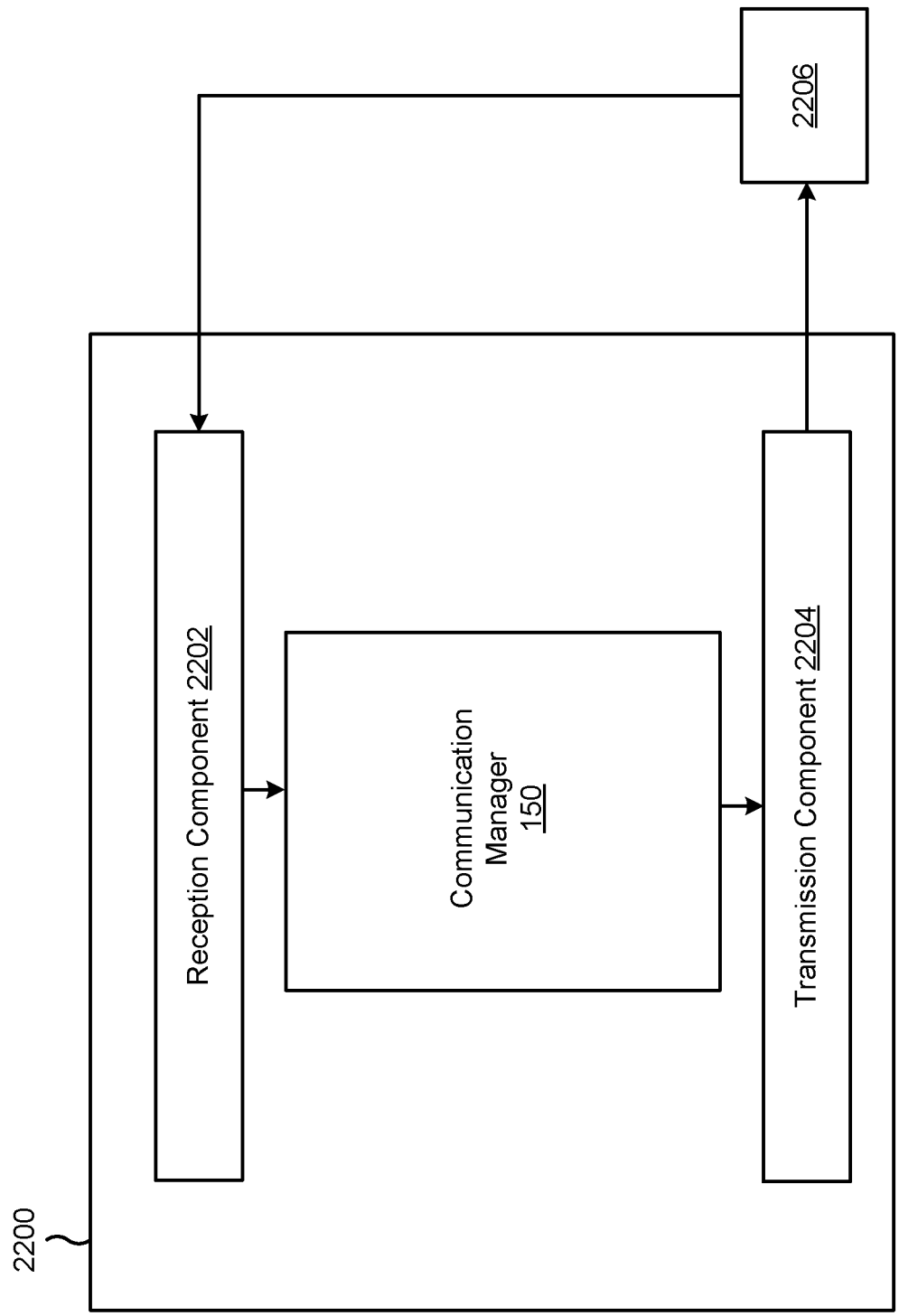

FIG. 22 is a diagram of an example apparatus 2200 for wireless communication. The apparatus 2200 may be a network node (e.g., a base station 110, a CU 310, an O-eNB 311, a DU 330, an RU 340), or a network node may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204. As further shown, the apparatus 2200 may include the communication manager 150.

In some aspects, the apparatus 2200 may be configured to perform one or more operations described herein in connection with FIGS. 5-14. Additionally, or alternatively, the apparatus 2200 may be configured to perform one or more processes described herein, such as process 2000 of FIG. 20. In some aspects, the apparatus 2200 and/or one or more components shown in FIG. 22 may include one or more components of the base station described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a modem, a demodulator, a MIMO detector, a receive processor, a controller/processor, a memory, or a combination thereof, of the base station described in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modem, a modulator, a transmit MIMO processor, a transmit processor, a controller/processor, a memory, or a combination thereof, of the base station described in connection with FIG. 2. In some aspects, the transmission component 2204 may be co-located with the reception component 2202 in a transceiver.

In some aspects, the reception component 2202 may receive a sidelink measurement report from an apparatus 2206. In some aspects, the transmission component 2204 may transmit, to an apparatus 2206, an indication to transition to a sidelink UE relay mode that based at least in part on based at least in part on the sidelink measurement report. The sidelink UE relay mode is for the apparatus 2206 to operate as a sidelink UE relay between the apparatus 2200 and another apparatus 2206.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

The following provides an overview of some Aspects of the present disclosure:

Aspect 1: A method of wireless communication performed by a user equipment (UE), comprising: receiving an activated UE relay measurement configuration that includes one or more first sidelink measurement parameters; receiving a deactivated UE relay measurement configuration that includes one or more second sidelink measurement parameters, wherein values for the one or more first sidelink measurement parameters and values for the one or more second sidelink measurement parameters are different; and performing one or more sidelink measurements based at least in part on at least one of the activated UE relate measurement configuration or the deactivated UE relay measurement configuration.

Aspect 2: The method of Aspect 1, wherein performing the one or more sidelink measurements comprises: performing, when operating in an activated UE relay mode, the one or more sidelink measurements based at least in part on the activated UE relay measurement configuration, wherein the UE is configured to forward wireless communications between another UE and a network node when operating in the activated UE relay mode.

Aspect 3: The method of Aspect 2, wherein performing the one or more sidelink measurements comprises: performing one or more periodic measurements of a sidelink channel state information reference signal, performing one or more aperiodic measurements of the sidelink channel state information reference signal, or performing one or more measurements of a sidelink demodulation reference signal.

Aspect 4: The method of one or more of Aspects 1-3, further comprising: transmitting, when operating in the activated UE relay mode, one or more sidelink reference signals based at least in part on the activated UE relay measurement configuration, wherein transmitting the one or more sidelink reference signals comprises: transmitting one or more periodic sidelink channel state information reference signals, transmitting one or more aperiodic sidelink channel state information reference signals, or transmitting one or more sidelink demodulation reference signals.

Aspect 5: The method of one or more of Aspects 1-4, wherein performing the one or more sidelink measurements comprises: performing, when operating in a deactivated UE relay mode, the one or more sidelink measurements based at least in part on the deactivated UE relay measurement configuration, wherein the UE does not forward wireless communications between another UE and a network node when operating in the deactivated UE relay mode.

Aspect 6: The method of Aspect 5, wherein performing the one or more sidelink measurements comprises: performing one or more periodic measurements of a sidelink channel state information reference signal.

Aspect 7: The method of one or more of Aspects 1-6, further comprising: transmitting, when operating in the deactivated UE relay mode, one or more sidelink reference signals based at least in part on the deactivated UE relay measurement configuration, wherein transmitting the one or more sidelink reference signals comprises: transmitting one or more periodic sidelink channel state information reference signals.

Aspect 8: The method of one or more of Aspects 1-7, further comprising: receiving at least one of the activated UE relay measurement configuration or the deactivated UE relay measurement configuration from at least one of: a network node on an access link, or another UE on a sidelink.

Aspect 9: The method of one or more of Aspects 1-8, further comprising: at least one of: performing, when operating in a candidate UE relay mode, one or more sidelink measurements based at least in part on a candidate UE relay measurement configuration that includes one or more third sidelink measurement parameters, or transmitting, when operating in the candidate UE relay mode, one or more sidelink reference signals based at least in part on the candidate UE relay measurement configuration, wherein the UE does not forward wireless communications between another UE and a network node when operating in the candidate UE relay mode, and wherein the UE operates in the candidate UE relay mode as a result of being identified as a candidate UE relay for forwarding wireless communications between the other UE and the network node.

Aspect 10: The method of Aspect 9, wherein values for the one or more third sidelink measurement parameters are different from the values for the one or more first sidelink measurement parameters and the values for the one or more second sidelink measurement parameters.

Aspect 11: The method of Aspect 9 or 10, wherein values for the one or more third sidelink measurement parameters are same values as the values for the one or more first sidelink measurement parameters.

Aspect 12: The method of one or more of Aspects 9-11, further comprising: transitioning from an activated UE relay mode to the candidate UE relay mode, wherein the UE is configured to forward wireless communications between another UE and a network node when operating in the activated UE relay mode.

Aspect 13: The method of one or more of Aspects 9-12, further comprising: transitioning from a deactivated UE relay mode to the candidate UE relay mode, wherein the UE does not forward wireless communications between another UE and a network node when operating in the deactivated UE relay mode.

Aspect 14: The method of one or more of Aspects 9-13, further comprising: receiving a switch command from a network node; and transitioning to the candidate UE relay mode based at least in part on receiving the switch command.

Aspect 15: The method of Aspect 14, wherein performing the one or more sidelink measurements comprises: performing one or more periodic measurements of a sidelink channel state information reference signal, performing one or more aperiodic measurements of the sidelink channel state information reference signal, or performing one or more measurements of a sidelink demodulation reference signal.

Aspect 16: The method of Aspect 14 or 15, wherein transmitting the one or more sidelink reference signals comprises: transmitting one or more periodic sidelink channel state information reference signals, transmitting one or more aperiodic sidelink channel state information reference signals, or transmitting one or more sidelink demodulation reference signals.

Aspect 17: The method of one or more of Aspects 9-16, further comprising: receiving the candidate UE relay measurement configuration from at least one of: a network node on an access link, or another UE on a sidelink.

Aspect 18: A method of wireless communication performed by a first user equipment (UE), comprising: performing one or more sidelink measurements of one or more sidelink reference signals associated with a second UE; transmitting, to a network node, a sidelink measurement report that indicates results for the one or more sidelink measurements; and receiving, from the network node, an indication to transition to a sidelink UE relay mode for operation as a sidelink UE relay between the network node and the second UE, wherein the indication to transition to the sidelink UE relay mode is based at least in part on the results of the one or more sidelink measurements.

Aspect 19: The method of Aspect 18, wherein transmitting the sidelink measurement report comprises: periodically transmitting the sidelink measurement report based at least in part on a periodic sidelink measurement reporting configuration.

Aspect 20: The method of Aspect 18, wherein the sidelink measurement report further indicates a selected sidelink UE relay mode that is selected by the first UE.

Aspect 21: The method of Aspect 20, wherein transmitting the sidelink measurement report comprises: transmitting an aperiodic sidelink measurement report based at least in part on the selected sidelink UE relay mode, and another sidelink UE relay mode in which the first UE was operating when the one or more sidelink measurements were performed, are different sidelink UE relay modes.

Aspect 22: The method of Aspect 20, wherein the selected sidelink UE relay mode is based at least in part on the results of the one or more sidelink measurements.

Aspect 23: The method of Aspect 22, wherein the selected sidelink UE relay mode is based at least in part on results of one or more access link measurements associated with the network node.

Aspect 24: The method of Aspect 22, wherein the selected sidelink UE relay mode is based at least in part on results of one or more other sidelink measurements associated with a third UE.

Aspect 25: The method of Aspect 22, wherein the selected sidelink UE relay mode is based at least in part on one or more operating parameters associated with the first UE, wherein the one or more operating parameters comprise at least one of: an available power for the first UE, a multi-panel configuration for the first UE, a multi-beam operation configuration for the first UE, a location of the first UE, a sidelink traffic load for the first UE, an access link traffic load for the first UE, a sidelink discontinuous reception (DRX) configuration for the first UE, or an access link DRX configuration for the first UE.

Aspect 26: The method of Aspect 18, further comprising: receiving, from at least one of the second UE or the network node, an indication of a transmit power of the one or more sidelink reference signals, wherein the results for the one or more sidelink measurements is based at least in part on the indication of the transmit power.

Aspect 27: The method of Aspect 18, wherein transmitting the sidelink measurement report comprises: transmitting an aperiodic sidelink measurement report to the network node.

Aspect 28: The method of Aspect 27, wherein transmitting the aperiodic sidelink measurement report comprises: transmitting the aperiodic sidelink measurement report based at least in part on results of the one or more sidelink measurements satisfying a threshold.

Aspect 29: The method of Aspect 27, further comprising: receiving, from the network node, a request for the aperiodic sidelink measurement report, wherein transmitting the aperiodic sidelink measurement report comprises: transmitting the aperiodic sidelink measurement report based at least in part on receiving the request.

Aspect 30: The method of Aspect 18, wherein transmitting the sidelink measurement report comprises: transmitting the sidelink measurement report directly to the network node on an access link.

Aspect 31: The method of Aspect 18, wherein transmitting the sidelink measurement report comprises: transmitting the sidelink measurement report to the network node via the second UE.

Aspect 32: A method of wireless communication performed by a first user equipment (UE), comprising: transmitting one or more sidelink reference signals; receiving, from a second UE, a sidelink measurement report that indicates results for one or more sidelink measurements of the one or more sidelink reference signals; and transmitting the sidelink measurement report to a network node.

Aspect 33: The method of Aspect 32, wherein the sidelink measurement report further indicates a selected sidelink UE relay mode for the second UE to operate a sidelink UE relay between the network node and the first UE, wherein the sidelink UE relay mode is based at least in part on the results of the one or more sidelink measurements.

Aspect 34: A method of wireless communication performed by a first user equipment (UE), comprising: performing one or more sidelink measurements of one or more sidelink reference signals associated with a second UE; and transmitting, to a network node, a sidelink measurement report that indicates: results for the one or more sidelink measurements, and a selected sidelink UE relay mode for the second UE to operate as a relay UE between the first UE and the network node.

Aspect 35: The method of Aspect 34, wherein transmitting the sidelink measurement report comprises: periodically transmitting the sidelink measurement report based at least in part on a periodic sidelink measurement reporting configuration.

Aspect 36: The method of Aspect 34, wherein transmitting the sidelink measurement report comprises: transmitting an aperiodic sidelink measurement report based at least in part on the selected sidelink UE relay mode, and the other sidelink UE relay mode in which the second UE was operating when the one or more sidelink measurements were performed, being different sidelink UE relay modes.

Aspect 37: The method of Aspect 34, wherein the selected sidelink UE relay mode is based at least in part on the results of the one or more sidelink measurements.

Aspect 38: The method of Aspect 37, wherein the selected sidelink UE relay mode is based at least in part on results of one or more access link measurements associated with the network node.

Aspect 39: The method of Aspect 37, wherein the selected sidelink UE relay mode is based at least in part on results of one or more other sidelink measurements associated with a third UE.

Aspect 40: The method of Aspect 37, wherein the selected sidelink UE relay mode is based at least in part on one or more operating parameters associated with the second UE, wherein the one or more operating parameters comprise at least one of: an available power for the second UE, a multi-panel configuration for the second UE, a multi-beam operation configuration for the second UE, a location of the second UE, a sidelink traffic load for the second UE, an access link traffic load for the second UE, a sidelink discontinuous reception (DRX) configuration for the second UE, or an access link DRX configuration for the second UE.

Aspect 41: The method of Aspect 34, further comprising: receiving, from at least one of the second UE or the network node, an indication of a transmit power of the one or more sidelink reference signals.

Aspect 42: The method of Aspect 34, wherein transmitting the sidelink measurement report comprises: transmitting an aperiodic sidelink measurement report to the network node.

Aspect 43: The method of Aspect 42, wherein transmitting the aperiodic sidelink measurement report comprises: transmitting the aperiodic sidelink measurement report based at least in part on results of the one or more sidelink measurements satisfying a threshold.

Aspect 44: The method of Aspect 42, further comprising: receiving, from the network node, a request for the aperiodic sidelink measurement report, wherein transmitting the aperiodic sidelink measurement report comprises: transmitting the aperiodic sidelink measurement report based at least in part on receiving the request.

Aspect 45: The method of Aspect 34, wherein transmitting the sidelink measurement report comprises: transmitting the sidelink measurement report directly to the network node on an access link.

Aspect 46: The method of Aspect 34, wherein transmitting the sidelink measurement report comprises: transmitting the sidelink measurement report to the network node through the second UE.

Aspect 47: A method of wireless communication performed by a first user equipment (UE), comprising: transmitting one or more sidelink reference signals; receiving, from a second UE, a sidelink measurement report that indicates results for one or more sidelink measurements of the one or more sidelink reference signals; transmitting the sidelink measurement report to a network node; and receiving, from the network node, an indication to transition to a sidelink UE relay mode for operation as a sidelink UE relay between the network node and the second UE, wherein the indication to transition to the sidelink UE relay mode is based at least in part on the results of the one or more sidelink measurements.

Aspect 48: A method of wireless communication performed by a network node, comprising: receiving a sidelink measurement report; and transmitting, to a first UE, an indication to transition to a sidelink UE relay mode that based at least in part on based at least in part on the sidelink measurement report, wherein the sidelink UE relay mode is for the first UE to operate as a sidelink UE relay between the network node and a second UE.

Aspect 49: The method of Aspect 48, wherein transmitting the indication to transition to the sidelink UE relay mode comprises: transmitting the indication directly to the first UE on an access link.

Aspect 50: The method of Aspect 48, wherein transmitting the indication to transition to the sidelink UE relay mode comprises: transmitting the indication to the first UE through the second UE.

Aspect 51: The method of Aspect 48, wherein receiving the sidelink measurement report comprises: receiving the sidelink measurement report directly from the first UE on an access link, wherein the sidelink measurement report was generated by the first UE.

Aspect 52: The method of Aspect 48, wherein receiving the sidelink measurement report comprises: receiving the sidelink measurement report from the first UE through the second UE, wherein the sidelink measurement report was generated by the first UE.

Aspect 53: The method of Aspect 48, wherein receiving the sidelink measurement report comprises: receiving the sidelink measurement report directly from the first UE on an access link, wherein the sidelink measurement report was generated by the second UE.

Aspect 54: The method of Aspect 48, wherein receiving the sidelink measurement report comprises: receiving the sidelink measurement report from the first UE through the second UE, wherein the sidelink measurement report was generated by the second UE.

Aspect 55: The method of Aspect 48, wherein receiving the sidelink measurement report comprises: receiving the sidelink measurement report directly from the second UE on an access link, wherein the sidelink measurement report was generated by the first UE.

Aspect 56: The method of Aspect 48, wherein receiving the sidelink measurement report comprises: receiving the sidelink measurement report from the second UE through the second UE, wherein the sidelink measurement report was generated by the first UE.

Aspect 57: The method of Aspect 48, wherein receiving the sidelink measurement report comprises: receiving the sidelink measurement report directly from the second UE on an access link, wherein the sidelink measurement report was generated by the second UE.

Aspect 58: The method of Aspect 48, wherein receiving the sidelink measurement report comprises: receiving the sidelink measurement report from the second UE through the second UE, wherein the sidelink measurement report was generated by the second UE.

Aspect 59: An apparatus for wireless communication at a device, comprising a processor; memory coupled with the processor; and instructions stored in the memory and executable by the processor to cause the apparatus to perform the method of one or more of Aspects 1-17.

Aspect 60: A device for wireless communication, comprising a memory and one or more processors coupled to the memory, the one or more processors configured to perform the method of one or more of Aspects 1-17.

Aspect 61: An apparatus for wireless communication, comprising at least one means for performing the method of one or more of Aspects 1-17.

Aspect 62: A non-transitory computer-readable medium storing code for wireless communication, the code comprising instructions executable by a processor to perform the method of one or more of Aspects 1-17.

Aspect 63: A non-transitory computer-readable medium storing a set of instructions for wireless communication, the set of instructions comprising one or more instructions that, when executed by one or more processors of a device, cause the device to perform the method of one or more of Aspects 1-17.

Aspect 64: An apparatus for wireless communication at a device, comprising a processor; memory coupled with the processor; and instructions stored in the memory and executable by the processor to cause the apparatus to perform the method of one or more of Aspects 18-31.

Aspect 65: A device for wireless communication, comprising a memory and one or more processors coupled to the memory, the one or more processors configured to perform the method of one or more of Aspects 18-31.

Aspect 66: An apparatus for wireless communication, comprising at least one means for performing the method of one or more of Aspects 18-31.

Aspect 67: A non-transitory computer-readable medium storing code for wireless communication, the code comprising instructions executable by a processor to perform the method of one or more of Aspects 18-31.

Aspect 68: A non-transitory computer-readable medium storing a set of instructions for wireless communication, the set of instructions comprising one or more instructions that, when executed by one or more processors of a device, cause the device to perform the method of one or more of Aspects 18-31.

Aspect 69: An apparatus for wireless communication at a device, comprising a processor; memory coupled with the processor; and instructions stored in the memory and executable by the processor to cause the apparatus to perform the method of one or more of Aspects 32 or 33.

Aspect 70: A device for wireless communication, comprising a memory and one or more processors coupled to the memory, the one or more processors configured to perform the method of one or more of Aspects 32 or 33.

Aspect 71: An apparatus for wireless communication, comprising at least one means for performing the method of one or more of Aspects 32 or 33.

Aspect 72: A non-transitory computer-readable medium storing code for wireless communication, the code comprising instructions executable by a processor to perform the method of one or more of Aspects 32 or 33.

Aspect 73: A non-transitory computer-readable medium storing a set of instructions for wireless communication, the set of instructions comprising one or more instructions that, when executed by one or more processors of a device, cause the device to perform the method of one or more of Aspects 32 or 33.

Aspect 74: An apparatus for wireless communication at a device, comprising a processor; memory coupled with the processor; and instructions stored in the memory and executable by the processor to cause the apparatus to perform the method of one or more of Aspects 34-46.

Aspect 75: A device for wireless communication, comprising a memory and one or more processors coupled to the memory, the one or more processors configured to perform the method of one or more of Aspects 34-46.

Aspect 76: An apparatus for wireless communication, comprising at least one means for performing the method of one or more of Aspects 34-46.

Aspect 77: A non-transitory computer-readable medium storing code for wireless communication, the code comprising instructions executable by a processor to perform the method of one or more of Aspects 34-46.

Aspect 78: A non-transitory computer-readable medium storing a set of instructions for wireless communication, the set of instructions comprising one or more instructions that, when executed by one or more processors of a device, cause the device to perform the method of one or more of Aspects 34-46.

Aspect 78: An apparatus for wireless communication at a device, comprising a processor; memory coupled with the processor; and instructions stored in the memory and executable by the processor to cause the apparatus to perform the method of Aspect 47.

Aspect 80: A device for wireless communication, comprising a memory and one or more processors coupled to the memory, the one or more processors configured to perform the method of Aspect 47.

Aspect 81: An apparatus for wireless communication, comprising at least one means for performing the method of one or more of Aspects 47.

Aspect 82: A non-transitory computer-readable medium storing code for wireless communication, the code comprising instructions executable by a processor to perform the method of Aspect 47.

Aspect 83: A non-transitory computer-readable medium storing a set of instructions for wireless communication, the set of instructions comprising one or more instructions that, when executed by one or more processors of a device, cause the device to perform the method of Aspect 47.

Aspect 84: An apparatus for wireless communication at a device, comprising a processor; memory coupled with the processor; and instructions stored in the memory and executable by the processor to cause the apparatus to perform the method of one or more of Aspects 48-58.

Aspect 85: A device for wireless communication, comprising a memory and one or more processors coupled to the memory, the one or more processors configured to perform the method of one or more of Aspects 48-58.

Aspect 86: An apparatus for wireless communication, comprising at least one means for performing the method of one or more of Aspects 48-58.

Aspect 87: A non-transitory computer-readable medium storing code for wireless communication, the code comprising instructions executable by a processor to perform the method of one or more of Aspects 48-58.

Aspect 88: A non-transitory computer-readable medium storing a set of instructions for wireless communication, the set of instructions comprising one or more instructions that, when executed by one or more processors of a device, cause the device to perform the method of one or more of Aspects 48-58.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 one or more memories; and
 one or more processors, coupled to the one or more memories, configured to:
  receive an activated UE relay measurement configuration that includes one or more first sidelink measurement parameters;
  receive a deactivated UE relay measurement configuration that includes one or more second sidelink measurement parameters,
   wherein values for the one or more first sidelink measurement parameters and values for the one or more second sidelink measurement parameters are different; and
  perform one or more sidelink measurements based at least in part on at least one of the activated UE relate measurement configuration or the deactivated UE relay measurement configuration.

2. The UE of claim 1, wherein the one or more processors, to perform the one or more sidelink measurements, are configured to:
 perform, when operating in an activated UE relay mode, the one or more sidelink measurements based at least in part on the activated UE relay measurement configuration,
  wherein the UE is configured to forward wireless communications between another UE and a network node when operating in the activated UE relay mode.

3. The UE of claim 2, wherein the one or more processors, to perform the one or more sidelink measurements, are configured to:
 perform one or more periodic measurements of a sidelink channel state information reference signal,
 perform one or more aperiodic measurements of the sidelink channel state information reference signal, or
 perform one or more measurements of a sidelink demodulation reference signal.

4. The UE of claim 2, wherein the one or more processors are further configured to:
 transmit, when operating in the activated UE relay mode, one or more sidelink reference signals based at least in part on the activated UE relay measurement configuration,
 wherein the one or more processors, to transmit the one or more sidelink reference signals, are configured to:
  transmit one or more periodic sidelink channel state information reference signals,
  transmit one or more aperiodic sidelink channel state information reference signals, or
  transmit one or more sidelink demodulation reference signals.

5. The UE of claim 1, wherein the one or more processors, to perform the one or more sidelink measurements, are configured to:
 perform, when operating in a deactivated UE relay mode, the one or more sidelink measurements based at least in part on the deactivated UE relay measurement configuration,
 wherein the UE does not forward wireless communications between another UE and a network node when operating in the deactivated UE relay mode.

6. The UE of claim 5, wherein the one or more processors, to perform the one or more sidelink measurements, are configured to:
 perform one or more periodic measurements of a sidelink channel state information reference signal.

7. The UE of claim 5, wherein the one or more processors are further configured to:
 transmit, when operating in the deactivated UE relay mode, one or more sidelink reference signals based at least in part on the deactivated UE relay measurement configuration,
 wherein the one or more processors, to transmit the one or more sidelink reference signals, are configured to:
  transmit one or more periodic sidelink channel state information reference signals.

8. The UE of claim 1, wherein the one or more processors are further configured to:
 receive at least one of the activated UE relay measurement configuration or the deactivated UE relay measurement configuration from at least one of:
  a network node on an access link, or
  another UE on a sidelink.

9. The UE of claim 1, wherein the one or more processors are further configured to:
 at least one of:
  perform, when operating in a candidate UE relay mode, one or more sidelink measurements based at least in part on a candidate UE relay measurement configuration that includes one or more third sidelink measurement parameters, or
  transmit, when operating in the candidate UE relay mode, one or more sidelink reference signals based at least in part on the candidate UE relay measurement configuration,
 wherein the UE does not forward wireless communications between another UE and a network node when operating in the candidate UE relay mode, and wherein the UE operates in the candidate UE relay mode as a result of being identified as a candidate UE relay for forwarding wireless communications between the other UE and the network node.

10. The UE of claim 9, wherein values for the one or more third sidelink measurement parameters are different from the values for the one or more first sidelink measurement parameters and the values for the one or more second sidelink measurement parameters.

11. The UE of claim 9, wherein values for the one or more third sidelink measurement parameters are same values as the values for the one or more first sidelink measurement parameters.

12. The UE of claim 9, wherein the one or more processors are further configured to:
transition from an activated UE relay mode to the candidate UE relay mode,
wherein the UE is configured to forward wireless communications between another UE and a network node when operating in the activated UE relay mode.

13. A first user equipment (UE) for wireless communication, comprising:
one or more memories; and
one or more processors, coupled to the one or more memories, configured to:
perform one or more sidelink measurements of one or more sidelink reference signals associated with a second UE;
transmit, to a network node, a sidelink measurement report that indicates results for the one or more sidelink measurements,
wherein the sidelink measurement report further indicates a selected sidelink UE relay mode that is selected by the first UE, and
wherein the selected sidelink UE relay mode is based at least in part on the results of the one or more sidelink measurements and results of one or more access link measurements associated with the network node; and
receive, from the network node, an indication to transition to a sidelink UE relay mode for operation as a sidelink UE relay between the network node and the second UE,
wherein the indication to transition to the sidelink UE relay mode is based at least in part on the results of the one or more sidelink measurements.

14. The first UE of claim 13, wherein the one or more processors, to transmit the sidelink measurement report, are configured to:
periodically transmit the sidelink measurement report based at least in part on a periodic sidelink measurement reporting configuration.

15. The first UE of claim 13, wherein the one or more processors, to transmit the sidelink measurement report, are configured to:
transmit an aperiodic sidelink measurement report based at least in part on the selected sidelink UE relay mode, and another sidelink UE relay mode in which the first UE was operating when the one or more sidelink measurements were performed, are different sidelink UE relay modes.

16. The first UE of claim 13, wherein the selected sidelink UE relay mode is based at least in part on results of one or more other sidelink measurements associated with a third UE.

17. The first UE of claim 13, wherein the selected sidelink UE relay mode is based at least in part on one or more operating parameters associated with the first UE,
wherein the one or more operating parameters comprise at least one of:
an available power for the first UE,
a multi-panel configuration for the first UE,
a multi-beam operation configuration for the first UE,
a location of the first UE,
a sidelink traffic load for the first UE,
an access link traffic load for the first UE,
a sidelink discontinuous reception (DRX) configuration for the first UE, or
an access link DRX configuration for the first UE.

18. The first UE of claim 13, wherein the one or more processors are further configured to:
receive, from at least one of the second UE or the network node, an indication of a transmit power of the one or more sidelink reference signals,
wherein the results for the one or more sidelink measurements is based at least in part on the indication of the transmit power.

19. A first user equipment (UE) for wireless communication, comprising:
one or more memories; and
one or more processors, coupled to the one or more memories, configured to:
perform one or more sidelink measurements of one or more sidelink reference signals associated with a second UE; and
transmit, to a network node, a sidelink measurement report that indicates:
results for the one or more sidelink measurements, and
a selected sidelink UE relay mode for the second UE to operate as a relay UE between the first UE and the network node,
wherein the selected sidelink UE relay mode is based at least in part on the results of the one or more sidelink measurements and results of one or more access link measurements associated with the network node.

20. The first UE of claim 19, wherein the one or more processors, to transmit the sidelink measurement report, are configured to:
periodically transmit the sidelink measurement report based at least in part on a periodic sidelink measurement reporting configuration.

21. The first UE of claim 19, wherein the one or more processors, to transmit the sidelink measurement report, are configured to:
transmit an aperiodic sidelink measurement report based at least in part on the selected sidelink UE relay mode, and another sidelink UE relay mode in which the second UE was operating when the one or more sidelink measurements were performed, being different sidelink UE relay modes.

22. The first UE of claim 19, wherein the selected sidelink UE relay mode is based at least in part on results of one or more other sidelink measurements associated with a third UE.

23. The first UE of claim 19, wherein the selected sidelink UE relay mode is based at least in part on one or more operating parameters associated with the second UE, wherein the one or more operating parameters comprise at least one of:
- an available power for the second UE,
- a multi-panel configuration for the second UE,
- a multi-beam operation configuration for the second UE,
- a location of the second UE,
- a sidelink traffic load for the second UE,
- an access link traffic load for the second UE,
- a sidelink discontinuous reception (DRX) configuration for the second UE, or
- an access link DRX configuration for the second UE.

24. A method for wireless communication, comprising:
receiving an activated user equipment (UE) relay measurement configuration that includes one or more first sidelink measurement parameters;
receiving a deactivated UE relay measurement configuration that includes one or more second sidelink measurement parameters,
  wherein values for the one or more first sidelink measurement parameters and values for the one or more second sidelink measurement parameters are different; and
performing one or more sidelink measurements based at least in part on at least one of the activated UE relate measurement configuration or the deactivated UE relay measurement configuration.

25. The method of claim 24, wherein performing the one or more sidelink measurements comprises:
performing, when operating in an activated UE relay mode, the one or more sidelink measurements based at least in part on the activated UE relay measurement configuration,
wherein a UE is configured to forward wireless communications between another UE and a network node when operating in the activated UE relay mode.

26. The method of claim 25, wherein performing the one or more sidelink measurements comprises:
performing one or more periodic measurements of a sidelink channel state information reference signal,
performing one or more aperiodic measurements of the sidelink channel state information reference signal, or
performing one or more measurements of a sidelink demodulation reference signal.

27. The method of claim 25, further comprising:
transmitting, when operating in the activated UE relay mode, one or more sidelink reference signals based at least in part on the activated UE relay measurement configuration,
wherein transmitting the one or more sidelink reference signals comprises:
  transmitting one or more periodic sidelink channel state information reference signals,
  transmitting one or more aperiodic sidelink channel state information reference signals, or
  transmitting one or more sidelink demodulation reference signals.

28. The method of claim 24, wherein performing the one or more sidelink measurements comprises:
performing, when operating in a deactivated UE relay mode, the one or more sidelink measurements based at least in part on the deactivated UE relay measurement configuration,
wherein a UE does not forward wireless communications between another UE and a network node when operating in the deactivated UE relay mode.

29. The method of claim 28, wherein performing the one or more sidelink measurements comprises:
performing one or more periodic measurements of a sidelink channel state information reference signal.

30. The method of claim 28, further comprising:
transmitting, when operating in the deactivated UE relay mode, one or more sidelink reference signals based at least in part on the deactivated UE relay measurement configuration,
wherein transmitting the one or more sidelink reference signals comprises:
  transmitting one or more periodic sidelink channel state information reference signals.

* * * * *